US012297403B2

(12) United States Patent
Short et al.

(10) Patent No.: US 12,297,403 B2
(45) **Date of Patent: *May 13, 2025**

(54) SYSTEMS AND METHODS FOR REDUCING RENDERED FATS POUR POINT

(71) Applicant: MARATHON PETROLEUM COMPANY LP, Findlay, OH (US)

(72) Inventors: Daniel Z Short, Findlay, OH (US); Nathan R. Klaus, Findlay, OH (US); David G. Teschel, Findlay, OH (US); Paul J. Dofton, Findlay, OH (US); Justin L. Womeldorff, Findlay, OH (US); Michelle Smith, Findlay, OH (US); Peg Broughton, Findlay, OH (US); Caleb S. Litchfield, Findlay, OH (US)

(73) Assignee: Marathon Petroleum Company LP, Findlay, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/243,206

(22) Filed: Sep. 7, 2023

(65) Prior Publication Data

US 2023/0416638 A1 Dec. 28, 2023

Related U.S. Application Data

(63) Continuation of application No. 18/103,633, filed on Jan. 31, 2023, now Pat. No. 11,802,257.

(Continued)

(51) Int. Cl.

| | |
|---|---|
| ***C11B 3/00*** | (2006.01) |
| ***C10L 1/02*** | (2006.01) |

(52) U.S. Cl.

CPC ................ *C11B 3/00* (2013.01); *C10L 1/026* (2013.01); *C10L 2200/0484* (2013.01);

(Continued)

(58) Field of Classification Search

CPC .... C10L 1/02; C10L 1/026; C10L 2200/0484; C10L 2230/14; C10L 2270/026; C10L 2290/24; C10L 2290/58; C11B 3/00

See application file for complete search history.

(56) References Cited

U.S. PATENT DOCUMENTS

| | | | |
|---|---|---|---|
| 981,434 | A | 1/1911 | Lander |
| 1,526,301 | A | 2/1925 | Stevens |

(Continued)

FOREIGN PATENT DOCUMENTS

| | | |
|---|---|---|
| AT | 11772 U1 | 4/2011 |
| BR | PI0701518 | 11/2008 |

(Continued)

OTHER PUBLICATIONS

Platvoet et al., Process Burners 101, American Institute of Chemical Engineers, Aug. 2013.

(Continued)

*Primary Examiner* — Ellen M McAvoy
*Assistant Examiner* — Chantel Graham
(74) *Attorney, Agent, or Firm* — RAY QUINNEY & NEBEKER P.C.; Paul N. Taylor

(57) ABSTRACT

Systems and methods to reduce pour point (PP) temperatures of fat-based compositions for use in transportation fuels. In one or more embodiments, methods and systems reduce the pour point of rendered fats using biologically-derived plant oils for effectively transporting the blended fat based compositions over long distances, thereby advantageously decreasing the heating and mixing requirements needed to maintain the compositional temperature above the pour point. In certain embodiments, the fat based composition comprises rendered animal fats, such as tallow in combination with distilled corn oil (DCO).

30 Claims, 19 Drawing Sheets

Related U.S. Application Data

(60) Provisional application No. 63/267,317, filed on Jan. 31, 2022.

(52) U.S. Cl.
CPC ..... *C10L 2230/14* (2013.01); *C10L 2270/026* (2013.01); *C10L 2290/24* (2013.01); *C10L 2290/58* (2013.01)

(56) References Cited

U.S. PATENT DOCUMENTS

| | | | |
|---|---|---|---|
| 1,572,922 | A | 2/1926 | Govers et al. |
| 1,867,143 | A | 7/1932 | Fohl |
| 2,401,570 | A | 6/1946 | Koehler |
| 2,498,442 | A | 2/1950 | Morey |
| 2,516,097 | A | 7/1950 | Woodham et al. |
| 2,686,728 | A | 8/1954 | Wallace |
| 2,691,621 | A | 10/1954 | Gagle |
| 2,691,773 | A | 10/1954 | Lichtenberger |
| 2,731,282 | A | 1/1956 | Mcmanus et al. |
| 2,740,616 | A | 4/1956 | Walden |
| 2,792,908 | A | 5/1957 | Glanzer |
| 2,804,165 | A | 8/1957 | Blomgren |
| 2,867,913 | A | 1/1959 | Faucher |
| 2,888,239 | A | 5/1959 | Slemmons |
| 2,909,482 | A | 10/1959 | Williams et al. |
| 2,925,144 | A | 2/1960 | Kroll |
| 2,963,423 | A | 12/1960 | Birchfield |
| 3,063,681 | A | 11/1962 | Duguid |
| 3,070,990 | A | 1/1963 | Stanley |
| 3,109,481 | A | 11/1963 | Yahnke |
| 3,167,305 | A | 1/1965 | Backx et al. |
| 3,188,184 | A | 6/1965 | Rice et al. |
| 3,199,876 | A | 8/1965 | Magos et al. |
| 3,203,460 | A | 8/1965 | Kuhne |
| 3,279,441 | A | 10/1966 | Lippert et al. |
| 3,307,574 | A | 3/1967 | Anderson |
| 3,364,134 | A | 1/1968 | Hamblin |
| 3,400,049 | A | 9/1968 | Wolfe |
| 3,545,411 | A | 12/1970 | Vollradt |
| 3,660,057 | A | 5/1972 | Ilnyckyj |
| 3,719,027 | A | 3/1973 | Salka |
| 3,720,601 | A | 3/1973 | Coonradt |
| 3,771,638 | A | 11/1973 | Schneider et al. |
| 3,775,294 | A | 11/1973 | Peterson |
| 3,795,607 | A | 3/1974 | Adams |
| 3,838,036 | A | 9/1974 | Stine et al. |
| 3,839,484 | A | 10/1974 | Zimmerman, Jr. |
| 3,840,209 | A | 10/1974 | James |
| 3,841,144 | A | 10/1974 | Baldwin |
| 3,854,843 | A | 12/1974 | Penny |
| 3,874,399 | A | 4/1975 | Ishihara |
| 3,901,951 | A | 8/1975 | Nishizaki |
| 3,906,780 | A | 9/1975 | Baldwin |
| 3,912,307 | A | 10/1975 | Totman |
| 3,928,172 | A | 12/1975 | Davis et al. |
| 3,937,660 | A | 2/1976 | Yates et al. |
| 4,006,075 | A | 2/1977 | Luckenbach |
| 4,017,214 | A | 4/1977 | Smith |
| 4,066,425 | A | 1/1978 | Nett |
| 4,085,078 | A | 4/1978 | McDonald |
| 4,144,759 | A | 3/1979 | Slowik |
| 4,149,756 | A | 4/1979 | Tackett |
| 4,151,003 | A | 4/1979 | Smith et al. |
| 4,167,492 | A | 9/1979 | Varady |
| 4,176,052 | A | 11/1979 | Bruce et al. |
| 4,217,116 | A | 8/1980 | Seever |
| 4,260,068 | A | 4/1981 | McCarthy et al. |
| 4,299,687 | A | 11/1981 | Myers et al. |
| 4,302,324 | A | 11/1981 | Chen et al. |
| 4,308,968 | A | 1/1982 | Thiltgen et al. |
| 4,312,645 | A | 1/1982 | Mavros |
| 4,328,947 | A | 5/1982 | Reimpell et al. |
| 4,332,671 | A | 6/1982 | Boyer |
| 4,340,204 | A | 7/1982 | Heard |
| 4,353,812 | A | 10/1982 | Lomas et al. |
| 4,357,603 | A | 11/1982 | Roach et al. |
| 4,392,870 | A | 7/1983 | Chieffo et al. |
| 4,404,095 | A | 9/1983 | Haddad et al. |
| 4,422,925 | A | 12/1983 | Williams et al. |
| 4,434,044 | A | 2/1984 | Busch et al. |
| 4,439,533 | A | 3/1984 | Lomas et al. |
| 4,468,975 | A | 9/1984 | Sayles et al. |
| 4,482,451 | A | 11/1984 | Kemp |
| 4,495,063 | A | 1/1985 | Walters et al. |
| 4,539,012 | A | 9/1985 | Ohzeki et al. |
| 4,554,313 | A | 11/1985 | Hagenbach et al. |
| 4,554,799 | A | 11/1985 | Pallanch |
| 4,570,942 | A | 2/1986 | Diehl et al. |
| 4,583,859 | A | 4/1986 | Hall, II |
| 4,601,303 | A | 7/1986 | Jensen |
| 4,615,792 | A | 10/1986 | Greenwood |
| 4,621,062 | A | 11/1986 | Stewart et al. |
| 4,622,210 | A | 11/1986 | Hirschberg et al. |
| 4,624,771 | A | 11/1986 | Lane et al. |
| 4,647,313 | A | 3/1987 | Clementoni |
| 4,654,748 | A | 3/1987 | Rees |
| 4,661,241 | A | 4/1987 | Dabkowski et al. |
| 4,673,490 | A | 6/1987 | Subramanian et al. |
| 4,674,337 | A | 6/1987 | Jonas |
| 4,684,759 | A | 8/1987 | Lam |
| 4,686,027 | A | 8/1987 | Bonilla et al. |
| 4,728,348 | A | 3/1988 | Nelson et al. |
| 4,733,888 | A | 3/1988 | Toelke |
| 4,741,819 | A | 5/1988 | Robinson et al. |
| 4,764,347 | A | 8/1988 | Milligan |
| 4,765,631 | A | 8/1988 | Kohnen et al. |
| 4,771,176 | A | 9/1988 | Scheifer et al. |
| 4,816,137 | A | 3/1989 | Swint et al. |
| 4,820,404 | A | 4/1989 | Owen |
| 4,824,016 | A | 4/1989 | Cody et al. |
| 4,844,133 | A | 7/1989 | von Meyerinck et al. |
| 4,844,927 | A | 7/1989 | Morris et al. |
| 4,849,182 | A | 7/1989 | Luetzelschwab |
| 4,854,855 | A | 8/1989 | Rajewski |
| 4,875,994 | A | 10/1989 | Haddad et al. |
| 4,877,513 | A | 10/1989 | Haire et al. |
| 4,798,463 | A | 11/1989 | Koshi |
| 4,901,751 | A | 2/1990 | Story et al. |
| 4,914,249 | A | 4/1990 | Benedict |
| 4,916,938 | A | 4/1990 | Aikin et al. |
| 4,917,790 | A | 4/1990 | Owen |
| 4,923,834 | A | 5/1990 | Lomas |
| 4,940,900 | A | 7/1990 | Lambert |
| 4,957,511 | A | 9/1990 | Ljusberg-Wahren |
| 4,960,503 | A | 10/1990 | Haun et al. |
| 4,963,745 | A | 10/1990 | Maggard |
| 4,972,867 | A | 11/1990 | Ruesch |
| 5,000,841 | A | 3/1991 | Owen |
| 5,002,459 | A | 3/1991 | Swearingen et al. |
| 5,008,653 | A | 4/1991 | Kidd et al. |
| 5,009,768 | A | 4/1991 | Galiasso et al. |
| 5,013,537 | A | 5/1991 | Patarin et al. |
| 5,022,266 | A | 6/1991 | Cody et al. |
| 5,032,154 | A | 7/1991 | Wright |
| 5,034,115 | A | 7/1991 | Avidan |
| 5,045,177 | A | 9/1991 | Cooper et al. |
| 5,050,603 | A | 9/1991 | Stokes et al. |
| 5,053,371 | A | 10/1991 | Williamson |
| 5,056,758 | A | 10/1991 | Bramblet |
| 5,059,305 | A | 10/1991 | Sapre |
| 5,061,467 | A | 10/1991 | Johnson et al. |
| 5,066,049 | A | 11/1991 | Staples |
| 5,076,910 | A | 12/1991 | Rush |
| 5,082,985 | A | 1/1992 | Crouzet et al. |
| 5,096,566 | A | 3/1992 | Dawson et al. |
| 5,097,677 | A | 3/1992 | Holtzapple |
| 5,111,882 | A | 5/1992 | Tang et al. |
| 5,112,357 | A | 5/1992 | Bjerklund |
| 5,114,562 | A | 5/1992 | Haun et al. |
| 5,115,686 | A | 5/1992 | Walker et al. |
| 5,120,517 | A | 6/1992 | Elshout |
| 5,121,337 | A | 6/1992 | Brown |

(56) References Cited

U.S. PATENT DOCUMENTS 5,128,109 A 7/1992 Owen
5,128,292 A 7/1992 Lomas
5,129,624 A 7/1992 Icenhower et al.
5,138,891 A 8/1992 Johnson
5,139,649 A 8/1992 Owen et al.
5,145,785 A 9/1992 Maggard et al.
5,149,261 A 9/1992 Suwa et al.
5,154,558 A 10/1992 McCallion
5,160,426 A 11/1992 Avidan
5,170,911 A 12/1992 Della Riva
5,174,250 A 12/1992 Lane
5,174,345 A 12/1992 Kesterman et al.
5,178,363 A 1/1993 Icenhower et al.
5,196,110 A 3/1993 Swart et al.
5,201,850 A 4/1993 Lenhardt et al.
5,203,370 A 4/1993 Block et al.
5,211,838 A 5/1993 Staubs et al.
5,212,129 A 5/1993 Lomas
5,221,463 A 6/1993 Kamienski et al.
5,223,714 A 6/1993 Maggard
5,225,679 A 7/1993 Clark et al.
5,230,498 A 7/1993 Wood et al.
5,235,999 A 8/1993 Lindquist et al.
5,236,765 A 8/1993 Cordia et al.
5,243,546 A 9/1993 Maggard
5,246,860 A 9/1993 Hutchins et al.
5,246,868 A 9/1993 Busch et al.
5,248,408 A 9/1993 Owen
5,250,807 A 10/1993 Sontvedt
5,257,530 A 11/1993 Beattie et al.
5,258,115 A 11/1993 Heck et al.
5,258,117 A 11/1993 Kolstad et al.
5,262,645 A 11/1993 Lambert et al.
5,263,682 A 11/1993 Covert et al.
5,301,560 A 4/1994 Anderson et al.
5,302,294 A 4/1994 Schubert
5,316,448 A 5/1994 Ziegler et al.
5,320,671 A 6/1994 Schilling
5,326,074 A 7/1994 Spock et al.
5,328,505 A 7/1994 Schilling
5,328,591 A 7/1994 Raterman
5,332,492 A 7/1994 Maurer et al.
5,338,439 A 8/1994 Owen et al.
5,348,645 A 9/1994 Maggard et al.
5,349,188 A 9/1994 Maggard
5,349,189 A 9/1994 Maggard
5,354,451 A 10/1994 Goldstein et al.
5,354,453 A 10/1994 Bhatia
5,361,643 A 11/1994 Boyd et al.
5,362,965 A 11/1994 Maggard
5,370,146 A 12/1994 King et al.
5,370,790 A 12/1994 Maggard et al.
5,372,270 A 12/1994 Rosenkrantz
5,372,352 A 12/1994 Smith et al.
5,381,002 A 1/1995 Morrow et al.
5,388,805 A 2/1995 Bathrick et al.
5,389,232 A 2/1995 Adewuyi et al.
5,404,015 A 4/1995 Chimenti et al.
5,415,025 A 5/1995 Bartman et al.
5,416,323 A 5/1995 Hoots et al.
5,417,843 A 5/1995 Swart et al.
5,417,846 A 5/1995 Renard
5,423,446 A 6/1995 Johnson
5,431,067 A 7/1995 Anderson et al.
5,433,120 A 7/1995 Boyd et al.
5,435,436 A 7/1995 Manley et al.
5,443,716 A 8/1995 Anderson et al.
5,446,681 A 8/1995 Gethner et al.
5,452,232 A 9/1995 Espinosa et al.
RE35,046 E 10/1995 Hettinger et al.
5,459,677 A 10/1995 Kowalski et al.
5,472,875 A 12/1995 Monticello
5,474,607 A 12/1995 Holleran
5,475,612 A 12/1995 Espinosa et al.
5,476,117 A 12/1995 Pakula
5,490,085 A 2/1996 Lambert et al.
5,492,617 A 2/1996 Trimble et al.
5,494,079 A 2/1996 Tiedemann
5,507,326 A 4/1996 Cadman et al.
5,510,265 A 4/1996 Monticello
5,516,969 A 5/1996 Krasznai et al.
5,532,487 A 7/1996 Brearley et al.
5,540,893 A 7/1996 English
5,549,814 A 8/1996 Zinke
5,556,222 A 9/1996 Chen
5,559,295 A 9/1996 Sheryll
5,560,509 A 10/1996 Laverman et al.
5,569,808 A 10/1996 Cansell et al.
5,573,032 A 11/1996 Lenz et al.
5,584,985 A 12/1996 Lomas
5,596,196 A 1/1997 Cooper et al.
5,600,134 A 2/1997 Ashe et al.
5,647,961 A 7/1997 Lofland
5,652,145 A 7/1997 Cody et al.
5,675,071 A 10/1997 Cody et al.
5,681,749 A 10/1997 Ramamoorthy
5,684,580 A 11/1997 Cooper et al.
5,699,269 A 12/1997 Ashe et al.
5,699,270 A 12/1997 Ashe et al.
5,712,481 A 1/1998 Welch et al.
5,712,797 A 1/1998 Descales et al.
5,713,401 A 2/1998 Weeks
5,716,055 A 2/1998 Wilkinson et al.
5,717,209 A 2/1998 Bigman et al.
5,740,073 A 4/1998 Bages et al.
5,744,024 A 4/1998 Sullivan, III et al.
5,744,702 A 4/1998 Roussis et al.
5,746,906 A 5/1998 McHenry et al.
5,751,415 A 5/1998 Smith et al.
5,758,514 A 6/1998 Genung et al.
5,763,883 A 6/1998 Descales et al.
5,800,697 A 9/1998 Lengemann
5,817,517 A 10/1998 Perry et al.
5,822,058 A 10/1998 Adler-Golden et al.
5,834,539 A 11/1998 Krivohlavek
5,837,130 A 11/1998 Crossland
5,853,455 A 12/1998 Gibson
5,856,869 A 1/1999 Cooper et al.
5,858,207 A 1/1999 Lomas
5,858,210 A 1/1999 Richardson
5,858,212 A 1/1999 Darcy
5,861,228 A 1/1999 Descales et al.
5,862,060 A 1/1999 Murray, Jr.
5,865,441 A 2/1999 Orlowski
5,883,363 A 3/1999 Motoyoshi et al.
5,885,439 A 3/1999 Glover
5,892,228 A 4/1999 Cooper et al.
5,895,506 A 4/1999 Cook et al.
5,916,433 A 6/1999 Tejada et al.
5,919,354 A 7/1999 Bartek
5,935,415 A 8/1999 Haizmann et al.
5,940,176 A 8/1999 Knapp
5,972,171 A 10/1999 Ross et al.
5,979,491 A 11/1999 Gonsior
5,997,723 A 12/1999 Wiehe et al.
6,015,440 A 1/2000 Noureddini
6,025,305 A 2/2000 Aldrich et al.
6,026,841 A 2/2000 Kozik
6,040,186 A 3/2000 Lewis
6,047,602 A 4/2000 Lynnworth
6,056,005 A 5/2000 Piotrowski et al.
6,062,274 A 5/2000 Pettesch
6,063,263 A 5/2000 Palmas
6,063,265 A 5/2000 Chiyoda et al.
6,070,128 A 5/2000 Descales et al.
6,072,576 A 6/2000 McDonald et al.
6,076,864 A 6/2000 Levivier et al.
6,087,662 A 7/2000 Wilt et al.
6,093,867 A 7/2000 Ladwig et al.
6,099,607 A 8/2000 Haslebacher
6,099,616 A 8/2000 Jenne et al.
6,100,975 A 8/2000 Smith et al.
6,102,655 A 8/2000 Kreitmeier
6,105,441 A 8/2000 Conner et al.

(56) References Cited

U.S. PATENT DOCUMENTS 6,107,631 A 8/2000 He
6,117,812 A 9/2000 Gao et al.
6,130,095 A 10/2000 Shearer
6,140,647 A 10/2000 Welch et al.
6,153,091 A 11/2000 Sechrist et al.
6,155,294 A 12/2000 Cornford et al.
6,162,644 A 12/2000 Choi et al.
6,165,350 A 12/2000 Lokhandwala et al.
6,169,218 B1 1/2001 Hearn
6,171,052 B1 1/2001 Aschenbruck et al.
6,174,501 B1 1/2001 Noureddini
6,190,535 B1 2/2001 Kalnes et al.
6,203,585 B1 3/2001 Majerczak
6,235,104 B1 5/2001 Chattopadhyay et al.
6,258,987 B1 7/2001 Schmidt et al.
6,271,518 B1 8/2001 Boehm et al.
6,274,785 B1 8/2001 Gore
6,284,128 B1 9/2001 Glover et al.
6,296,812 B1 10/2001 Gauthier et al.
6,312,586 B1 11/2001 Kalnes et al.
6,315,815 B1 11/2001 Spadaccini
6,324,895 B1 12/2001 Chitnis et al.
6,328,348 B1 12/2001 Cornford et al.
6,331,436 B1 12/2001 Richardson et al.
6,348,074 B2 2/2002 Wenzel
6,350,371 B1 2/2002 Lokhandwala et al.
6,368,495 B1 4/2002 Kocal et al.
6,382,633 B1 5/2002 Hashiguchi et al.
6,390,673 B1 5/2002 Camburn
6,395,228 B1 5/2002 Maggard et al.
6,398,518 B1 6/2002 Ingistov
6,399,800 B1 6/2002 Haas et al.
6,420,181 B1 7/2002 Novak
6,422,035 B1 7/2002 Phillippe
6,435,279 B1 8/2002 Howe et al.
6,446,446 B1 9/2002 Cowans
6,446,729 B1 9/2002 Bixenman et al.
6,451,197 B1 9/2002 Kalnes
6,454,935 B1 9/2002 Lesieur et al.
6,467,303 B2 10/2002 Ross
6,482,762 B1 11/2002 Ruffin et al.
6,503,460 B1 1/2003 Miller et al.
6,528,047 B2 3/2003 Arif et al.
6,540,797 B1 4/2003 Scott et al.
6,558,531 B2 5/2003 Steffens et al.
6,589,323 B1 7/2003 Korin
6,592,448 B1 7/2003 Williams
6,609,888 B1 8/2003 Ingistov
6,622,490 B2 9/2003 Ingistov
6,644,935 B2 11/2003 Ingistov
6,660,895 B1 12/2003 Brunet et al.
6,672,858 B1 1/2004 Benson et al.
6,733,232 B2 5/2004 Ingistov et al.
6,733,237 B2 5/2004 Ingistov
6,736,961 B2 5/2004 Plummer et al.
6,740,226 B2 5/2004 Mehra et al.
6,772,581 B2 8/2004 Ojiro et al.
6,772,741 B1 8/2004 Pittel et al.
6,814,941 B1 11/2004 Naunheimer et al.
6,824,673 B1 11/2004 Ellis et al.
6,827,841 B2 12/2004 Kiser et al.
6,835,223 B2 12/2004 Walker et al.
6,841,133 B2 1/2005 Niewiedzial et al.
6,842,702 B2 1/2005 Haaland et al.
6,854,346 B2 2/2005 Nimberger
6,858,128 B1 2/2005 Hoehn et al.
6,866,771 B2 3/2005 Lomas et al.
6,869,521 B2 3/2005 Lomas
6,897,071 B2 5/2005 Sonbul
6,962,484 B2 11/2005 Brandl et al.
7,013,718 B2 3/2006 Ingistov et al.
7,035,767 B2 4/2006 Archer et al.
7,048,254 B2 5/2006 Laurent et al.
7,074,321 B1 7/2006 Kalnes
7,078,005 B2 7/2006 Smith et al.
7,087,153 B1 8/2006 Kalnes
7,156,123 B2 1/2007 Welker et al.
7,172,686 B1 2/2007 Ji et al.
7,174,715 B2 2/2007 Armitage et al.
7,194,369 B2 3/2007 Lundstedt et al.
7,213,413 B2 5/2007 Battiste et al.
7,225,840 B1 6/2007 Craig et al.
7,228,250 B2 6/2007 Naiman et al.
7,244,350 B2 7/2007 Kar et al.
7,252,755 B2 8/2007 Kiser et al.
7,255,531 B2 8/2007 Ingistov
7,260,499 B2 8/2007 Watzke et al.
7,291,257 B2 11/2007 Ackerson et al.
7,332,132 B2 2/2008 Hedrick et al.
7,404,411 B2 7/2008 Welch et al.
7,419,583 B2 9/2008 Nieskens et al.
7,445,936 B2 11/2008 O'Connor et al.
7,459,081 B2 12/2008 Koenig
7,485,801 B1 2/2009 Pulter et al.
7,487,955 B1 2/2009 Buercklin
7,501,285 B1 3/2009 Triche et al.
7,551,420 B2 6/2009 Cerqueira et al.
7,571,765 B2 8/2009 Themig
7,637,970 B1 12/2009 Fox et al.
7,669,653 B2 3/2010 Craster et al.
7,682,501 B2 3/2010 Soni et al.
7,686,280 B2 3/2010 Lowery
7,857,964 B2 12/2010 Mashiko et al.
7,866,346 B1 1/2011 Walters
7,895,011 B2 2/2011 Youssefi et al.
7,914,601 B2 3/2011 Farr et al.
7,931,803 B2 4/2011 Buchanan
7,932,424 B2 4/2011 Fujimoto et al.
7,939,335 B1 5/2011 Triche et al.
7,981,361 B2 7/2011 Bacik
7,988,753 B1 8/2011 Fox et al.
7,993,514 B2 8/2011 Schlueter
8,007,662 B2 8/2011 Lomas et al.
8,017,910 B2 9/2011 Sharpe
8,029,662 B2 10/2011 Varma et al.
8,037,938 B2 10/2011 Jardim De Azevedo et al.
8,038,774 B2 10/2011 Peng
8,064,052 B2 11/2011 Feitisch et al.
8,066,867 B2 11/2011 Dziabala
8,080,426 B1 12/2011 Moore et al.
8,127,845 B2 3/2012 Assal
8,193,401 B2 6/2012 McGehee et al.
8,236,566 B2 8/2012 Carpenter et al.
8,286,673 B1 10/2012 Recker et al.
8,354,065 B1 1/2013 Sexton
8,360,118 B2 1/2013 Fleischer et al.
8,370,082 B2 2/2013 De Peinder et al.
8,388,830 B2 3/2013 Sohn et al.
8,389,285 B2 3/2013 Carpenter et al.
8,397,803 B2 3/2013 Crabb et al.
8,397,820 B2 3/2013 Fehr et al.
8,404,103 B2 3/2013 Dziabala
8,434,800 B1 5/2013 LeBlanc
8,481,942 B2 7/2013 Mertens
8,506,656 B1 8/2013 Turocy
8,518,131 B2 8/2013 Mattingly et al.
8,524,180 B2 9/2013 Canari et al.
8,569,068 B2 10/2013 Carpenter et al.
8,579,139 B1 11/2013 Sablak
8,591,814 B2 11/2013 Hodges
8,609,048 B1 12/2013 Beadle
8,647,415 B1 2/2014 De Haan et al.
8,670,945 B2 3/2014 van Schie
8,685,232 B2 4/2014 Mandal et al.
8,735,820 B2 5/2014 Mertens
8,753,502 B1 6/2014 Sexton et al.
8,764,970 B1 7/2014 Moore et al.
8,778,823 B1 7/2014 Oyekan et al.
8,781,757 B2 7/2014 Farquharson et al.
8,784,645 B2 7/2014 Guchi et al.
8,829,258 B2 9/2014 Gong et al.
8,916,041 B2 12/2014 Van Den Berg et al.
8,932,458 B1 1/2015 Gianzon et al.
8,986,402 B2 3/2015 Kelly

(56) References Cited

U.S. PATENT DOCUMENTS

| | | | |
|---|---|---|---|
| 8,987,537 | B1 | 3/2015 | Droubi et al. |
| 8,999,011 | B2 | 4/2015 | Stern et al. |
| 8,999,012 | B2 | 4/2015 | Kelly et al. |
| 9,011,674 | B2 | 4/2015 | Milam et al. |
| 9,057,035 | B1 | 6/2015 | Kraus et al. |
| 9,097,423 | B2 | 8/2015 | Kraus et al. |
| 9,109,176 | B2 | 8/2015 | Stern et al. |
| 9,109,177 | B2 | 8/2015 | Freel et al. |
| 9,138,738 | B1 | 9/2015 | Glover et al. |
| 9,216,376 | B2 | 12/2015 | Liu et al. |
| 9,272,241 | B2 | 3/2016 | Königsson |
| 9,273,867 | B2 | 3/2016 | Buzinski et al. |
| 9,279,748 | B1 | 3/2016 | Hughes et al. |
| 9,289,715 | B2 | 3/2016 | Høy-Petersen et al. |
| 9,315,403 | B1 | 4/2016 | Laur et al. |
| 9,371,493 | B1 | 6/2016 | Oyekan |
| 9,371,494 | B2 | 6/2016 | Oyekan et al. |
| 9,377,340 | B2 | 6/2016 | Hägg |
| 9,393,520 | B2 | 7/2016 | Gomez |
| 9,410,102 | B2 | 8/2016 | Eaton et al. |
| 9,428,695 | B2 | 8/2016 | Narayanaswamy et al. |
| 9,453,169 | B2 | 9/2016 | Stippich, Jr. et al. |
| 9,458,396 | B2 | 10/2016 | Weiss et al. |
| 9,487,718 | B2 | 11/2016 | Kraus et al. |
| 9,499,758 | B2 | 11/2016 | Droubi et al. |
| 9,500,300 | B2 | 11/2016 | Daigle |
| 9,506,649 | B2 | 11/2016 | Rennie et al. |
| 9,580,662 | B1 | 2/2017 | Moore |
| 9,624,448 | B2 | 4/2017 | Joo et al. |
| 9,650,580 | B2 | 5/2017 | Merdrignac et al. |
| 9,657,241 | B2 | 5/2017 | Craig et al. |
| 9,662,597 | B1 | 5/2017 | Formoso |
| 9,663,729 | B2 | 5/2017 | Baird et al. |
| 9,665,693 | B2 | 5/2017 | Saeger et al. |
| 9,709,545 | B2 | 7/2017 | Mertens |
| 9,757,686 | B2 | 9/2017 | Peng |
| 9,789,290 | B2 | 10/2017 | Forsell |
| 9,803,152 | B2 | 10/2017 | Kar et al. |
| 9,834,731 | B2 | 12/2017 | Weiss et al. |
| 9,840,674 | B2 | 12/2017 | Weiss et al. |
| 9,873,080 | B2 | 1/2018 | Richardson |
| 9,878,300 | B2 | 1/2018 | Norling |
| 9,890,907 | B1 | 2/2018 | Highfield et al. |
| 9,891,198 | B2 | 2/2018 | Sutan |
| 9,895,649 | B2 | 2/2018 | Brown et al. |
| 9,896,630 | B2 | 2/2018 | Weiss et al. |
| 9,914,094 | B2 | 3/2018 | Jenkins et al. |
| 9,920,270 | B2 | 3/2018 | Robinson et al. |
| 9,925,486 | B1 | 3/2018 | Botti |
| 9,982,788 | B1 | 5/2018 | Maron |
| 9,988,585 | B2 | 6/2018 | Hayasaka et al. |
| 10,047,299 | B2 | 8/2018 | Rubin-Pitel et al. |
| 10,048,100 | B1 | 8/2018 | Workman, Jr. |
| 10,087,397 | B2 | 10/2018 | Phillips et al. |
| 10,099,175 | B2 | 10/2018 | Takashashi et al. |
| 10,150,078 | B2 | 12/2018 | Komatsu et al. |
| 10,228,708 | B2 | 3/2019 | Lambert et al. |
| 10,239,034 | B1 | 3/2019 | Sexton |
| 10,253,269 | B2 | 4/2019 | Cantley et al. |
| 10,266,779 | B2 | 4/2019 | Weiss et al. |
| 10,295,521 | B2 | 5/2019 | Mertens |
| 10,308,884 | B2 | 6/2019 | Klussman |
| 10,316,263 | B2 | 6/2019 | Rubin-Pitel et al. |
| 10,384,157 | B2 | 8/2019 | Balcik |
| 10,435,339 | B2 | 10/2019 | Larsen et al. |
| 10,435,636 | B2 | 10/2019 | Johnson et al. |
| 10,443,000 | B2 | 10/2019 | Lomas |
| 10,443,006 | B1 | 10/2019 | Fruchey et al. |
| 10,457,881 | B2 | 10/2019 | Droubi et al. |
| 10,479,943 | B1 | 11/2019 | Liu et al. |
| 10,494,579 | B2 | 12/2019 | Wrigley et al. |
| 10,495,570 | B2 | 12/2019 | Owen et al. |
| 10,501,699 | B2 | 12/2019 | Robinson et al. |
| 10,526,547 | B2 | 1/2020 | Larsen et al. |
| 10,533,141 | B2 | 1/2020 | Moore et al. |
| 10,563,130 | B2 | 2/2020 | Narayanaswamy et al. |
| 10,563,132 | B2 | 2/2020 | Moore et al. |
| 10,563,133 | B2 | 2/2020 | Moore et al. |
| 10,570,078 | B2 | 2/2020 | Larsen et al. |
| 10,577,551 | B2 | 3/2020 | Kraus et al. |
| 10,584,287 | B2 | 3/2020 | Klussman et al. |
| 10,604,709 | B2 | 3/2020 | Moore et al. |
| 10,640,719 | B2 | 5/2020 | Freel et al. |
| 10,655,074 | B2 | 5/2020 | Moore et al. |
| 10,696,906 | B2 | 6/2020 | Cantley et al. |
| 10,808,184 | B1 | 10/2020 | Moore |
| 10,836,966 | B2 | 11/2020 | Moore et al. |
| 10,876,053 | B2 | 12/2020 | Klussman et al. |
| 10,954,456 | B2 | 3/2021 | Moore et al. |
| 10,961,468 | B2 | 3/2021 | Moore et al. |
| 10,962,259 | B2 | 3/2021 | Shah et al. |
| 10,968,403 | B2 | 4/2021 | Moore |
| 11,021,662 | B2 | 6/2021 | Moore et al. |
| 11,098,255 | B2 | 8/2021 | Larsen et al. |
| 11,124,714 | B2 | 9/2021 | Eller et al. |
| 11,136,513 | B2 | 10/2021 | Moore et al. |
| 11,164,406 | B2 | 11/2021 | Meroux et al. |
| 11,168,270 | B1 | 11/2021 | Moore |
| 11,175,039 | B2 | 11/2021 | Lochschmied et al. |
| 11,203,719 | B2 | 12/2021 | Cantley et al. |
| 11,203,722 | B2 | 12/2021 | Moore et al. |
| 11,214,741 | B2 | 1/2022 | Davdov et al. |
| 11,306,253 | B2 | 4/2022 | Timken et al. |
| 11,319,262 | B2 | 5/2022 | Wu et al. |
| 11,352,577 | B2 | 6/2022 | Woodchick et al. |
| 11,352,578 | B2 | 6/2022 | Eller et al. |
| 11,384,301 | B2 | 7/2022 | Eller et al. |
| 11,421,162 | B2 | 8/2022 | Pradeep et al. |
| 11,460,478 | B2 | 10/2022 | Sugiyama et al. |
| 11,467,172 | B1 | 10/2022 | Mitzel et al. |
| 11,542,441 | B2 | 1/2023 | Larsen et al. |
| 11,578,638 | B2 | 2/2023 | Thobe |
| 11,634,647 | B2 | 4/2023 | Cantley et al. |
| 11,667,858 | B2 | 6/2023 | Eller et al. |
| 11,692,141 | B2 | 7/2023 | Larsen et al. |
| 11,702,600 | B2 | 7/2023 | Sexton et al. |
| 11,715,950 | B2 | 8/2023 | Miller et al. |
| 11,720,526 | B2 | 8/2023 | Miller et al. |
| 11,802,257 | B2 | 10/2023 | Short et al. |
| 11,835,450 | B2 | 12/2023 | Bledsoe, Jr. et al. |
| 11,860,069 | B2 | 1/2024 | Bledsoe, Jr |
| 11,891,581 | B2 | 2/2024 | Cantley et al. |
| 11,898,109 | B2 | 2/2024 | Sexton et al. |
| 11,905,468 | B2 | 2/2024 | Sexton et al. |
| 11,905,479 | B2 | 2/2024 | Eller et al. |
| 11,906,423 | B2 | 2/2024 | Bledsoe, Jr |
| 11,920,096 | B2 | 3/2024 | Woodchick et al. |
| 11,921,035 | B2 | 3/2024 | Bledsoe, Jr. et al. |
| 11,970,664 | B2 | 4/2024 | Larsen |
| 11,975,316 | B2 | 5/2024 | Zalewski |
| 12,000,720 | B2 | 6/2024 | Langlois, III |
| 12,018,216 | B2 | 6/2024 | Larsen et al. |
| 12,031,094 | B2 | 7/2024 | Sexton et al. |
| 12,031,676 | B2 | 7/2024 | Craig et al. |
| 12,037,548 | B2 | 7/2024 | Larsen et al. |
| 12,163,878 | B2 | 12/2024 | Bledsoe, Jr |
| 2002/0014068 | A1 | 2/2002 | Mittricker et al. |
| 2002/0061633 | A1 | 5/2002 | Marsh |
| 2002/0170431 | A1 | 11/2002 | Chang et al. |
| 2003/0041518 | A1 | 3/2003 | Wallace et al. |
| 2003/0113598 | A1 | 6/2003 | Chow et al. |
| 2003/0188536 | A1 | 10/2003 | Mittricker |
| 2003/0194322 | A1 | 10/2003 | Brandl et al. |
| 2004/0010170 | A1 | 1/2004 | Vickers |
| 2004/0033617 | A1 | 2/2004 | Sonbul |
| 2004/0040201 | A1 | 3/2004 | Roos et al. |
| 2004/0079431 | A1 | 4/2004 | Kissell |
| 2004/0121472 | A1 | 6/2004 | Nemana et al. |
| 2004/0129605 | A1 | 7/2004 | Goldstein et al. |
| 2004/0139858 | A1 | 7/2004 | Entezarian |
| 2004/0154610 | A1 | 8/2004 | Hopp et al. |
| 2004/0232050 | A1 | 11/2004 | Martin et al. |
| 2004/0251170 | A1 | 12/2004 | Chiyoda et al. |
| 2005/0042151 | A1 | 2/2005 | Alward et al. |

(56) References Cited

U.S. PATENT DOCUMENTS

| | | | | |
|---|---|---|---|---|
| 2005/0088653 | A1 | 4/2005 | Coates et al. | |
| 2005/0123466 | A1 | 6/2005 | Sullivan | |
| 2005/0139516 | A1 | 6/2005 | Nieskens et al. | |
| 2005/0143609 | A1 | 6/2005 | Wolf et al. | |
| 2005/0150820 | A1 | 7/2005 | Guo | |
| 2005/0216214 | A1 | 9/2005 | Gorin | |
| 2005/0229777 | A1 | 10/2005 | Brown | |
| 2006/0037237 | A1 | 2/2006 | Copeland et al. | |
| 2006/0042701 | A1 | 3/2006 | Jansen | |
| 2006/0049082 | A1 | 3/2006 | Niccum et al. | |
| 2006/0091059 | A1 | 5/2006 | Barbaro | |
| 2006/0162243 | A1 | 7/2006 | Wolf | |
| 2006/0169305 | A1 | 8/2006 | Jansen et al. | |
| 2006/0210456 | A1 | 9/2006 | Bruggendick | |
| 2006/0169064 | A1 | 10/2006 | Anschutz et al. | |
| 2006/0220383 | A1 | 10/2006 | Erickson | |
| 2007/0003450 | A1 | 1/2007 | Burdett et al. | |
| 2007/0082407 | A1 | 4/2007 | Little, III | |
| 2007/0112258 | A1 | 5/2007 | Soyemi et al. | |
| 2007/0202027 | A1 | 8/2007 | Walker et al. | |
| 2007/0212271 | A1 | 9/2007 | Kennedy et al. | |
| 2007/0212790 | A1 | 9/2007 | Welch et al. | |
| 2007/0215521 | A1 | 9/2007 | Havlik et al. | |
| 2007/0243556 | A1 | 10/2007 | Wachs | |
| 2007/0283812 | A1 | 12/2007 | Liu et al. | |
| 2008/0078693 | A1 | 4/2008 | Sexton et al. | |
| 2008/0078694 | A1 | 4/2008 | Sexton et al. | |
| 2008/0078695 | A1 | 4/2008 | Sexton et al. | |
| 2008/0081844 | A1 | 4/2008 | Shires et al. | |
| 2008/0087592 | A1 | 4/2008 | Buchanan | |
| 2008/0092436 | A1* | 4/2008 | Seames | C10G 3/45 44/308 |
| 2008/0109107 | A1 | 5/2008 | Stefani et al. | |
| 2008/0149486 | A1 | 6/2008 | Greaney et al. | |
| 2008/0156696 | A1 | 7/2008 | Niccum et al. | |
| 2008/0207974 | A1 | 8/2008 | McCoy et al. | |
| 2008/0211505 | A1 | 9/2008 | Trygstad et al. | |
| 2008/0247942 | A1 | 10/2008 | Kandziora et al. | |
| 2008/0253936 | A1 | 10/2008 | Abhari | |
| 2009/0151250 | A1 | 6/2009 | Agrawal | |
| 2009/0152454 | A1 | 6/2009 | Nelson et al. | |
| 2009/0158824 | A1 | 6/2009 | Brown et al. | |
| 2010/0127217 | A1 | 5/2010 | Lightowlers et al. | |
| 2010/0131247 | A1 | 5/2010 | Carpenter et al. | |
| 2010/0166602 | A1 | 7/2010 | Bacik | |
| 2010/0243235 | A1 | 9/2010 | Caldwell et al. | |
| 2010/0301044 | A1 | 12/2010 | Sprecher | |
| 2010/0318118 | A1 | 12/2010 | Forsell | |
| 2011/0147267 | A1 | 6/2011 | Kaul et al. | |
| 2011/0155646 | A1 | 6/2011 | Karas et al. | |
| 2011/0175032 | A1 | 7/2011 | Günther | |
| 2011/0186307 | A1 | 8/2011 | Derby | |
| 2011/0220586 | A1 | 9/2011 | Levitt | |
| 2011/0237856 | A1 | 9/2011 | Mak | |
| 2011/0247835 | A1 | 10/2011 | Crabb | |
| 2011/0277377 | A1 | 11/2011 | Novak et al. | |
| 2011/0299076 | A1 | 12/2011 | Feitisch et al. | |
| 2011/0319698 | A1 | 12/2011 | Sohn et al. | |
| 2012/0012342 | A1 | 1/2012 | Wilkin et al. | |
| 2012/0125813 | A1 | 5/2012 | Bridges et al. | |
| 2012/0125814 | A1 | 5/2012 | Sanchez et al. | |
| 2012/0131853 | A1 | 5/2012 | Thacker et al. | |
| 2012/0222550 | A1 | 9/2012 | Ellis | |
| 2012/0272715 | A1 | 11/2012 | Kriel et al. | |
| 2013/0014431 | A1 | 1/2013 | Jin et al. | |
| 2013/0109895 | A1 | 5/2013 | Novak et al. | |
| 2013/0112313 | A1 | 5/2013 | Donnelly et al. | |
| 2013/0125619 | A1 | 5/2013 | Wang | |
| 2013/0186739 | A1 | 7/2013 | Trompiz | |
| 2013/0192339 | A1 | 8/2013 | Kriel et al. | |
| 2013/0225897 | A1 | 8/2013 | Candelon et al. | |
| 2013/0288355 | A1 | 10/2013 | DeWitte et al. | |
| 2013/0302738 | A1 | 11/2013 | Rennie | |
| 2013/0334027 | A1 | 12/2013 | Winter et al. | |
| 2013/0342203 | A1 | 12/2013 | Trygstad et al. | |
| 2014/0019052 | A1 | 1/2014 | Zaeper et al. | |
| 2014/0024873 | A1 | 1/2014 | De Haan et al. | |
| 2014/0041150 | A1 | 2/2014 | Sjoberg | |
| 2014/0121428 | A1 | 5/2014 | Wang et al. | |
| 2014/0229010 | A1 | 8/2014 | Farquharson et al. | |
| 2014/0251129 | A1 | 9/2014 | Upadhyay | |
| 2014/0296057 | A1 | 10/2014 | Ho et al. | |
| 2014/0299515 | A1 | 10/2014 | Weiss et al. | |
| 2014/0311953 | A1 | 10/2014 | Chimenti et al. | |
| 2014/0316176 | A1 | 10/2014 | Fjare et al. | |
| 2014/0332444 | A1 | 11/2014 | Weiss et al. | |
| 2014/0353138 | A1 | 12/2014 | Amale et al. | |
| 2014/0374322 | A1 | 12/2014 | Venkatesh | |
| 2015/0005547 | A1 | 1/2015 | Freel et al. | |
| 2015/0005548 | A1 | 1/2015 | Freel et al. | |
| 2015/0007720 | A1 | 1/2015 | Vu | |
| 2015/0034570 | A1 | 2/2015 | Andreussi | |
| 2015/0034599 | A1 | 2/2015 | Hunger et al. | |
| 2015/0057477 | A1 | 2/2015 | Ellig et al. | |
| 2015/0071028 | A1 | 3/2015 | Glanville | |
| 2015/0122704 | A1 | 5/2015 | Kumar et al. | |
| 2015/0166426 | A1 | 6/2015 | Wegerer et al. | |
| 2015/0240167 | A1 | 8/2015 | Kulprathipanja et al. | |
| 2015/0240174 | A1 | 8/2015 | Bru et al. | |
| 2015/0337207 | A1 | 11/2015 | Chen et al. | |
| 2015/0337225 | A1 | 11/2015 | Droubi et al. | |
| 2015/0337226 | A1 | 11/2015 | Tardif et al. | |
| 2015/0353851 | A1 | 12/2015 | Buchanan | |
| 2016/0045918 | A1 | 2/2016 | Lapham | |
| 2016/0090539 | A1 | 3/2016 | Frey et al. | |
| 2016/0122662 | A1 | 5/2016 | Weiss et al. | |
| 2016/0122666 | A1 | 5/2016 | Weiss et al. | |
| 2016/0160139 | A1 | 6/2016 | Dawe et al. | |
| 2016/0168481 | A1 | 6/2016 | Ray et al. | |
| 2016/0175749 | A1 | 6/2016 | Suda | |
| 2016/0244677 | A1 | 8/2016 | Froehle | |
| 2016/0298851 | A1 | 10/2016 | Brickwood et al. | |
| 2016/0312127 | A1 | 10/2016 | Frey et al. | |
| 2016/0312130 | A1 | 10/2016 | Majcher et al. | |
| 2017/0009163 | A1 | 1/2017 | Kraus et al. | |
| 2017/0115190 | A1 | 4/2017 | Hall et al. | |
| 2017/0128859 | A1 | 5/2017 | Levitt | |
| 2017/0131728 | A1 | 5/2017 | Lambert et al. | |
| 2017/0151526 | A1 | 6/2017 | Cole | |
| 2017/0183575 | A1 | 6/2017 | Rubin-Pitel et al. | |
| 2017/0198910 | A1 | 7/2017 | Garg | |
| 2017/0226434 | A1 | 8/2017 | Zimmerman | |
| 2017/0233670 | A1 | 8/2017 | Feustel et al. | |
| 2017/0234335 | A1 | 8/2017 | LeBlanc et al. | |
| 2017/0269559 | A1 | 9/2017 | Trygstad | |
| 2018/0017469 | A1 | 1/2018 | English et al. | |
| 2018/0037308 | A1 | 2/2018 | Lee et al. | |
| 2018/0080958 | A1 | 3/2018 | Marchese et al. | |
| 2018/0094809 | A1 | 4/2018 | Lochschmied | |
| 2018/0119039 | A1 | 5/2018 | Tanaka et al. | |
| 2018/0134974 | A1 | 5/2018 | Weiss et al. | |
| 2018/0163144 | A1 | 6/2018 | Weiss et al. | |
| 2018/0179457 | A1 | 6/2018 | Mukherjee et al. | |
| 2018/0202607 | A1 | 7/2018 | McBride | |
| 2018/0230389 | A1 | 8/2018 | Moore et al. | |
| 2018/0246142 | A1 | 8/2018 | Glover | |
| 2018/0355263 | A1 | 12/2018 | Moore et al. | |
| 2018/0361312 | A1 | 12/2018 | Dutra e Mello et al. | |
| 2018/0371325 | A1 | 12/2018 | Streiff et al. | |
| 2019/0002772 | A1 | 1/2019 | Moore et al. | |
| 2019/0010405 | A1 | 1/2019 | Moore et al. | |
| 2019/0010408 | A1 | 1/2019 | Moore et al. | |
| 2019/0016980 | A1 | 1/2019 | Kar et al. | |
| 2019/0093026 | A1 | 3/2019 | Wohaibi et al. | |
| 2019/0099706 | A1 | 4/2019 | Sampath | |
| 2019/0100702 | A1 | 4/2019 | Cantley et al. | |
| 2019/0127651 | A1 | 5/2019 | Kar et al. | |
| 2019/0128160 | A1 | 5/2019 | Peng | |
| 2019/0136144 | A1 | 5/2019 | Wohaibi et al. | |
| 2019/0153340 | A1 | 5/2019 | Weiss et al. | |
| 2019/0153942 | A1 | 5/2019 | Wohaibi et al. | |
| 2019/0169509 | A1 | 6/2019 | Cantley et al. | |
| 2019/0185772 | A1 | 6/2019 | Berkhous et al. | |
| 2019/0201841 | A1 | 7/2019 | McClelland | |

(56) References Cited

U.S. PATENT DOCUMENTS

2019/0203130 A1 7/2019 Mukherjee
2019/0218466 A1* 7/2019 Slade ...................... C10L 1/026
2019/0233741 A1 8/2019 Moore et al.
2019/0292465 A1 9/2019 McBride
2019/0338205 A1 11/2019 Ackerson et al.
2019/0382668 A1 12/2019 Klussman et al.
2019/0382672 A1* 12/2019 Sorensen ............... C10G 45/56
2020/0041481 A1 2/2020 Burgess
2020/0049675 A1 2/2020 Ramirez
2020/0080881 A1 3/2020 Langlois et al.
2020/0095509 A1 3/2020 Moore et al.
2020/0123458 A1 4/2020 Moore et al.
2020/0181502 A1 6/2020 Paasikallio et al.
2020/0191385 A1 6/2020 Carroll
2020/0199462 A1 6/2020 Klussman et al.
2020/0208068 A1* 7/2020 Hossain .................... C01B 3/02
2020/0246743 A1 8/2020 Sorensen
2020/0291316 A1 9/2020 Robbins et al.
2020/0312470 A1 10/2020 Craig et al.
2020/0316513 A1 10/2020 Zhao
2020/0332198 A1 10/2020 Yang et al.
2020/0353456 A1 11/2020 Zalewski et al.
2020/0378600 A1 12/2020 Craig et al.
2020/0385644 A1 12/2020 Rogel et al.
2021/0002559 A1 1/2021 Larsen et al.
2021/0003502 A1 1/2021 Kirchmann et al.
2021/0033631 A1 2/2021 Field et al.
2021/0103304 A1 4/2021 Fogarty et al.
2021/0115344 A1 4/2021 Perkins et al.
2021/0181164 A1 6/2021 Shirkhan et al.
2021/0213382 A1 7/2021 Cole
2021/0238487 A1 8/2021 Moore et al.
2021/0253964 A1 8/2021 Eller et al.
2021/0253965 A1 8/2021 Woodchick et al.
2021/0261874 A1 8/2021 Eller et al.
2021/0284919 A1 9/2021 Moore et al.
2021/0292661 A1 9/2021 Klussman et al.
2021/0301210 A1 9/2021 Timken et al.
2021/0318280 A1 10/2021 Ludlum
2021/0396660 A1 12/2021 Zarrabian
2021/0403819 A1 12/2021 Moore et al.
2022/0040629 A1 2/2022 Edmoundson et al.
2022/0041939 A1 2/2022 Titta et al.
2022/0041940 A1 2/2022 Pradeep et al.
2022/0048019 A1 2/2022 Zalewski et al.
2022/0268694 A1 8/2022 Bledsoe et al.
2022/0298440 A1 9/2022 Woodchick et al.
2022/0299170 A1 9/2022 Raynor et al.
2022/0343229 A1 10/2022 Gruber et al.
2022/0357303 A1 11/2022 Zhu et al.
2023/0015077 A1 1/2023 Kim
2023/0078852 A1 3/2023 Campbell et al.
2023/0080192 A1 3/2023 Bledsoe et al.
2023/0082189 A1 3/2023 Bledsoe et al.
2023/0084329 A1 3/2023 Bledsoe et al.
2023/0087063 A1 3/2023 Mitzel et al.
2023/0089935 A1 3/2023 Bledsoe et al.
2023/0093452 A1 3/2023 Sexton et al.
2023/0111609 A1 4/2023 Sexton et al.
2023/0113140 A1 4/2023 Larsen et al.
2023/0118319 A1 4/2023 Sexton et al.
2023/0220286 A1 7/2023 Cantley et al.
2023/0241548 A1 8/2023 Holland et al.
2023/0242837 A1 8/2023 Short et al.
2023/0259080 A1 8/2023 Whikehart et al.
2023/0259088 A1 8/2023 Borup et al.
2023/0272290 A1 8/2023 Larsen et al.
2023/0295528 A1 9/2023 Eller et al.
2023/0332056 A1 10/2023 Larsen et al.
2023/0332058 A1 10/2023 Larsen et al.
2023/0357649 A1 11/2023 Sexton et al.
2023/0400184 A1 12/2023 Craig
2023/0416615 A1 12/2023 Larsen
2024/0011898 A1 1/2024 Bledsoe, Jr. et al.
2024/0115996 A1 4/2024 Rudd
2024/0117262 A1 4/2024 Eller
2024/0118194 A1 4/2024 Bledsoe, Jr
2024/0124790 A1 4/2024 Sexton
2024/0132786 A1 4/2024 Sexton
2024/0182803 A1 6/2024 Woodchick
2024/0189753 A1 6/2024 Esquivel
2024/0294837 A1 9/2024 Larsen
2024/0327723 A1 10/2024 Larsen
2024/0337352 A1 10/2024 Craig
2024/0377287 A1 11/2024 Markins
2024/0399279 A1 12/2024 Duong

FOREIGN PATENT DOCUMENTS

CA 2949201 11/2015
CA 2822742 12/2016
CA 3009808 7/2017
CA 2904903 8/2020
CA 3077045 9/2020
CA 2947431 3/2021
CA 3004712 6/2021
CA 2980055 12/2021
CA 2879783 1/2022
CA 2991614 1/2022
CA 2980069 11/2022
CA 3109606 12/2022
CH 432129 3/1967
CN 2128346 3/1993
CN 201264907 Y 7/2009
CN 201306736 9/2009
CN 201940168 8/2011
CN 102120138 12/2012
CN 203453713 2/2014
CN 103627433 3/2014
CN 203629938 6/2014
CN 203816490 9/2014
CN 104353357 2/2015
CN 204170623 2/2015
CN 103331093 4/2015
CN 204253221 4/2015
CN 204265565 4/2015
CN 105148728 12/2015
CN 204824775 12/2015
CN 103933845 1/2016
CN 105289241 2/2016
CN 105536486 5/2016
CN 105804900 7/2016
CN 103573430 8/2016
CN 205655095 10/2016
CN 104326604 11/2016
CN 104358627 11/2016
CN 106237802 12/2016
CN 205779365 12/2016
CN 106407648 2/2017
CN 105778987 8/2017
CN 207179722 4/2018
CN 207395575 5/2018
CN 108179022 6/2018
CN 108704478 10/2018
CN 109126458 1/2019
CN 109423345 3/2019
CN 109499365 3/2019
CN 109705939 5/2019
CN 109722303 5/2019
CN 110129103 8/2019
CN 110229686 9/2019
CN 209451617 10/2019
CN 110987862 4/2020
CN 111336612 A 6/2020
CN 213762571 U 7/2021
CN 213824075 U 7/2021
CN 215263512 U 12/2021
CN 215288592 12/2021
CN 113963818 1/2022
CN 114001278 2/2022
CN 217431673 9/2022
CN 218565442 3/2023
DE 10179 6/1912
DE 3721725 1/1989

(56) References Cited

FOREIGN PATENT DOCUMENTS

| | | | |
|---|---|---|---|
| DE | 19619722 | | 11/1997 |
| DE | 102010017563 | | 12/2011 |
| DE | 102014009231 | A1 | 1/2016 |
| EP | 0142352 | | 5/1985 |
| EP | 0527000 | | 2/1993 |
| EP | 0783910 | A1 | 7/1997 |
| EP | 0949318 | | 10/1999 |
| EP | 0783910 | B1 | 12/2000 |
| EP | 0801299 | | 3/2004 |
| EP | 1413712 | | 4/2004 |
| EP | 1600491 | | 11/2005 |
| EP | 1870153 | | 12/2007 |
| EP | 2047905 | | 4/2009 |
| EP | 2955345 | | 12/2015 |
| EP | 3130773 | | 2/2017 |
| EP | 3139009 | | 3/2017 |
| EP | 3239483 | | 11/2017 |
| EP | 3085910 | | 8/2018 |
| EP | 3355056 | | 8/2018 |
| EP | 2998529 | | 2/2019 |
| EP | 3441442 | | 2/2019 |
| EP | 3569988 | | 11/2019 |
| EP | 3878926 | | 9/2021 |
| FR | 2357630 | | 2/1978 |
| FR | 3004722 | | 3/2016 |
| FR | 3027909 | | 5/2016 |
| FR | 3067036 | | 12/2018 |
| FR | 3067037 | | 12/2018 |
| FR | 3072684 | | 4/2019 |
| FR | 3075808 | | 6/2019 |
| GB | 775273 | | 5/1957 |
| GB | 933618 | | 8/1963 |
| GB | 1207719 | | 10/1970 |
| GB | 2144526 | | 3/1985 |
| GB | 2516441 | | 1/2015 |
| IN | 202111016535 | | 7/2021 |
| JP | 59220609 | | 12/1984 |
| JP | 2003129067 | | 5/2003 |
| JP | 2005147478 | A | 6/2005 |
| JP | 3160405 | | 6/2010 |
| JP | 2015059220 | | 3/2015 |
| JP | 2019014275 | | 1/2019 |
| KR | 101751923 | | 7/2017 |
| KR | 101823897 | | 3/2018 |
| KR | 20180095303 | | 8/2018 |
| KR | 20190004474 | | 1/2019 |
| KR | 20190004475 | | 1/2019 |
| RU | 2673558 | | 11/2018 |
| RU | 2700705 | | 9/2019 |
| RU | 2760879 | | 12/2021 |
| TW | 320682 | | 11/1997 |
| WO | 94/08225 | | 4/1994 |
| WO | 199640436 | | 12/1996 |
| WO | 1997033678 | | 9/1997 |
| WO | 199803249 | | 1/1998 |
| WO | 1999041591 | | 8/1999 |
| WO | 2001051588 | | 7/2001 |
| WO | 2002038295 | | 5/2002 |
| WO | 2006126978 | | 11/2006 |
| WO | 2008088294 | | 7/2008 |
| WO | 2010/144191 | | 12/2010 |
| WO | 2012026302 | | 3/2012 |
| WO | 2012062924 | | 5/2012 |
| WO | 2012089776 | | 7/2012 |
| WO | 2012108584 | | 8/2012 |
| WO | 2014053431 | | 4/2014 |
| WO | 2014096703 | | 6/2014 |
| WO | 2014096704 | | 6/2014 |
| WO | 2014191004 | | 7/2014 |
| WO | 2014177424 | | 11/2014 |
| WO | 2014202815 | | 12/2014 |
| WO | 2016167708 | | 10/2016 |
| WO | 2017067088 | | 4/2017 |
| WO | 2017207976 | | 12/2017 |
| WO | 2018017664 | | 1/2018 |
| WO | 2018073018 | | 4/2018 |
| WO | 2018122274 | | 7/2018 |
| WO | 2018148675 | | 8/2018 |
| WO | 2018148681 | | 8/2018 |
| WO | 2018231105 | | 12/2018 |
| WO | 2019053323 | | 3/2019 |
| WO | 2019104243 | | 5/2019 |
| WO | 2019155183 | | 8/2019 |
| WO | 2019178701 | | 9/2019 |
| WO | 2020035797 | | 2/2020 |
| WO | 2020160004 | | 8/2020 |
| WO | 2021058289 | | 4/2021 |
| WO | 2022133359 | | 6/2022 |
| WO | 2022144495 | | 7/2022 |
| WO | 2022149501 | | 7/2022 |
| WO | 2022219234 | | 10/2022 |
| WO | 2022220991 | | 10/2022 |
| WO | 2023020797 | | 2/2023 |
| WO | 2023038579 | | 3/2023 |
| WO | 2023137304 | | 7/2023 |
| WO | 2023164683 | | 8/2023 |
| WO | 2023242308 | | 12/2023 |

OTHER PUBLICATIONS

Luyben, W. L., Process Modeling, Simulation, and Control for Chemical Engineers, Feedforward Control, pp. 431-433.

Cooper et al., Calibration transfer of near-IR partial least squares property models of fuels using standards, Wiley Online Library, Jul. 19, 2011.

ABB Measurement & Analytics, Using FT-NIR as a Multi-Stream Method for CDU Optimization, Nov. 8, 2018.

Modcon Systems LTD., On-Line NIR Analysis of Crude Distillation Unit, Jun. 2008.

ABB Measurement & Analytics, Crude distillation unit (CDU) optimization, 2017.

Guided Wave Inc., The Role of NIR Process Analyzers in Refineries to Process Crude Oil into Useable Petrochemical Products, 2021.

ABB Measurement & Analytics, Optimizing Refinery Catalytic Reforming Units with the use of Simple Robust On-Line Analyzer Technology, Nov. 27, 2017, https://www.azom.com/article.aspx?ArticleID=14840.

Bueno, Alexis et al., Characterization of Catalytic Reforming Streams by NIR Spectroscopy, Energy & Fuels 2009, 23, 3172-3177, Apr. 29, 2009.

Caricato, Enrico et al, Catalytic Naphtha Reforming—a Novel Control System for the Bench-Scale Evaluation of Commerical Continuous Catalytic Regeneration Catalysts, Industrial of Engineering Chemistry Research, ACS Publications, May 18, 2017.

Alves, J. C. L., et al., Diesel Oil Quality Parameter Determinations Using Support Vector Regression and Near Infrared Spectroscopy for Hydrotreationg Feedstock Monitoring, Journal of Near Infrared Spectroscopy, 20, 419-425 (2012), Jul. 23, 2012.

Rodriguez, Elena et al., Coke deposition and product distribution in the co-cracking of waste polyolefin derived streams and vacuum gas oil under FCC unit conditions, Fuel Processing Technology 192 (2019), 130-139.

Passamonti, Francisco J. et al., Recycling of waste plastics into fuels, PDPE conversion in FCC, Applied Catalysis B: Environmental 125 (2012), 499-506.

De Rezende Pinho, Andrea et al., Fast pyrolysis oil from pinewood chips co-processing with vacuum gas oil in an FCC unit for second generation fuel production, Fuel 188 (2017), 462-473.

Niaei et al., Computational Study of Pyrolysis Reactions and Coke Deposition in Industrial Naphtha Cracking, P.M.A. Sloot et al., Eds.: ICCS 2002, LNCS 2329, pp. 723-732, 2002.

Hanson et al., An atmospheric crude tower revamp, Digital Refining, Article, Jul. 2005.

Lopiccolo, Philip, Coke trap reduces FCC slurry exchanger fouling for Texas refiner, Oil & Gas Journal, Sep. 8, 2003.

Martino, Germain, Catalytic Reforming, Petroleum Refining Conversion Processes, vol. 3, Chapter 4, pp. 101-168, 2001.

Baukal et al., Natural-Draft Burners, Industrial Burners Handbook, CRC Press 2003.

(56) References Cited

OTHER PUBLICATIONS

Spekuljak et al., Fluid Distributors for Structured Packing Colums, AICHE, Nov. 1998.
Hemler et al., UOP Fluid Catalytic Cracking Process, Handbook of Petroleum Refining Processes, 3rd ed., McGraw Hill, 2004.
United States Department of Agriculture, NIR helps Turn Vegetable Oil into High-Quality Biofuel, Agricultural Research Service, Jun. 15, 1999.
NPRA, 2006 Cat Cracker Seminar Transcript, National Petrochemical & Refiners Association, Aug. 1-2, 2006.
Niccum, Phillip K. et al. KBR, CatCracking.com, More Production—Less Risk!, Twenty Questions: Identify Probably Cuase of High FCC Catalyst Loss, May 3-6, 2011.
NPRA, Cat-10-105 Troubleshooting FCC Catalyst Losses, National Petrochemical & Refiners Association, Aug. 24-25, 2010.
Fraser, Stuart, Distillation in Refining, Distillation Operation and Applications (2014), pp. 155-190 (Year: 2014).
Yasin et al., Quality and chemistry of crude oils, Journal of Petroleum Technology and Alternative Fuels, vol. 4(3), pp. 53-63, Mar. 2013.
Penn State, Cut Points, https://www.e-education.psu.edu/fsc432/content/cut-points, 2018.
The American Petroleum Institute, Petroleum HPV Testing Group, Heavy Fuel Oils Category Analysis and Hazard Characterization, Dec. 7, 2012.
Increase Gasoline Octane and Light Olefin Yeilds with ZSM-5, vol. 5, Issue 5, http://www.refiningonline.com/engelhardkb/crep/TCR4_35.htm.
Fluid Catalytic Cracking and Light Olefins Production, Hydrocarbon Publishing Company, 2011, http://www.hydrocarbonpublishing.com/store10/product.php?productid+b21104.
Zhang et al., Multifunctional two-stage riser fluid catalytic cracking process, Springer Applied Petrocchemical Research, Sep. 3, 2014.
Reid, William, Recent trends in fluid catalytic cracking patents, part V: reactor section, Dilworth IP, Sep. 3, 2014.
Akah et al., Maximizing propylene production via FCC technology, SpringerLink, Mar. 22, 2015.
Vogt et al., Fluid Catalytic Cracking: Recent Developments on the Grand Old Lady of Zeolite Catalysis, Royal Society of Chemistry, Sep. 18, 2015.
Zhou et al., Study on the Integration of Flue Gas Waste He Desulfuization and Dust Removal in Civilian Coalfired Heating Furnance, 2020 IOP Conf. Ser.: Earth Environ. Sci. 603 012018.
Vivek et al., Assessment of crude oil blends, refiner's assessment of the compatibility of opportunity crudes in blends aims to avoid the processing problems introduced by lower-quality feedstocks, www.digitalrefining.com/article/10000381, 2011.
International Standard, ISO 8217, Petroleum products—Fuels (class F)—Specifications of marine fuels, Sixth Edition, 2017.
International Standard, ISO 10307-1, Petroleum products—Total sediment in residual fuel oils -, Part 1: Determination by hot filtration, Second Edition, 2009.
International Standard, ISO 10307-2, Petroleum products—Total sediment in residual fuel oils -, Part 2: Determination using standard procedures for aging, Second Edition, 2009.
Ebner et al., Deactivatin and durability of the catalyst for Hotspot™ natural gas processing, OSTI, 2000, https://www.osti/gov/etdeweb/servlets/purl/20064378, (Year: 2000).
Morozov et al., Best Practices When Operating a Unit for Removing Hydrogen Sulfide from Residual Fuel Oil, Chemistry and Technology of Fuels and Oils, vol. 57, No. 4, Sep. 2001.
Calbry-Muzyka et al., Deep removal of sulfur and trace organic compounds from biogas to protect a catalytic methananation reactor, Chemical Engineering Joural 360, pp. 577-590, 2019.
Cheah et al., Review of Mid- to High-Tempearture Sulfur Sorbents for Desulfurization of Biomass- and Coal-derived Syngas, Energy Fuels 2009, 23, pp. 5291-5307, Oct. 16, 2019.
Mandal et al., Simultaneous absorption of carbon dioxide of hydrogen sulfide into aqueous blends of 2-amino-2-methyl-1 propanol and diethanolamine, Chemical Engineering Science 60, pp. 6438-6451, 2005.
Meng et al., In bed and downstream hot gas desulphurization during solid fuel gasification: A review, Fuel Processing Technology 91, pp. 964-981, 2010.
Okonkwo et al., Role of Amine Structure on Hydrogen Sulfide Capture from Dilute Gas Streams Using Solid Adsorbents, Energy Fuels, 32, pp. 6926-6933, 2018.
Okonkwo et al., Selective removal of hydrogen sulfide from simulated biogas streams using sterically hindered amine adsorbents, Chemical Engineering Journal 379, pp. 122-349, 2020.
Lerh et al., Feature: IMO 2020 draws more participants into Singapore's bunkering pool., S&P Global Platts, www.spglobal.com, Sep. 3, 2019.
Cremer et al., Model Based Assessment of the Novel Use of Sour Water Stripper Vapor for NOx Control in CO Boilers, Industrial Combustion Symposium, American Flame Research Committee 2021, Nov. 19, 2021.
Frederick et al., Alternative Technology for Sour Water Stripping, University of Pennsylvania, Penn Libraries, Scholarly Commons, Apr. 20, 2018.
Da Vinci Laboratory Solutions B. V., DVLS Liquefied Gas Injector, Sampling and analysis of liquefied gases, https://www.davinci-ls.com/en/products/dvls-products/dvls-liquefied-gas-injector.
Wasson ECE Instrumentation, LPG Pressurization Station, https://wasson-ece.com/products/small-devices/lpg-pressurization-station.
Mechatest B. V., Gas & Liquefied Gas Sampling Systems, https://www.mechatest.com/products/gas-sampling-system/.
La Rivista dei Combustibili, The Fuel Magazine, vol. 66, File 2, 2012.
Zulkefi et al., Overview of H2S Removal Technologies from Biogas Production, International Journal of Applied Engineering Research ISSN 0973-4562, vol. 11, No. 20, pp. 10060-10066, © Research India Publications, 2016.
Seo et al., Methanol absorption characteristics for the removal of H2S (hydrogen sulfide), COS (carbonyl sulfide) and CO2 (carbon dioxide) in a pilot-scale biomass-to-liquid process, Energy 66, pp. 56-62, 2014.
Swagelok, Grab Sampling Systems Application Guide, 53 pages.
Frank et al., "Fuel Tank and Charcoal Canister Fire Hazards during EVAP System Leak Testing", SAE International, 2007 World Congress, Detroit, Michigan, Apr. 16-19, 2007, 11 pages.
Doolin et al., "Catalyst Regeneration and Continuous Reforming Issues", Catalytic Naptha Reforming, 2004.
"Development of Model Equations for Predicting Gasoline Blending Properties", Odula et al., American Journal of Chemical Engineering, vol. 3, No. 2-1, 2015, pp. 9-17.
Bollas et al., "Modeling Small-Diameter FCC Riser Reactors. A Hydrodynamic and Kinetic Approach", Industrial and Engineering Chemistry Research, 41(22), 5410-5419, 2002.
Voutetakis et al., "Computer Application and Software Development for the Automation of a Fluid Catalytic Cracking Pilot Plant—Experimental Results", Computers & Chemical Engineering, vol. 20 Suppl., S1601-S1606, 1996.
Lloyd's Register, Using technology to trace the carbon intensity of sustainable marine fuels, Feb. 15, 2023.
Pashikanti et al., "Predictive modeling of large-scale integrated refinery reaction and fractionation systems from plant data. Part 3: Continuous Catalyst Regeneration (CCR) Reforming Process," Energy & Fuels 2011, 25, 5320-5344. (Year: 2011).

* cited by examiner

SYSTEMS AND METHODS FOR REDUCING RENDERED FATS POUR POINT

CROSS-REFERENCE TO RELATED APPLICATIONS

This application is a continuation of U.S. Non-Provisional application Ser. No. 18/103,633, filed Jan. 31, 2023, titled "SYSTEMS AND METHODS FOR REDUCING RENDERED FATS POUR POINT," which claims priority to and the benefit of U.S. Provisional Application No. 63/267,317, filed Jan. 31, 2022, titled "SYSTEMS AND METHODS FOR REDUCING RENDERED FATS POUR POINT AND TRANSPORTING BLENDED FAT BASED COMPOSITIONS," the disclosures of which are incorporated herein by reference in their entirety.

FIELD OF DISCLOSURE

The present disclosure relates to fuel processing facility methods and systems for blending rendered fats, including beef and/or mutton fat commonly referred to as tallow, as well as additional fats/oils derived from bovine, ovine, piscine, porcine, and poultry and, in some embodiments used cooking oil and/or other biological-based oil exhibiting similar properties, with biological-based oils and related compositions derived from plant and legume sources, that are capable of being used in the production of transportation fuel. More specifically, the present disclosure relates to methods and systems for reducing the pour point of rendered fats to transport long distances.

BACKGROUND

Increasingly, there is a demand for renewable feedstock to produce renewable fuels that are environmentally friendly. Renewable feedstock including biological-based oils (such as raw, degummed and/or refined varieties of soybean oil, corn oil, sorghum oil, canola oil, rapeseed oil, algal oil, fish oil, chufa/tigernut oil, *sativa* seed oil, coconut oil, related oils and blends thereof), rendered fats, and other miscellaneous renewable feedstock are processed into renewable diesel, naphtha, propane and treated fuel gas, for example.

Accordingly, in the production of transportation fuels, such as renewable diesel fuel, it is common to transport rendered fats long distances to different processing facilities. Rendered fats typically have a melting point of about 130 degrees Fahrenheit (° F.) to about 140° F.

SUMMARY OF THE DISCLOSURE

Applicants have recognized that this high melting temperature generally requires additional handling requirements during transport and upon reaching processing destinations, such as heating and mixing in order to efficiently offload the rendered fats, which creates additional expense in the fuel production process. In addition, if the rendered fats are cooled lower than the pour point during transport, even more expenses are incurred during the fuel production process.

Applicants recognized the problems noted above herein, and the present disclosure is direct to embodiments of methods and systems of reducing the pour point of the rendered fats, thereby decreasing heating and mixing requirements needed to maintain the rendered fats temperature above the pour point, for example.

The present disclosure includes embodiments of methods of reducing the pour point for fat based compositions and related compositions comprising greases, oils and blends thereof for transport from a first location to a second location to process into a transportation fuel, for example. In non-limiting embodiments, the compositions may comprise or consist of one or more rendered fats, including tallow, choice white grease (CWG), additional fats/oils derived from bovine, ovine, piscine, porcine and poultry, and, in some embodiments used cooking oil (UCO) and/or other biological-based oil exhibiting similar properties that are capable of being blended with biological-based oil and/or related compositions derived from plant and legume sources including technical corn oil (TCO), distillers corn oil (DCO), soybean oil, sorghum oil, canola oil, rapeseed oil, algal oil, fish oil, chufa/tigernut oil, sativa seed oil, coconut oil, and combinations thereof. In an embodiment, a selected quantity of rendered fats and a selected quantity of biological-based oil, such as distillers corn oil (DCO), may be supplied to a first tank positioned at a first location. The rendered fats may be supplied at a first selected temperature equal to or greater than a pour point of the rendered fats, and the DCO may be supplied at a second selected temperature lower than the first selected temperature and equal to or greater than a pour point of the DCO. The selected quantity of rendered fats and the selected quantity of DCO may be mixed in the first tank to form a blended fat composition having a third selected temperature. The third selected temperature may be less than the first selected temperature but greater than the second selected temperature and may be a high enough temperature equal to or greater than a pour point of the blended fat composition. Further, the third selected temperature of the blended fat composition may be maintained in the first tank so that the blended fat composition remains at a temperature above a reduced pour point less than the pour point of the rendered fats being supplied to the first tank, which defines a blended fat composition having the reduced pour point.

In embodiments, the blended fat composition, in turn, may be supplied to one or more transport vehicles, and each of the one or more transport vehicles, e.g., a railcar, may be configured to substantially maintain the blended fat composition at a temperature above the reduced pour point or reduced pour point temperature. For example, as will be understood by those skilled in the art, a railcar, for example, may be equipped with a heating element and/or insulation. The blended fat composition may be transported to the second location remote from the first location while the blended fat composition substantially maintains the reduced pour point. The blended fat composition from the one or more transport vehicles at the reduced pour point may be supplied to a second tank at the second location to further process into a transportation fuel, as will be understood by those skilled in the art.

Another embodiment of the disclosure is directed to a method of reducing pour point for a blended fat composition. The method may include supplying (a) a selected quantity of rendered fats at a first selected temperature equal to or greater than a pour point of the rendered fats and (b) a selected quantity of a biological-based oil at a second selected temperature lower than the first selected temperature and equal to or greater than a pour point of the biological-based oil. The method may include mixing the selected quantity of rendered fats and the selected quantity of the biological-based oil in via a mixing device, thereby to form a blended fat composition with a reduced pour point less than the pour point of the rendered fats. The method may include maintaining a third selected temperature of the blended fat composition in the mixing device. The method may include supplying the blended fat composition for further use at a fuel processing facility while the third selected temperature is maintained.

In another embodiment, the mixing device may comprise one or more of a mixing tank, in-line mixing pipeline, or mixing element in a transport vehicle. In another embodiment, further use of the blended fat composition at the fuel processing facility may comprise processing the blended fat composition into one or more of renewable diesel, naphtha, propane, or treated fuel gas Another embodiment of the disclosure is directed to a method of reducing pour point for a fat composition to transport the fat composition from a first location to a second location to process into a transportation fuel. The method may include supplying a selected quantity of rendered fats and a selected quantity of a biological-based oil to a first tank positioned at the first location. The rendered fats may be supplied at a first selected temperature equal to or greater than a pour point of the rendered fats and the biological-based oil may be supplied at a second selected temperature lower than the first selected temperature and equal to or greater than a pour point of the biological-based oil. The method may include mixing the selected quantity of rendered fats and the selected quantity of the biological-based oil in the first tank to form a blended fat composition. The method may include maintaining a third selected temperature of the blended fat composition in the first tank so that the blended fat composition has a reduced pour point less than the pour point of the rendered fats being supplied to the first tank. The method may include supplying the blended fat composition to one or more transport vehicles, the one or more transport vehicles each configured to (a) transport the blended fat composition from the first location to the second location for further processing and (b) maintain the blended fat composition at a temperature above the reduced pour point or reduced pour point temperature during transportation.

In another embodiment, the third selected temperature may be based on one or more of ambient temperature, the pour point of the rendered fats, the pour point of the biological-based oil, or a pour point of the blended fat composition. The method may also include, in response to a change in ambient temperature, adjusting the third selected temperature. The method may include sampling the blended fat composition after mixing in the first tank to measure the pour point of the blended fat composition in accordance with American Society for Testing and Materials (ASTM) D5950 and/or other standards. Further, the third selected temperature may be based on a measured pour point of the blended fat composition in the first tank.

In another embodiment, the first location may comprise one or more of a fuel processing facility, farm, rendered fat source, or biological-based oil source, and the second location may comprise one or more of a fuel processing facility or a renewable transportation fuel processing location. Further processing of the blended fat composition at a fuel processing facility may include processing the blended fat composition into one or more of renewable diesel, naphtha, propane, treated fuel gas, jet renewable fuel, sustainable aviation kerosene, hydro processed esters.

Accordingly, an embodiment of the disclosure is directed to a system for reducing the pour point for blended fat composition to transport the blended fat composition from a first location to a second location to process into a transportation fuel. A first source of rendered fats may be supplied to a first tank in a selected quantity at a first selected temperature equal to or greater than a pour point of the rendered fats. The biological-based oil may include distillers corn oil (DCO), technical corn oil (TCO), soybean oil, sorghum oil, canola oil, rapeseed oil, algal oil, fish oil, chufa/tigernut oil, *sativa* seed oil, coconut oil and combinations thereof, may be supplied in a select quantity at a second selected temperature lower than the first selected temperature and equal to or greater than a pour point of the DCO to the first tank. In the system, the first tank may be positioned to receive the first source of rendered fats and the source of DCO at the first location. The first tank may include a mixing element and a heating element to provide the blend fat composition at the third selected temperature that has a reduced pour point less than the pour point of the rendered fats being supplied to the first tank.

In an embodiment of the system, a rendered fats pump positioned between the first source of rendered fats and the first tank may be configured to supply rendered fats to the first tank. The system may include a rendered fats flow control valve connected to and in fluid communication with the first source of rendered fats and connected to and in fluid communication with the first tank. The rendered fats flow control valve may be configured to supply the selected quantity of rendered fats to the first tank to create the blended fat composition. The system may include a rendered fats flow meter being positioned between the rendered fats pump and the first tank to measure an amount of rendered fats supplied to the first tank to create the blended fat composition. The system may further include a biological-based oil pump being positioned between the source of biological-based oil and the first tank. The biological-based oil pump may be configured to supply biological-based oil to the first tank.

The system may include a flow control valve, such as a biological-based oil flow control valve, connected to and in fluid communication with the source of biological-based oil and connected to and in fluid communication with the first tank. The biological-based oil flow control valve may be configured to supply the selected a quantity of biological-based oil to the first tank to create the blended fat composition. Also, the system may include a biological-based oil meter disposed at a position between the biological-based oil pump and the first tank to measure an amount of biological-based oil supplied to the first tank to create the blended fat.

One or more transport vehicles may be positioned to transport the blended fat composition from the first location to a second location remote from the first location, and each of the one or more transport vehicles may be configured to substantially maintain the blended fat composition at a temperature above the reduced pour point or reduced pour point temperature. The system may further include a first tank pump positioned between the first tank and the one or more transport vehicles. The first tank pump may be configured to supply the blended fat composition to the one or more transport vehicles.

The system may further include a first tank flow control valve connected to and in fluid communication with the first tank and connected to and in fluid communication with the one or more transport vehicles. The first tank flow control valve may be configured to supply the blended fat composition to the one or more transport vehicles to transport to a second location. A first tank meter may be disposed at a position between the first tank and the one or more transport vehicles to measure an amount of blended fat composition supplied to the one or more transport vehicles to transport to a second location. A second tank also may be positioned to receive the blended fat composition blend from the one or more transport vehicles. The second tank likewise may include a mixing element and a heating element to maintain the blended fat composition at a temperature above the reduced pour point or reduced pour point temperature.

Another embodiment of the disclosure, for example, is directed to a controller to control a system to reduce pour point for rendered fats to transport blended fat composition from a first location to a second location to process into a transportation fuel. The controller may include a first input/output in signal communication with a rendered fats flow control valves. The rendered fats flow control valves may be connected to and in fluid communication with the first source of rendered fats and may be connected to and in fluid communication with a first tank. The rendered fats flow control valve may be configured to supply a selected quantity of rendered fats to the first tank thereby creating the blended fat composition. The controller may be configured, in relation to the rendered fats flow control valve, to adjust the flowrate of the selected quantity of rendered fats to supply to the first tank.

An embodiment of the controller also may include a second input/output in signal communication with a biological-based oil flow control valves. The biological-based oil flow control valve connected to and in fluid communication with the source of biological-based oil and may be connected to and in fluid communication with a first tank. The biological-based oil flow control valve may be configured to supply a selected a quantity of biological-based oil to the first tank thereby creating the blended fat composition. The controller may be configured, in relation to the biological-based oil flow control valve, to adjust a flowrate of the selected quantity of biological-based oil to supply to the first tank. The controller may further include a third input/output in signal communication with a first tank flow control valve. The first tank flow control valve may be connected to and in fluid communication with the first tank and may be connected to and in fluid communication with one or more transport vehicles. The first tank flow control valve may be configured to supply a quantity of blended fat composition to the one or more transport vehicles to transport to a second location. The controller may be configured, in relation to the biological-based oil flow control valve, to adjust the flowrate of the quantity of blended fat composition to supply to the one or more transport vehicles.

The controller may include a fourth input/output in signal communication with a rendered fats pump positioned between the first source of rendered fats and the first tank. The rendered fats pump may be configured to supply rendered fats to the first tank. The controller may be configured, in relation to the rendered fats pump, to adjust the speed of the rendered fats pump, thereby modifying the flowrate of the selected quantity of rendered fats supplied to the first tank. The controller also may include a fifth input/output in signal communication with a biological-based oil pump positioned between the source of biological-based oil and the first tank. The biological-based oil pump may be configured to supply biological-based oil to the first tank. The controller, in relation to the biological-based oil pump, may be configured to adjust the speed of the biological-based oil pump, thereby modifying the flowrate of the selected quantity of biological-based oil supplied to the first tank. The controller may further include a sixth input/output in signal communication with a first tank pump positioned between the first tank and the one or more transport vehicles. The first tank pump may be configured to supply the blended fat composition to the one or more transport vehicles. The controller may be configured, in relation to the first tank pump, to adjust the speed of the first tank pump, thereby modifying the flowrate of a quantity of blended fat composition supplied to the first tank.

The controller also may include a seventh input/output in signal communication with a mixing element positioned at the first tank to mix the selected quantity of rendered fats and the selected quantity of biological-based oil at the first tank. The controller may be configured, in relation to the mixing element, to control operability of the mixing element at the first tank. The controller may further include an eighth input/output in signal communication with a heating element positioned at the first tank to maintain a third selected temperature. The controller may be configured, in relation to the heating element, to adjust the first tank temperature to maintain the third selected temperature of the blended fat composition at the reduced pour point.

The controller also may include a ninth input/output in signal communication with a rendered fats flow meter disposed at a position between the rendered fats pump and the first tank to measure an amount of rendered fats supplied to the first tank to create the blended fat composition. The controller may be configured, in relation to the rendered fats flow meter, to obtain the flowrate of the rendered fats to the first tank. The controller may include a tenth input/output in signal communication with a biological-based oil flow meter disposed at a position between the biological-based oil pump and the first tank to measure an amount of biological-based oil supplied to the first tank to create the blended fat composition. The controller may be configured, in relation to the biological-based oil low meter, to obtain the flowrate of the biological-based oil to the first tank. The controller may further include an eleventh input/output in signal communication with a first tank flow meter disposed at a position between the first tank and the one or more transport vehicles to measure an amount of blended fat composition supplied to the one or more transport vehicles to transport to a second location. The controller may be configured, in relation to the first tank flow meter, to obtain the flowrate of the blended fat composition from the first tank.

BRIEF DESCRIPTION OF DRAWINGS

These and other features, aspects, and advantages of the disclosure will become better understood with regard to the following descriptions, claims, and accompanying drawings. It is to be noted, however, that the drawings illustrate only several embodiments of the disclosure and, therefore, are not to be considered limiting of the disclosure's scope.

DETAILED DESCRIPTION

So that the manner in which the features and advantages of the embodiments of the systems and methods disclosed herein, as well as others, which will become apparent, may be understood in more detail, a more particular description of embodiments of systems and methods briefly summarized above may be had by reference to the following detailed description of embodiments thereof, in which one or more are further illustrated in the appended drawings, which form a part of this specification. It is to be noted, however, that the drawings illustrate only various embodiments of the systems and methods disclosed herein and are therefore not to be considered limiting of the scope of the systems and methods disclosed herein as it may include other effective embodiments as well.

The term "about" refers to a range of values including the specified value, which a person of ordinary skill in the art would consider reasonably similar to the specified value. In embodiments, "about" refers to values within a standard deviation using measurements generally acceptable in the art. In one non-limiting embodiment, when the term "about" is used with a particular value, then "about" refers to a range extending to ±10% of the specified value, alternatively ±5% of the specified value, or alternatively ±1% of the specified value, or alternatively ±0.5% of the specified value. In embodiments, "about" refers to the specified value.

In one or more embodiments, as illustrated in FIGS. 1-8, for example, the present disclosure is directed to systems and methods for blending rendered fats with biological-based oil used in the production of transportation fuel and for reducing the pour point of rendered fat(s) enabling transport of the resulting blended fat composition long distances, such as, a distance of about 50 miles or more, and, for example, to a distant transportation fuel processing plant without the rendered fat solidifying or crashing out of the blended fat composition. In one or more embodiments, the distance or the selected distance (for example, a known distance between a first location and another location remote from the first location) may be from about 5 to about 15 miles, about 15 to about 30 miles, about 30 to about 50 miles, even greater than 50 miles, or even less than 5 miles. In another embodiment, the blended fat composition may be transported intra-facility (for example, from one location in a transportation fuel processing plan to another location within the transportation fuel processing plant).

Figure 1:
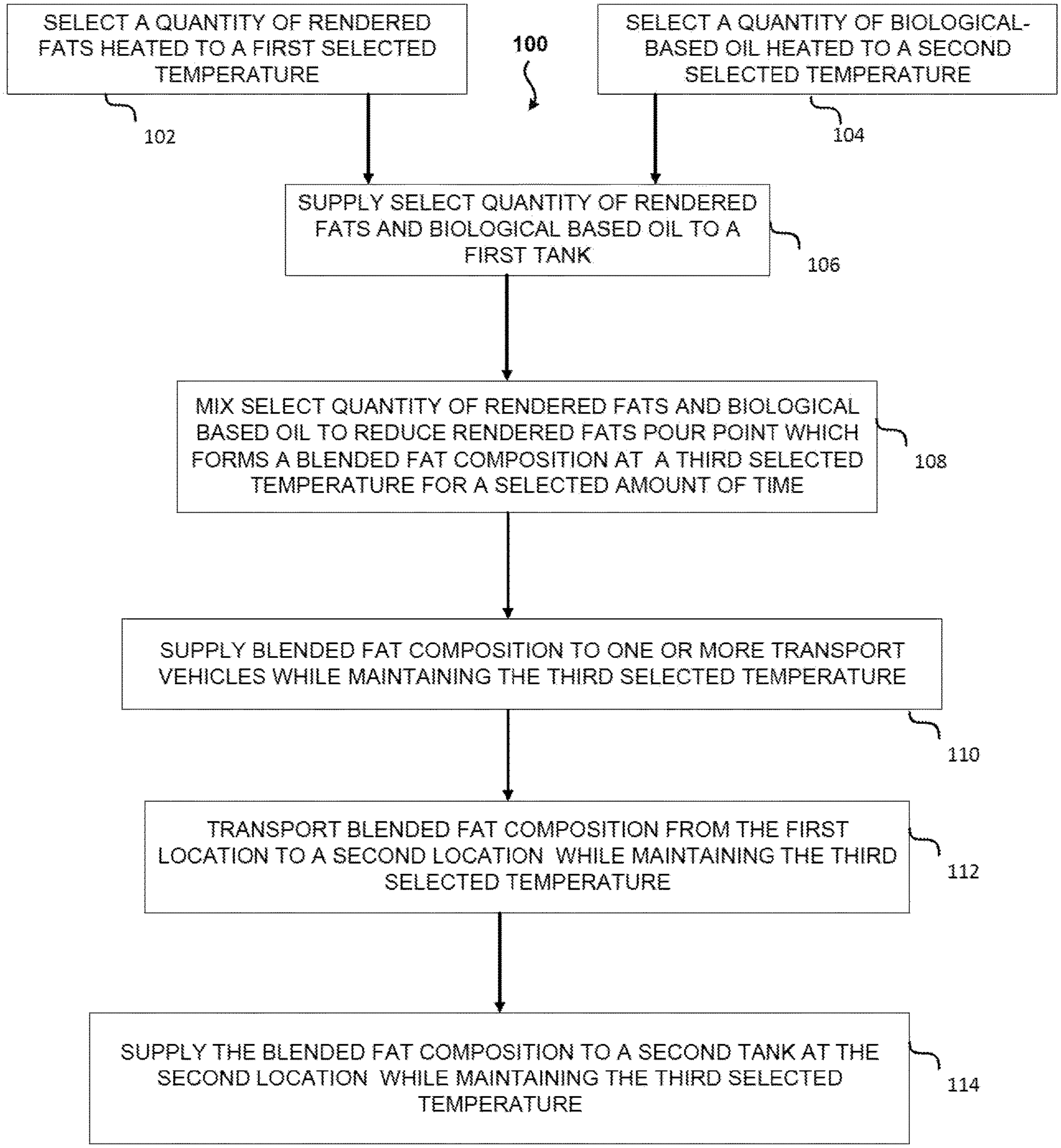
FIG. 1 is a simplified flow diagram illustrating a method for reducing pour point for blend fat composition to transport the blended fat composition from a first location to a second location, according to an embodiment of the disclosure.

In one or more embodiments, the present disclosure is directed to a method of reducing pour point for fat (such as rendered fats) to transport a fat based composition from a first location to a second location to process into a transportation fuel. FIG. 1 is a simplified block diagram for reducing the pour point for fat. The fat or rendered fat may include tallow, choice white grease (CWG), and/or additional fats/oils derived from bovine, ovine, piscine, porcine and poultry and, in some embodiments used cooking oil (UCO) and/or other biological-based oil exhibiting similar properties as will be understood by those skilled in the art. The fat, as noted, may be mixed with a biological-based oil to create a blended fat composition. The biological-based may include one or more of biological-based oil, such as technical corn oil (TCO), distillers corn oil (DCO), soybean oil, sorghum oil, canola oil, rapeseed oil, algal oil, fish oil, chufa/tigernut oil, *sativa* seed oil, coconut oil, and combinations thereof. Biological-based oil and biological-derived oil may be used interchangeably. The method begins at step 102 of selecting a quantity of rendered fats is heated to a first selected temperature. The selected quantity of rendered fats may be heated at the source of the rendered fats. The selected quantity of rendered fats may be heated in the system piping using in-line heaters and/or heat tracing in and/or on the piping. The first selected temperature may be equal to or greater than about 90° F. (32.2° C.). The rendered fats may be supplied from animal processing facilities, e.g. slaughterhouses and animal product packaging facilities, commercial restaurants, and/or other sources of fats and/or oils as will be understood by one skilled in the art. The selected quantity of rendered fats may be selected based on instructions from a controller or may be selected by an operator. The selected quantity of rendered fats may be heated to above the pour point of render fats. The selected quantity of rendered fats may be heated at or above 90° F. (32.2° C.). The select quantity of rendered fats may be heated above the melting point of rendered fats, with the melting point of rendered fats in a range from about 90° F. (32.2° C.) to about 140° F. (60° C.), including ranges from about 90° F. (32.2° C.) to about 130° F. (54.4° C.), 90° F. (32.2° C.) to about 120° F. (48.9° C.), or about 110° F. (43.3° C.) to about 120° F. (48.9° C.). In certain embodiments, the rendered fats is heated by a heat exchanger to the first selected temperature.

Step 102 may be performed simultaneously or substantially simultaneously with step 104. At step 104 a selected quantity of biological-based oil is heated to a second selected temperature. In certain embodiments, step 102 and step 104 may be performed sequentially. The selected quantity of biological-based oil may be heated at the source of the rendered fats. The selected quantity of biological-based oil may be heated in the system piping using in-line heaters. The second selected temperature may be ranging from about 90° F. to about 140° F. In certain embodiments, the second selected temperature may range from about 90° F. to about 120° F., from about 90° F. to about 110° F., from about 90° F. to about 100° F., from about 95° F. to about 105° F., or from about 105° F. to about 115° F. Biological-based oil may be supplied from farms and refineries performing portions of ethanol production processes. The selected quantity of biological-based oil may be selected based on instructions from a controller or may be selected by an operator. The selected quantity of biological-based oil may be heated to above the pour point of rendered fats. The selected quantity of biological-based oil may be heated at or above about 90° F. In certain embodiments, the rendered fats is heated by a heat exchanger to the second selected temperature.

The method 100 further involves, at step 106, supplying the selected quantity of rendered fats and the selected quantity of biological-based oil to a first tank, which in non-limiting embodiments, may include a general service tank car, alternatively referred to as a rail tank car or railcar, a semitruck tank, or a marine vessel holding tank. The first tank may be maintained at a temperature equal to or greater than about 90° F. The first tank may be insulated to maintain the temperature equal to or greater than 90° F. The first tank temperature may be at or above the pour point of the rendered fats. In certain embodiments, the selected quantity of rendered fats and selected quantity of biological-based oil is supplied to a first tank by a controller. The selected quantity of biological-based oil and the selected quantity of rendered fats may be supplied to the first tank simultaneously or sequentially.

In an embodiment, the first tank may include a mixing element to mix the selected quantity of rendered fats and the selected quantity of biological-based oil for a selected amount of time. The mixing element may be in the form of an agitator, a mixer mounted inside tank, or a mixing impeller. The mixing element may be controlled by a controller. The first tank may also include a heating element to maintain the third selected temperature of the blended fat composition. The heating element may be in the form of a tubular heating element, a flanged heater, coil elements, over the side heaters, a screw plug heater, and other types of heating elements. In certain embodiments, the method further includes heating the first source of rendered fats and the source of biological-based oil before supplying the selected quantity of rendered fats and the selected quantity of biological-based oil to the first tank.

While in the first tank, the method also involves the step 108 of mixing the selected quantity of rendered fats and the selected quantity of biological-based oil which forms a blended fat composition at a third selected temperature for a selected amount of time. The selected amount of time may be at least 10 minutes, at least about 15 minutes, at least about 30 minutes or even longer. The third selected temperature may be lower than the temperature of the rendered fats. The third selected temperature may be at least 90° F. The third selected temperature may be dependent on the ratio of rendered fats to biological-based oil. For example, a blended fat composition with a higher weight percent of rendered fats may have a higher third selected temperature than a blended fat composition with a lower weight percent of rendered fats. In the alternative, blended fat compositions with a lower weight percent of rendered fats may have a lower third selected temperature than a blended fat composition with a higher weight percent of rendered fats. In certain embodiments, the ratio of rendered fats to biological-based oil may be determined based on weather conditions. For example, the weight percent of rendered fats in the blended fat composition may be reduced during cold weather conditions (for example, during snow, during freezes, when ambient temperature is lower than a selected threshold, etc.). In another example, the weight percent of rendered fats in the blended fat composition may be increased during warm weather conditions (for example, when the ambient temperature is greater than a selected threshold). In certain embodiments, the ratio of rendered fats to biological-based oil DCO may be determined by the distance between the first location and the second location.

The selected quantity of rendered fats and selected quantity of biological-based oil may be supplied in different ratios. In one or more embodiments, the selected quantity of rendered fats present in the first tank may be from about 0.01 weight percent (wt. %) to about 10 wt. % of the blended fat composition. In another embodiment, the selected quantity of rendered fats present in the first tank may be from about 10 wt. % to about 20 wt. % of the blended fat composition. In another embodiment, the selected quantity of rendered fats present in the first tank may be from about 20 wt. % to about 30 wt. % of the blended fat composition. In another embodiment, the selected quantity of biological-based oil present in the first tank may be from about 70 wt. % to about 80 wt. % of the blended fat composition. In another embodiment, the selected quantity of biological-based oil present in the first tank may be from about 80 wt. % to about 90 wt. % of the blended fat composition. In another embodiment, the selected quantity of biological-based oil present in the first tank may be from about 90 wt. % to about 100 wt. % of the blended fat composition. In related embodiments, the ratio may be manipulated or adjusted to accommodate certain physicochemical features such as a desired pour point. For instance, in non-limiting embodiments where a pour point of about 100° F. is desired, the selected quantity of rendered fats in the first tank may be about 25 wt. % and the selected quantity of biological-based oil may be about 75 wt. % (resulting in a 3:1 ratio of rendered fats:biological-based oil).

At step 110 the blended fat composition is supplied to one or more transport vehicles while maintaining the third selected temperature of the blended fat composition. According to an embodiment of the present disclosure, the one or more transport vehicles may be a rail car, a freight hauler, or a marine vessel. In another embodiment, the one or more transport vehicles may each be configured to be equal to or greater than about 80° F., including equal to or great than about 90° F. to maintain the reduced pour point of the blended fat composition. In other words, a space within a tank of the transport vehicle may be held at and/or heated to a temperature of equal to or great than about 90° F. The one or more transport vehicles may be configured to maintain the reduced pour point of the blended fat composition in all weather conditions. Each transport vehicle may be insulated to maintain the third selected temperature. In another embodiment, the one or more transport vehicles may include a heating element to maintain the temperature of the blended fat composition in all weather conditions. For the rail car, the heating element may be an electric tank heater or low pressure steam provided through heat transfer coils or other forms of heating elements. Heating the marine vessel may be through plate heat exchangers, shell and tube heat exchangers, steam, or other forms of heating elements. For the freight hauler, the heating element may be a plate heat exchanger, shell and tube heat exchanger, or other forms of heating elements. Additionally, the rail car, marine vessel and/or freight hauler may be insulated using foam insulation, blanket insulation, loose-fill insulation or similar insulating compositions known to the skilled artisan. The one or more transport vehicles may include a mixer to keep the rendered fats in solution in the blended fat composition. The blended fat composition may be supplied to the one or more transport vehicles via pipe and/or flow controllers based on signals from the controller.

At step 112 the blended fat composition is transported from the first location to a second location, such as, at least about 5 miles away, 20 miles away, 50 miles away, 500 miles away, 750 miles away, 1000 miles away, 1500 miles or more away, and distances in between, while maintaining the third selected temperature. The third selected temperature may be at or above about 90° F. In some embodiments, the third selected temperature may be or may be decreased to the pour point temperature of rendered fats or the blended fat composition during transport. In other embodiments, the rendered fats and the biological-based oil (in other words, the blended fat composition) may be mixed or blended during transport from natural movement of the fluid inside the one or more transport vehicles.

At step 114 the blended fat composition is supplied, after arrival at the second location, to a second tank at a second location while maintaining the third selected temperature. The second tank, the temperature of the second tank, and/or flow to the second tank may be controlled by a controller. The second tank may be at a temperature above the third selected temperature. The second tank may be at a temperature below the third selected temperature but above the rendered fats pour point. The third selected temperature may be determined based on the distance to the second location. The third selected temperature also may be determined based on weather conditions. In another embodiment, the third selected temperature may be based on the weather conditions and/or ambient temperature, the distance to the second location from the first location, the pour point of the rendered fats, the pour point of the biological-based oil, and/or the pour point of the blended fat composition. In yet another embodiment, the third selected temperature may be adjusted (for example, by the controller) based on changes in the ambient temperature. The second tank may include a mixing element and heating element to maintain the temperature at or above about 90° F.

In one or more embodiments, the method further may include sampling the blended fat composition after mixing in the first tank to measure the pour point of the blended fat composition in accordance with the American Society for Testing and Materials (ASTM) D5950 (https://www.astm.org/d5950-14r20.html), ASTM D97-17b (https://www.astm.org/d0097-17br22.html), manual pour point, or other similar methods known to those skilled in the art. The sampling may be completed in timed intervals. In other embodiments, sampling may be completed periodically until the blended resulting fat composition pour point is below the rendered fats pour point.

Figure 2A:
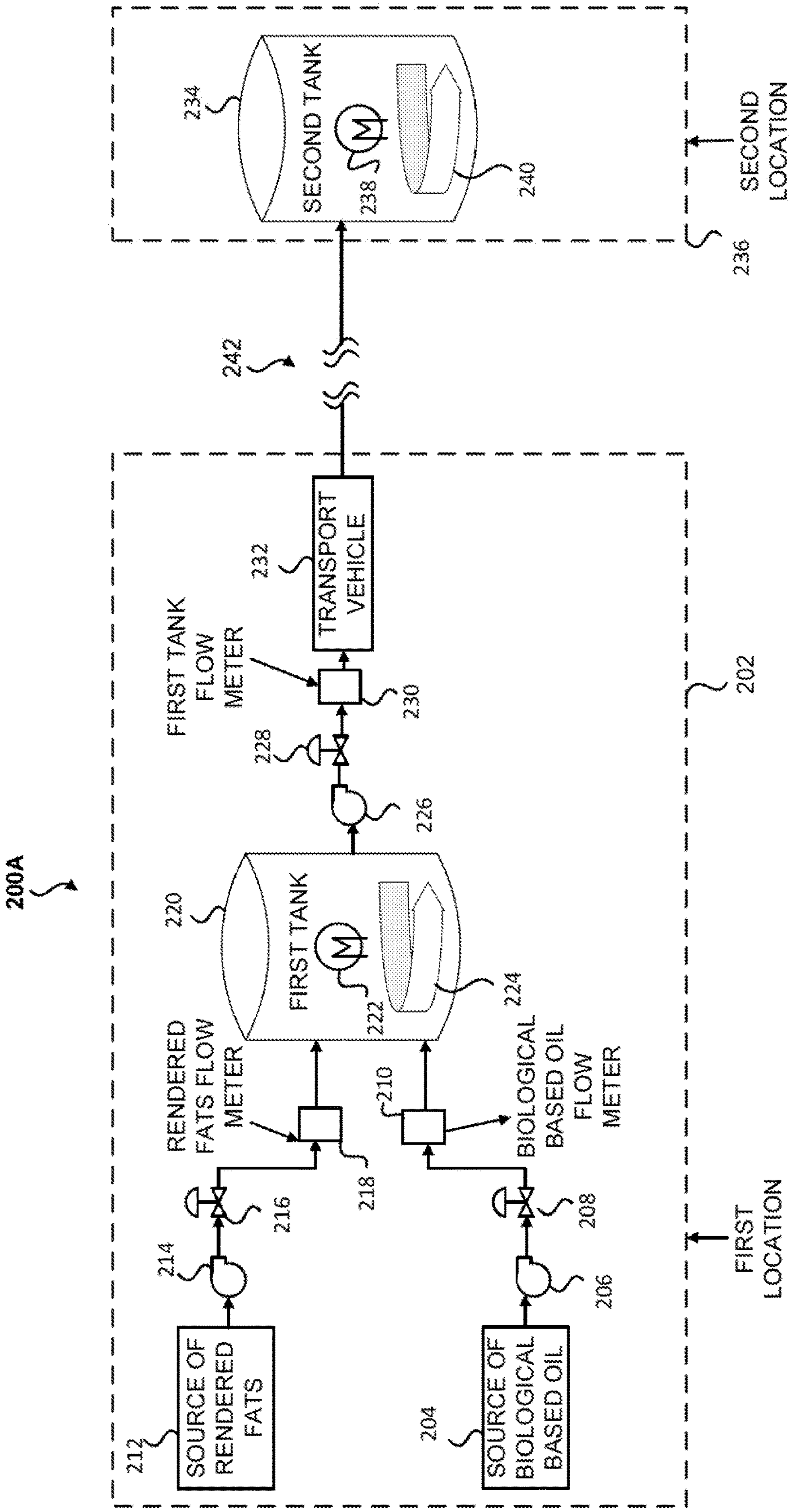
FIG. 2A is a schematic diagram illustration of a system for reducing the pour point of rendered fats using a first tank and transporting the resulting fat composition from a first location to a second location using a transport vehicle, according to an embodiment of the disclosure.

An embodiment of a system 200A for reducing the pour point for fat as described herein and as illustrated in FIG. 2A. The system 200A, for example, may be used for transporting fat from a first location to a second location. According to an embodiment of the present disclosure, the system 200 may include a first source of rendered fats 212 to supply rendered fats in a selected quantity at a first selected temperature equal to or greater than a pour point of the rendered fats. In embodiments, the first selected temperature may be equal to or greater than about 90° F. The system further includes a source of biological-based oil 204 to supply biological-based oil in a selected quantity at a second selected temperature lower than the first selected temperature and equal to or greater than a pour point of the biological-based oil. The second selected temperature may be ranging from about 90° F. to about 140° F.

Figure 5:
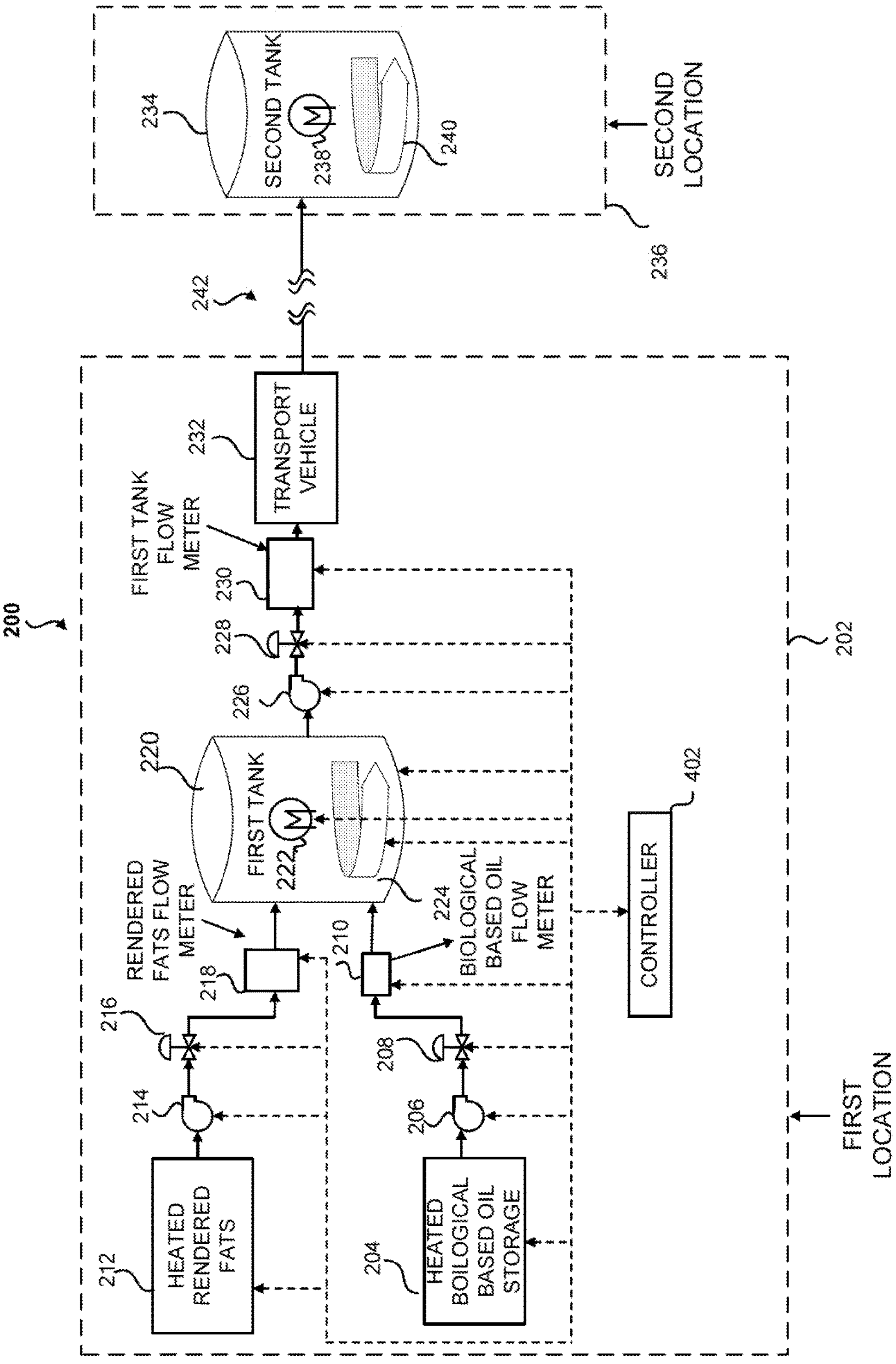
FIG. 5 is a schematic diagram illustration of a system for reducing the pour point of rendered fats and transporting the resulting fat composition from a first location to a second location, according to an embodiment of the disclosure.

In one or more embodiments, the system 200A for reducing the pour point for a blended fat composition further includes a first tank 220 being positioned to receive the first source of rendered fats 212 and the source of biological-based oil 204 at a first location 202. The first tank 220 may include a mixing element 224 and a heating element 222 to provide the blended fat composition at a third selected temperature that has a reduced pour point that is less than the pour point of the rendered fats being supplied to the first tank 220. In embodiments, the first tank may be maintained at a temperature equal to or greater than about 90° F. The mixing element 224 and the heating element 222 may be controlled by a controller 402, as shown in FIG. 5.

Embodiments of the system 200A also includes a rendered fats pump 214 positioned between the first source of rendered fats 212 and the first tank 220. The rendered fats pump 214 is configured to supply rendered fats to the first tank 220. The rendered fats pump 214 may be controlled by a controller 402 to move fluid, as shown in FIG. 5. The embodiment of the system 200 may also include a rendered fats flow control valve 216 connected to and in fluid communication with the first source of rendered fats 212 and connected to and in fluid communication with the first tank 220. The rendered fats flow control valve 216 may be configured to supply the selected quantity of rendered fats to the first tank to create a blended fat composition. The rendered fats flow control valve 216 may be controlled by a controller 402 to adjust the flowrate, as shown in FIG. 5. The embodiment of the system 200 may further include a rendered fats flow meter 218 being disposed at a position between the rendered fats pump 214 and the first tank 220 to measure an amount of rendered fats supplied to the first tank 220 to create the blended fat composition. The rendered fats flow meter 218 may be controlled by a controller 402 to measure the flowrate, as shown in FIG. 5. The embodiment of the system 200A further includes a biological-based oil pump 206 being positioned between the source of biological-based oil 204 and the first tank 220. The biological-based oil pump 206 may be configured to supply biological-based oil to the first tank 220. The biological-based oil pump 206 may be controlled by a controller 402 to move fluid, as shown in FIG. 5.

Embodiments of the system 200A may also include a biological-based oil flow control valve 208 connected to and in fluid communication with the source of biological-based oil 204 and connected to and in fluid communication with the first tank 220. The biological-based oil flow control valve 208 may be configured to supply the selected quantity of biological-based oil 204 to the first tank 220 to create the blended fat composition. The biological-based oil flow control valve 208 may be controlled by a controller 402 to adjust the flowrate, as shown in FIG. 5. The embodiment of the system 200A may include a biological-based oil meter 210 disposed at a position between the biological-based oil pump 206 and the first tank 220 to measure an amount of biological-based oil supplied to the first tank 220 to create the blended fat composition. The biological-based oil meter 210 may be controlled by a controller 402 to measure the flowrate, as shown in FIG. 5.

In certain embodiments, an input/output is in signal communication with a first heat source. The first heat source is positioned between the first source of rendered fats and the first tank to heat a quantity of rendered fats, such that the controller is configured to adjust a first selected temperature of the quantity of rendered fats to a temperature equal to or greater than 90 degrees Fahrenheit. In certain embodiments, an input/output may be in signal communication with a second heat source. The second heat source may be positioned between the second source of biological-based oil, such as a source of DCO and the first tank to heat a quantity of the biological-based oil, such as DCO, such that the controller may be configured to adjust a second selected temperature of the quantity of biological-based oil, such as DCO to a temperature ranging from about 90 degrees Fahrenheit to about 140 degrees Fahrenheit.

Embodiments of the system 200A directed to the reduction of the pour point for rendered fats further includes one or more transport vehicles 232 positioned to transport the blended fat composition a distance or a selected distance (for example, the known distance between the first location 202 to a second a location 236) from the first location 202 to a second a location 236 while being configured to maintain the blended fat composition at the reduced pour point. The distance between the first location 202 to a second a location 236 may be greater than or equal to about 5 miles, about 20 miles, about 50 miles, about 500 miles, about 750 miles, about 1000 miles, about 1500 miles or more, and distances in between.

In certain embodiments, the one or more transport vehicles each are configured to be equal to or greater than about 90° F. (32.2° C.) to maintain the reduced pour point of the blended fat composition. The one or more transport vehicles may be selected from a rail car, a freight hauler, or a marine vessel. In certain embodiments, the one or more transport vehicles may maintain the reduced pour point of the blended fat composition in all weather conditions. Further, in another embodiment the one or more transport vehicles may be insulated using one or more of the insulation types disclosed herein. The one or more transport vehicles may further include a heating element as well as an optional agitator to maintain the third selected temperature and the consistency of the fat composition in all weather conditions.

Embodiments of system 200A further include a first tank pump 226 connected to and in fluid communication with the first tank 220 and connected to and in fluid communication with a first tank flow control valve 228. The first tank flow control valve 228 may be connected to and in fluid communication with the first tank pump 226 and connected to and in fluid communication with the one or more transport vehicles 232. The first tank flow control valve 228 may be configured to supply the blended fat composition to the one or more transport vehicles 232 to transport to a second location 236. The first tank flow control valve 228 may be controlled by a controller 402 to adjust the flowrate, as shown in FIG. 5. Embodiments of system 200A also include a first tank flow meter 230 disposed at a position between the first tank 220 and the one or more transport vehicles 232 to measure an amount of blended fat composition supplied to the one or more transport vehicles 232 to transport to a second location 236. The first tank flow meter 230 may be controlled by a controller 402 to measure the flowrate, as shown in FIG. 5.

According to an embodiment of the present disclosure, the system 200A further includes a second tank 234 being positioned to receive the blended fat composition from the one or more transport vehicles 232. The second tank 234 includes a second mixing element 240 and a second heating element 238 to maintain the blended fat composition at the reduced pour point.

In an embodiment, the mixing element 224 of the first tank 220 may be considered a mixing device. In another embodiment, other mixing devices may be utilized. Other mixing devices may include mixing elements in other mixing tanks, in-line mixing pipeline, mixing elements in a transport vehicle, and/or one or more pups and/or valves.

In certain embodiments, the system 200A may further include a heat source to heat the first source of rendered fats to the first selected temperature and the source of biological-based oil to the second selected temperature. In non-limiting embodiments, the heat source may be a heat exchanger. The heat source may be controlled by a controller to adjust the first selected temperature and the second selected temperature.

In certain embodiments, the system 200A may further include piping. In some embodiments, the piping may be insulated using commercially available pipe insulation known to those of skill in the art. The insulated piping may maintain the first selected temperature, the second selected temperature, and the third selected temperature. In another embodiment, the system 200A may further include one or more in-line heaters to maintain the first selected temperature, the second selected temperature, and the third selected temperature throughout the system 200A. The in-line heater may be controlled by a controller. One or more temperature sensors may transmit temperature readings to the controller to operate and adjust the temperature of the in-line heater.

Figure 2B:
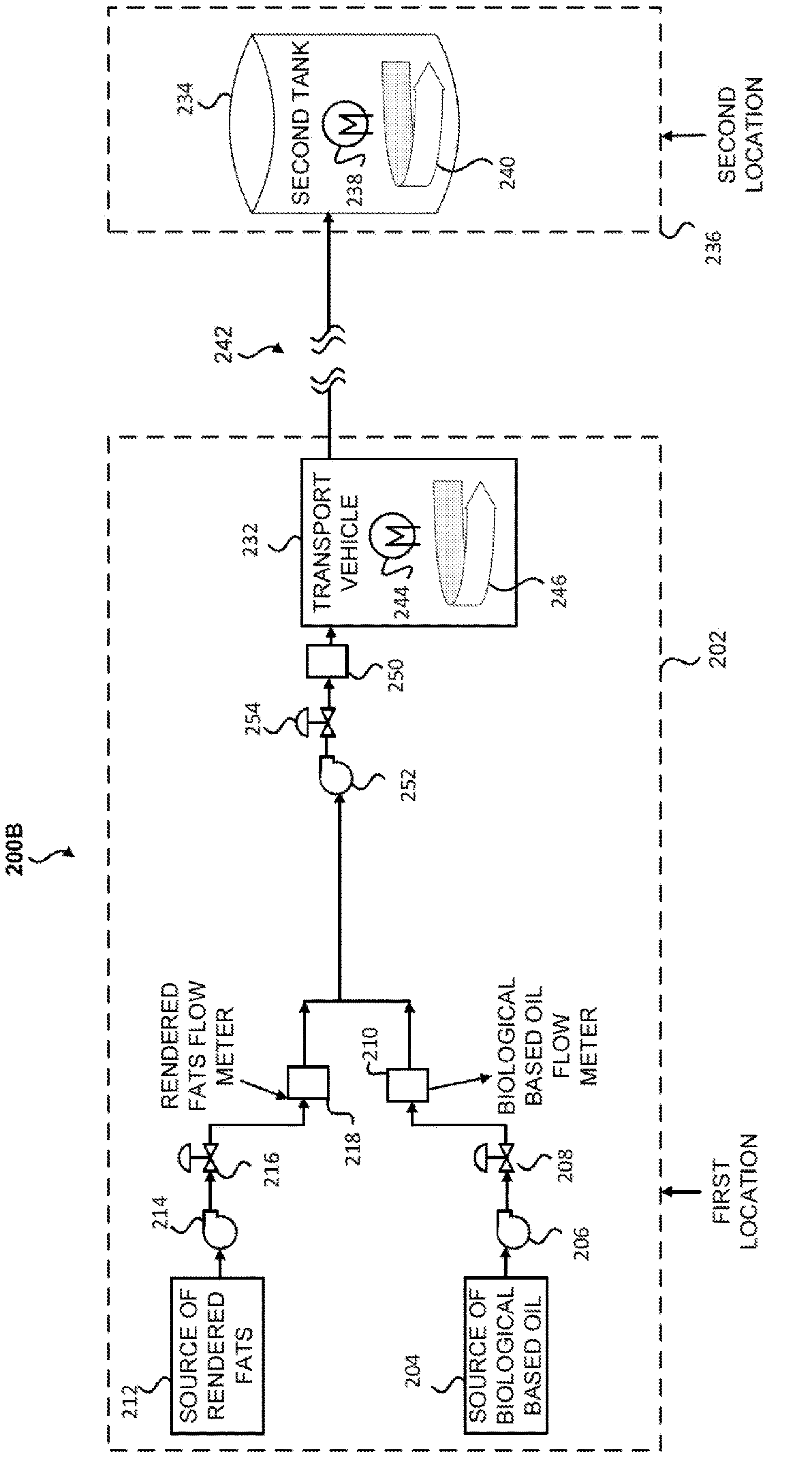
FIG. 2B is a schematic diagram illustration of a system for reducing the pour point of rendered fats and transporting the resulting fat composition from a first location to a second location using a transport vehicle, according to an embodiment of the disclosure.

An embodiment of a system 200B for reducing the pour point for fat as described herein and as illustrated in FIG. 2B. The system 200B, for example, may be used for transporting rendered fat (such as, in a blended fat composition) from a first location to a second location. According to an embodiment of the present disclosure, the system 200B may include a first source of rendered fats 212 to supply rendered fats in a selected quantity at a first selected temperature equal to or greater than a pour point of the rendered fats. In embodiments, the first selected temperature may be equal to or greater than about 90° F. The system further includes a source of biological-based oil 204 to supply biological-based oil in a selected quantity at a second selected temperature lower than the first selected temperature and equal to or greater than a pour point of the biological-based oil. The second selected temperature may be ranging from about 90° F. to about 140° F.

Figure 4:
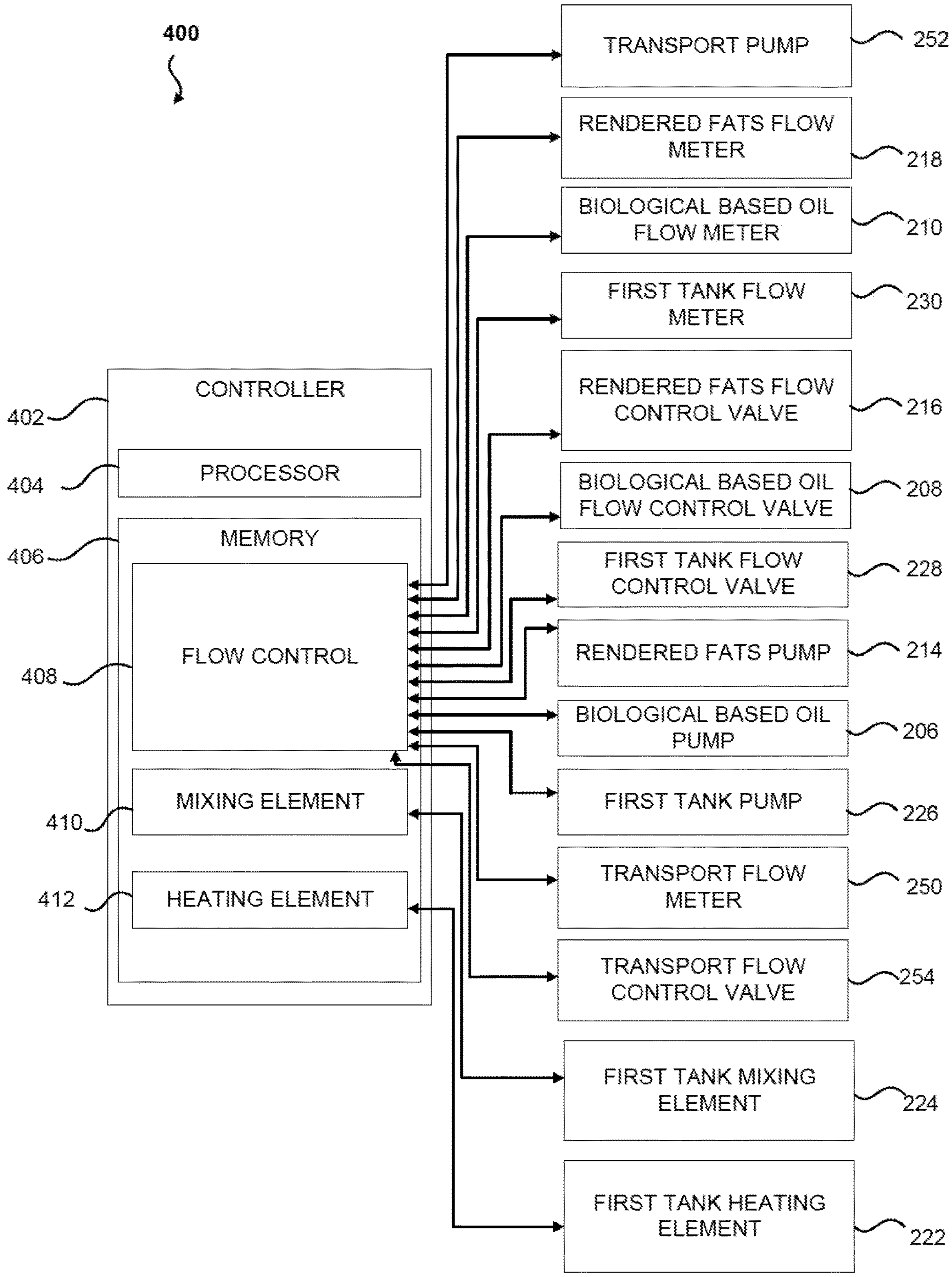
FIG. 4 is a simplified flow diagram, implemented in a controller, for managing the reduction of the pour point of render fats and transporting the fat from a first location to a second location, according to an embodiment of the disclosure.

Embodiments of the system 200B also includes a rendered fats pump 214 positioned between the first source of rendered fats 212 and one or more transport vehicles 232. The rendered fats pump 214 is configured to supply rendered fats to the one or more transport vehicles 232. The rendered fats pump 214 may be controlled by a controller 402 to move fluid, as shown in FIG. 4. The embodiment of the system 200B may also include a rendered fats flow control valve 216 connected to and in fluid communication with the first source of rendered fats 212 and connected to and in fluid communication with the transport vehicle 232. The rendered fats flow control valve 216 may be configured to supply the selected quantity of rendered fats to the one or more transport vehicles 232 to create a blended fat composition. The rendered fats flow control valve 216 may be controlled by a controller 402 to adjust the flowrate, as shown in FIG. 4. The one or more transport vehicles 232 are positioned to transport and blend the rendered fats and the biological-based oil to create a blended fat composition that is transported a distance or selected distance (for example, the known distance between the first location 202 to a second a location 236) from the first location 202 to a second a location 236 while being configured to maintain the blended fat composition at the reduced pour point. The distance between the first location 202 to a second a location 236 may be greater than or equal to about 50 miles.

The embodiment of the system 200B may further include a rendered fats flow meter 218 being disposed at a position between the rendered fats pump 214 and the transport vehicle 232 to measure an amount of rendered fats supplied to the transport vehicle 232 to create the blended fat composition. The rendered fats flow meter 218 may be controlled by a controller 402 to measure the flowrate, as shown in FIG. 4. The embodiment of the system 200B further includes a biological-based oil pump 206 being positioned between the source of biological-based oil 204 and the transport vehicle 232. The biological-based oil pump 206 may be configured to supply biological-based oil to the transport vehicle 232. The biological-based oil pump 206 may be controlled by a controller 402 to move fluid, as shown in FIG. 4.

Embodiments of the system 200B may also include a biological-based oil flow control valve 208 connected to and in fluid communication with the source of biological-based oil 204 and connected to and in fluid communication with the one or more transport vehicles 232. The biological-based oil flow control valve 208 may be configured to supply the selected quantity of biological-based oil 204 to the one or more transport vehicles 232 to create the blended fat composition. The biological-based oil flow control valve 208 may be controlled by a controller 402 to adjust the flowrate, as shown in FIG. 5. The embodiment of the system 200B may include a biological-based oil meter 210 disposed at a position between the biological-based oil pump 206 and the one or more transport vehicles 232 to measure an amount of biological-based oil supplied to the one or more transport vehicles 232 to create the blended fat composition. The biological-based oil meter 210 may be controlled by a controller 402 to measure the flowrate, as shown in FIG. 5.

Embodiments of system 200B further include a transport pump 252 connected to and in fluid communication with the rendered fats flow meter 218 and the biological based oil flow meter 210 and connected to and in fluid communication with a transport flow control valve 254. The transport flow control valve 254 may be connected to and in fluid communication with the transport pump 252 and connected to and in fluid communication with the one or more transport vehicles 232. The transport flow control valve 254 may be configured to supply the rendered fats and biological based oil to the one or more transport vehicles 232 to transport to a second location 236. The transport flow control valve 254 may be controlled by a controller 402 to adjust the flowrate, as shown in FIG. 4.

Embodiments of system 200B also include a transport flow meter 250 positioned downstream of the rendered fats flow meter 218 and the biological based oil flow meter 210 and upstream of the one or more transport vehicles 232 to measure a total amount of rendered fats and biological based oil being supplied to the one or more transport vehicles 232 to transport to a second location 236. The transport flow meter 250 may be controlled by a controller 402 to measure the flowrate, as shown in FIG. 4.

The transport vehicle 232 may include a mixing element 246 and a heating element 244 to produce the blended fat composition (such as by mixing via the mixing element 246) at a third selected temperature (such as by heating via the heating element 244) that has a reduced pour point that is less than the pour point of the rendered fats being supplied to the transport vehicle 232. In embodiments, the transport vehicle 232 may maintain a temperature (such as an internal temperature via the heating element 244) equal to or greater than about 90° F. The mixing element 246 and the heating element 244 may be controlled by a controller located on the transport vehicle 232.

In certain embodiments, an input/output may be in signal communication with a third heat source. The third heat source may be positioned between the first source of rendered fats and the transport vehicle 232 to heat a quantity of rendered fats, such that the controller is configured to adjust a first selected temperature of the quantity of rendered fats to a temperature equal to or greater than 90 degrees Fahrenheit. In certain embodiments, an input/output may be in signal communication with a fourth heat source. The fourth heat source may be positioned between the second source of biological-based oil and the transport vehicle 232 to heat a quantity of biological-based oil, such that the controller is configured to adjust a second selected temperature of the quantity of biological-based oil to a temperature ranging from about 90 degrees Fahrenheit to about 140 degrees Fahrenheit.

Embodiments of the system 200B directed to the reduction of the pour point for rendered fats may further include one or more transport vehicles 232 positioned to transport the blended fat composition a distance or selected distance 242 from the first location 202 to a second a location 236 while maintaining the blended fat composition at the reduced pour point temperature. The distance between the first location 202 to a second a location 236 may be greater than or equal to about 5 miles, about 20 miles, about 50 miles, about 500 miles, about 750 miles, about 1000 miles, about 1500 miles or more, and distances in between.

In certain embodiments, each of the one or more transport vehicles are configured to be equal to or greater than about 90° F. to maintain the reduced pour point of the blended fat composition. The one or more transport vehicles may include a rail car, a freight hauler, or a marine vessel. In certain embodiments, the one or more transport vehicles may maintain the reduced pour point temperature of the blended fat composition in all weather conditions. Further, in another embodiment the one or more transport vehicles may be insulated using one or more of the insulation types disclosed herein. The one or more transport vehicles may further include a heating element as well as an optional agitator to maintain the third selected temperature and the consistency of the fat composition in all weather conditions.

According to an embodiment of the present disclosure, the system 200B further includes a second tank 234 being positioned to receive the blended fat composition from the one or more transport vehicles 232. The second tank 234 includes a second mixing element 240 and a second heating element 238 to maintain the blended fat composition at the reduced pour point.

In certain embodiments, the system 200B may further include piping. In some embodiments, the piping may be insulated using commercially available pipe insulation known to those of skill in the art. The insulated piping may maintain the first selected temperature, the second selected temperature, and/or the third selected temperature. In another embodiment, the system 200B may further include one or more in-line heaters and/or heat tracing to maintain the first selected temperature, the second selected temperature, and the third selected temperature throughout the system 200B. The in-line heater may be controlled by a controller. One or more temperature sensors may transmit temperature readings to the controller to operate and adjust the temperature of the in-line heater.

Figure 2C:
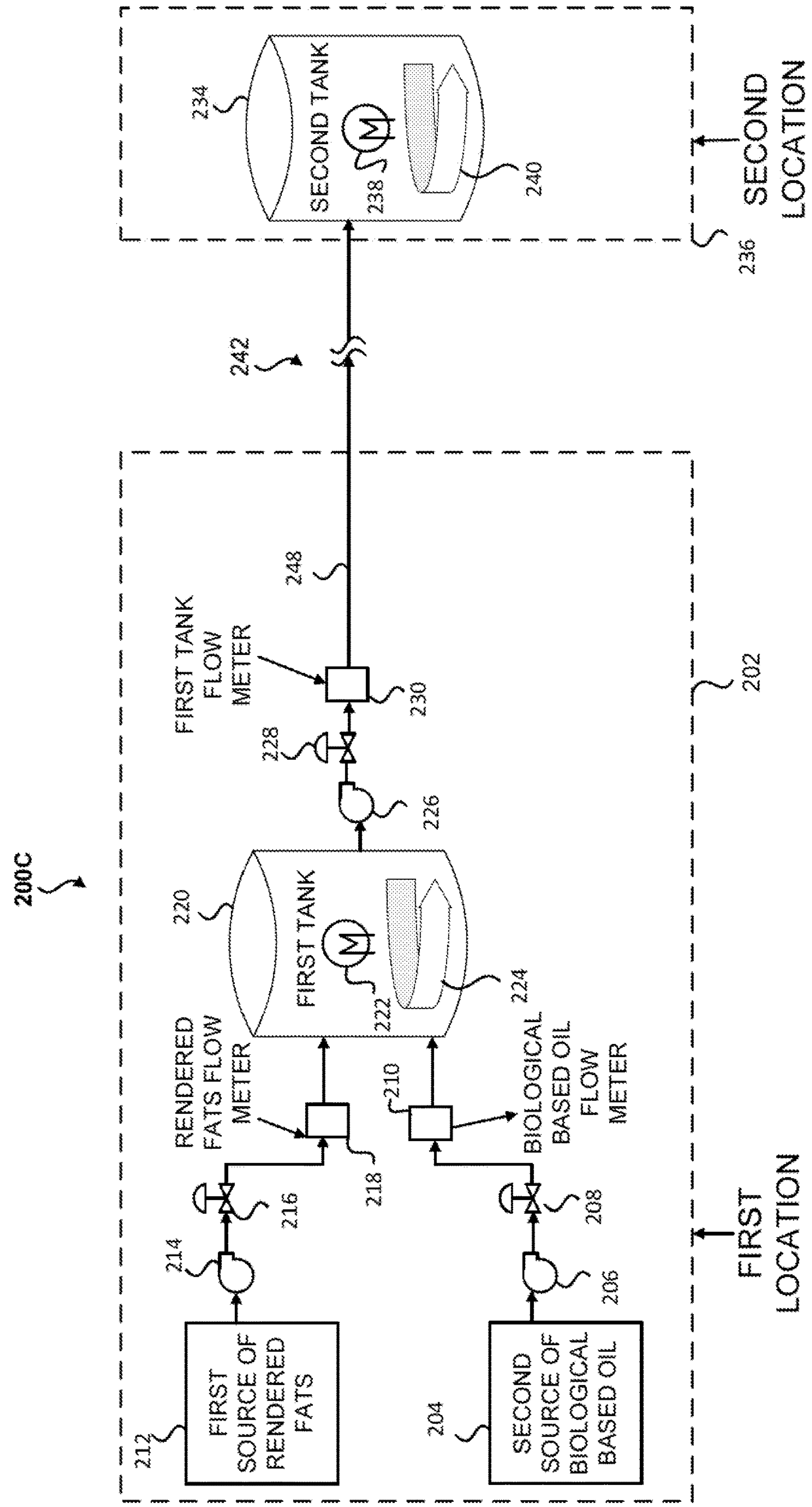
FIG. 2C is a schematic diagram illustration of a system for reducing the pour point of rendered fats using a first tank and transporting the resulting fat composition from a first location to a second location using a pipeline, according to an embodiment of the disclosure.

An embodiment of a system 200C for reducing the pour point for fat is illustrated in FIG. 2C. The system 200C, for example, may be used for transporting fat from a first location to a second location. According to an embodiment of the present disclosure, the system 200C may include a first source of rendered fats 212 to supply rendered fats in a selected quantity at a first selected temperature equal to or greater than a pour point of the rendered fats. In embodiments, the first selected temperature may be equal to or greater than about 90° F. The system further includes a source of biological-based oil 204 to supply biological-based oil in a selected quantity at a second selected temperature lower than the first selected temperature and equal to or greater than a pour point of the biological-based oil. The second selected temperature may be ranging from about 90° F. to about 130° F.

In one or more embodiments, the system 200C for reducing the pour point for a blended fat composition further includes a first tank 220 being positioned to receive the first source of rendered fats 212 and the source of biological-based oil 204 at a first location 202. The first tank 220 may include a mixing element 224 and a heating element 222 to provide the blended fat composition at a third selected temperature that has a reduced pour point that is less than the pour point of the rendered fats being supplied to the first tank 220. In embodiments, the first tank may be maintained at a temperature equal to or greater than about 90° F. The mixing element 224 and the heating element 222 may be controlled by a controller 402, as shown in FIG. 5.

Embodiments of the system 200C also includes a rendered fats pump 214 positioned between the first source of rendered fats 212 and the first tank 220. The rendered fats pump 214 is configured to supply rendered fats to the first tank 220. The rendered fats pump 214 may be controlled by a controller 402 to move fluid, as shown in FIG. 5. The embodiment of the system 200 may also include a rendered fats flow control valve 216 connected to and in fluid communication with the first source of rendered fats 212 and connected to and in fluid communication with the first tank 220. The rendered fats flow control valve 216 may be configured to supply the selected quantity of rendered fats to the first tank to create a blended fat composition. The rendered fats flow control valve 216 may be controlled by a controller 402 to adjust the flowrate, as shown in FIG. 5. The embodiment of the system 200C may further include a rendered fats flow meter 218 being disposed at a position between the rendered fats pump 214 and the first tank 220 to measure an amount of rendered fats supplied to the first tank 220 to create the blended fat composition. The rendered fats flow meter 218 may be controlled by a controller 402 to measure the flowrate, as shown in FIG. 5. The embodiment of the system 200C further includes a biological-based oil pump 206 being positioned between the source of biological-based oil 204 and the first tank 220. The biological-based oil pump 206 may be configured to supply biological-based oil to the first tank 220. The biological-based oil pump 206 may be controlled by a controller 402 to move fluid, as shown in FIG. 5.

Embodiments of the system 200C may also include a biological-based oil flow control valve 208 connected to and in fluid communication with the source of biological-based oil 204 and connected to and in fluid communication with the first tank 220. The biological-based oil flow control valve 208 may be configured to supply the selected quantity of biological-based oil 204 to the first tank 220 to create the blended fat composition. The biological-based oil flow control valve 208 may be controlled by a controller 402 to adjust the flowrate, as shown in FIG. 5. The embodiment of the system 200C may include a biological-based oil meter 210 disposed at a position between the biological-based oil pump 206 and the first tank 220 to measure an amount of biological-based oil supplied to the first tank 220 to create the blended fat composition. The biological-based oil meter 210 may be controlled by a controller 402 to measure the flowrate, as shown in FIG. 5.

In certain embodiments, an input/output is in signal communication with a fifth heat source. The fifth heat source is positioned between the first source of rendered fats and the pipeline 248 to heat a quantity of rendered fats, such that the controller is configured to adjust a first selected temperature of the quantity of rendered fats to a temperature equal to or greater than 90 degrees Fahrenheit. In certain embodiments, an input/output is in signal communication with a sixth heat source. The sixth heat source is positioned between the second source of biological-based oil and the pipeline 248 to heat a quantity of biological-based oil, such that the controller is configured to adjust a second selected temperature of the quantity of biological-based oil to a temperature ranging from about 90 degrees Fahrenheit to about 130 degrees Fahrenheit.

Embodiments of system 200C further include a first tank flow control valve 228 connected to and in fluid communication with the first tank 220 and connected to and in fluid communication with a pipeline 248. The first tank flow control valve 228 may be configured to supply the blended fat composition to the pipeline 248 to transport to a second location 236. The first tank flow control valve 228 may be controlled by a controller 402 to adjust the flowrate, as shown in FIG. 5.

The pipeline 248 is positioned to transport the blended fat composition a distance or selected distance from the first location 202 to a second a location 236 while being configured to maintain the blended fat composition at the reduced pour point. The second location may be a distance or selected distance 242 of at least 5 miles away, 15 miles away, 50 miles away, 100 miles away, 300 miles away, 500 miles away, 750 miles away, 1200 miles away, 1500 miles away or more, and distances in between from the first location.

In certain embodiments, the pipeline further may include one or more heat tracing elements so that the temperature of the pipeline is equal to or greater than about 90° F. to maintain the reduced pour point of the blended fat composition. In certain embodiments, the pipeline may maintain the reduced pour point temperature of the blended fat composition in all weather conditions.

Embodiments of system 200C also include a first tank flow meter 230 positioned between the first tank 220 and the pipeline 248 to measure an amount of blended fat composition supplied to the pipeline 248 to transport to a second location 236. The first tank flow meter 230 may be controlled by a controller 402 to measure the flowrate, as shown in FIG. 5.

According to an embodiment of the present disclosure, the system 200C further includes a second tank 234 being positioned to receive the blended fat composition from the pipeline 248. The second tank 234 includes a second mixing element 240 and a second heating element 238 to maintain the blended fat composition at the reduced pour point.

In certain embodiments, the system 200C may further include piping (for example, pipeline 248 and/or other piping internal and/or external to the first location 202 and/or second location 236). In some embodiments, the piping may be insulated using commercially available pipe insulation known to those of skill in the art. The insulated piping may maintain the first selected temperature, the second selected temperature, and the third selected temperature. In another embodiment, the system 200C may further include one or more in-line heaters to maintain the first selected temperature, the second selected temperature, and the third selected temperature throughout the system 200C. The in-line heater may be controlled by a controller. One or more temperature sensors may transmit temperature readings to the controller to operate and adjust the temperature of the in-line heater.

Figure 2D:
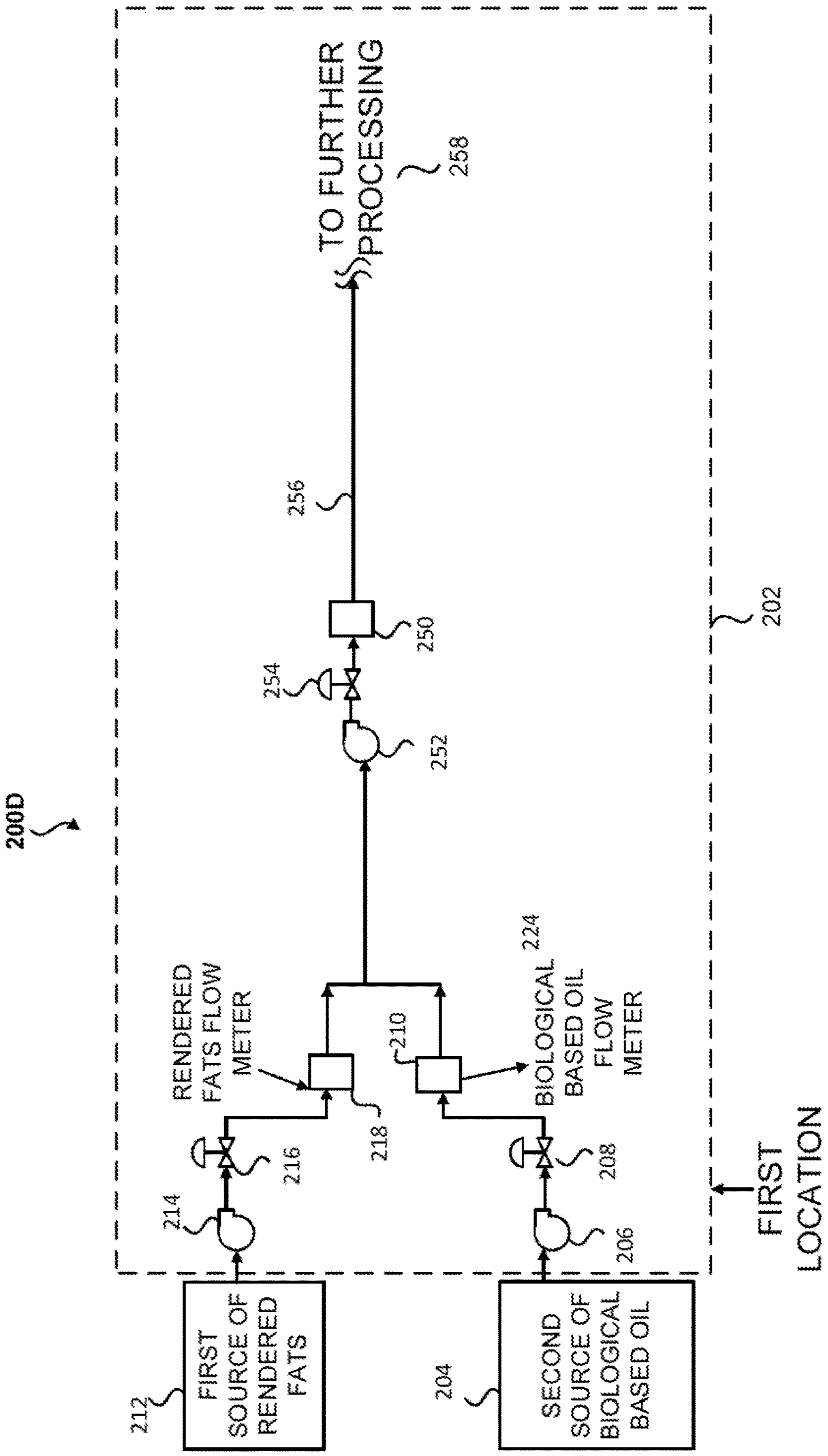
FIG. 2D is a schematic diagram illustration of a system for reducing the pour point of rendered fats and transporting the renders fats and biological-based oil from a first location to a second location using a pipeline, according to an embodiment of the disclosure.

An embodiment of a system 200D for reducing the pour point for fat as described herein and as illustrated in FIG. 2D. The system 200D, for example, may be used for transporting fat from a first location to a second location. According to an embodiment of the present disclosure, the system 200D may include a first source of rendered fats 212 to supply rendered fats in a selected quantity at a first selected temperature equal to or greater than a pour point of the rendered fats. In embodiments, the first selected temperature may be equal to or greater than about 90° F. The system further includes a source of biological-based oil 204 to supply biological-based oil in a selected quantity at a second selected temperature lower than the first selected temperature and equal to or greater than a pour point of the biological-based oil. The second selected temperature may be ranging from about 90° F. to about 130° F.

Embodiments of the system 200D also includes a rendered fats pump 214 positioned between the first source of rendered fats 212 and downstream further processing equipment 258. The rendered fats pump 214 is configured to supply rendered fats to downstream further processing equipment 258. The rendered fats pump 214 may be controlled by a controller 402 to move fluid, as shown in FIG. 4. The embodiment of the system 200D may also include a rendered fats flow control valve 216 connected to and in fluid communication with the first source of rendered fats 212 and connected to and in fluid communication with the downstream further processing equipment 258. The rendered fats flow control valve 216 may be configured to supply the selected quantity of rendered fats to the downstream further processing equipment 258 to create a blended fat composition. The rendered fats flow control valve 216 may be controlled by a controller 402 to adjust the flowrate, as shown in FIG. 4. The downstream further processing equipment 258 may be configured to blend the rendered fats and the biological-based oil to create a blended fat composition. In other embodiments, the pipeline 256 may include an in-line mixing component, element, and/or device. The pipeline 256 may mix the biological-based oil and the rendered fats to form the blended fat composition. Further, the pipeline 256 may include in-line heating and/or heat tracing elements to maintain the temperature of the blended fat composition.

The embodiment of the system 200D may further include a rendered fats flow meter 218 being disposed at a position between the rendered fats pump 214 and the downstream further processing equipment 258 to measure an amount of rendered fats supplied to the downstream further processing equipment 258 to create the blended fat composition. The rendered fats flow meter 218 may be controlled by a controller 402 to measure the flowrate, as shown in FIG. 4. The embodiment of the system 200D further includes a biological-based oil pump 206 being positioned between the source of biological-based oil 204 and the downstream further processing equipment 258. The biological-based oil pump 206 may be configured to supply biological-based oil to the downstream further processing equipment 258. The biological-based oil pump 206 may be controlled by a controller 402 to move fluid, as shown in FIG. 4.

Embodiments of the system 200B may also include a biological-based oil flow control valve 208 connected to and in fluid communication with the source of biological-based oil 204 and connected to and in fluid communication with the downstream further processing equipment 258. The biological-based oil flow control valve 208 may be configured to supply the selected quantity of biological-based oil 204 to the downstream further processing equipment 258 to create the blended fat composition. The biological-based oil flow control valve 208 may be controlled by a controller 402 to adjust the flowrate, as shown in FIG. 4. The embodiment of the system 200B may include a biological-based oil meter 210 disposed at a position between the biological-based oil pump 206 and the downstream further processing equipment 258 to measure an amount of biological-based oil supplied to the downstream further processing equipment 258 to create the blended fat composition. The biological-based oil meter 210 may be controlled by a controller 402 to measure the flowrate, as shown in FIG. 4.

Embodiments of system 200D further include a transport pump 252 connected to and in fluid communication with the rendered fats flow meter 218 and the biological based oil flow meter 210 and connected to and in fluid communication with a transport flow control valve 254. The transport flow control valve 254 may be connected to and in fluid communication with the transport pump 252 and connected to and in fluid communication with the downstream further processing equipment 258. The transport flow control valve 254 may be configured to supply the rendered fats and biological based oil to the downstream further processing equipment. The transport flow control valve 254 may be controlled by a controller 402 to adjust the flowrate, as shown in FIG. 4.

Embodiments of system 200D also include a transport flow meter 250 positioned downstream of the rendered fats flow meter 218 and the biological based oil flow meter 210 and upstream of the downstream further processing equipment 258 to measure a total amount of rendered fats and biological based oil being supplied to the downstream further processing equipment 258. The transport flow meter 250 may be controlled by a controller 402 to measure the flowrate, as shown in FIG. 4.

In certain embodiments, an input/output is in signal communication with a seventh heat source. The seventh heat source is positioned between the first source of rendered fats and the downstream further processing equipment 258 to heat a quantity of rendered fats, such that the controller is configured to adjust a first selected temperature of the quantity of rendered fats to a temperature equal to or greater than 90 degrees Fahrenheit. In certain embodiments, an input/output is in signal communication with an eighth heat source. The eighth heat source is positioned between the second source of biological-based oil and downstream further processing equipment 258 to heat a quantity of biological-based oil, such that the controller is configured to adjust a second selected temperature of the quantity of biological-based oil to a temperature ranging from about 90 degrees Fahrenheit to about 130 degrees Fahrenheit.

In certain embodiments, the system 200D may further include piping. In some embodiments, the piping may be insulated using commercially available pipe insulation known to those of skill in the art. The insulated piping may maintain the first selected temperature, the second selected temperature, and the third selected temperature. In another embodiment, the system 200D may further include one or more in-line heaters to maintain the first selected temperature, the second selected temperature, and the third selected temperature throughout the system 200D. The in-line heater may be controlled by a controller. One or more temperature sensors may transmit temperature readings to the controller to operate and adjust the temperature of the in-line heater.

In another embodiment, the first location 202 may be or may include one or more of a refinery, fuel processing facility, farm, rendered fat source, or biological-based oil source, and the second location 236 may be or may include one or more of a refinery, fuel processing facility, or a renewable transportation fuel processing location. Further processing of the blended fat composition at a fuel processing facility may include processing the blended fat composition into one or more of renewable diesel, naphtha, propane, treated fuel gas, jet renewable fuel, sustainable aviation kerosene, hydro processed esters.

As illustrated in FIG. 2D, the rendered fat and biological-based oil may be blended (for example, to form the blended fat composition) at the first location 202 and transported to another location internal to the first location 202 (for example, intra-refinery transportation via piping and/or transport vehicles) and/or external to the first location 202 (as illustrated in, for example, FIGS. 2A-2C).

Figure 2E:
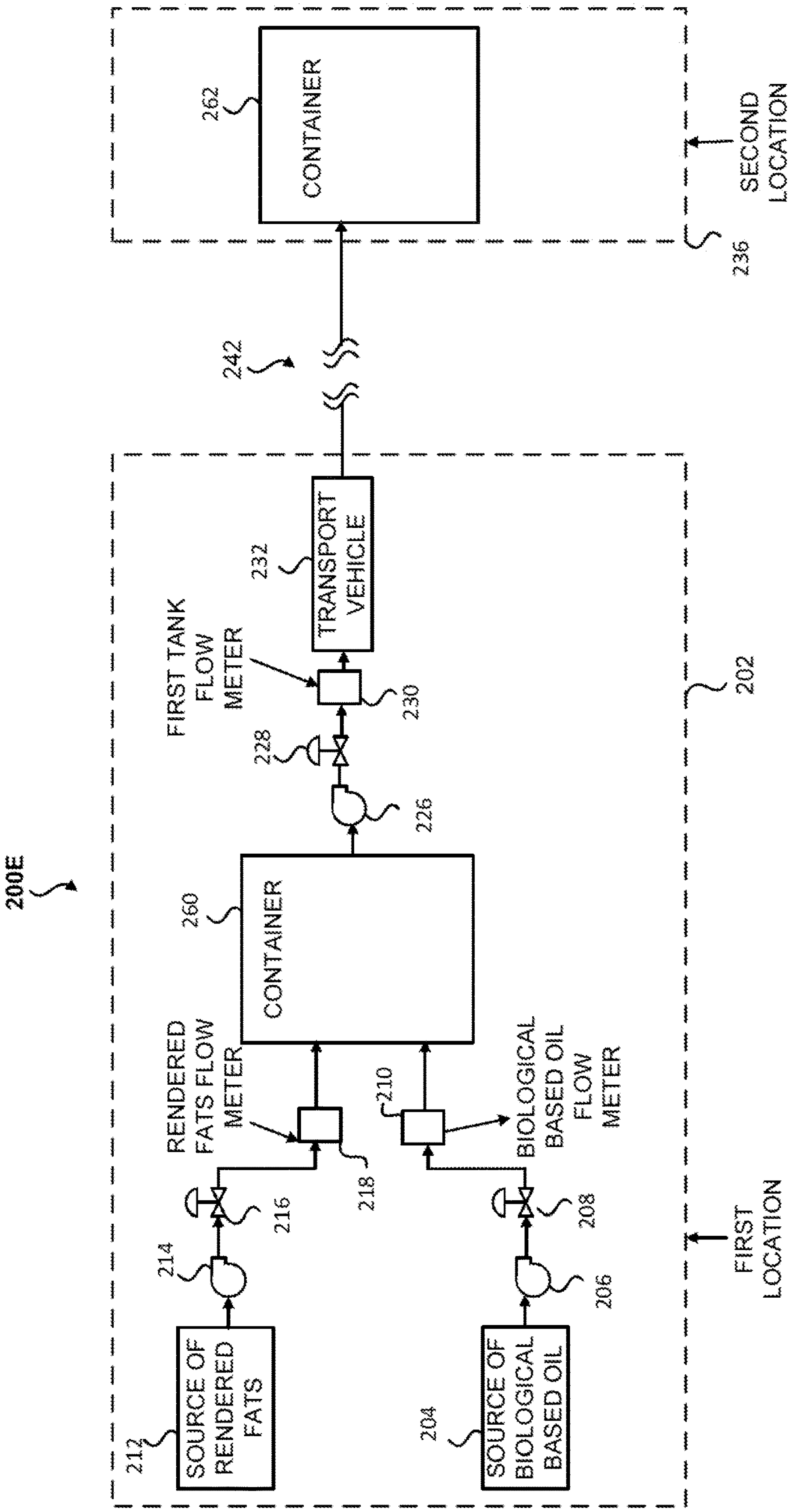
FIG. 2E is a schematic diagram illustration of a system for reducing the pour point of rendered fats, according to an embodiment of the disclosure.

In another embodiment, the blended fat composition may be stored at any time during production in a container, such as a tank, pit, trough, and/or other storage area configured to maintain a specified temperature range (such as above the reduced pour point of the blended fat composition). As illustrated in FIG. 2E, the first location 202 may include a container 260 to store the blended fat composition. In other embodiments, the container 260 may include a heating element (for example, to maintain temperature of the blended fat composition) and/or a mixing element (for example, to produce the blended fat composition or ensure that the blended fat composition remains blended). Further, the blended fat composition may be transported (for example, via a transport vehicle 232 or pipeline) to a second location 236. The second location 236 may include a container 262 (such as a tank, pit, trough, and/or other storage area configured to maintain a specified temperature range). In such an embodiment, the blended fat composition may be stored in the container 236. In other embodiments, the blended fat composition may be transported directly for use within the second location 236, rather than being stored in a container. In yet another embodiment, a portion of the blended fat composition may be used directly, while another portion of the blended fat composition may be stored for later use (for example, in container 262).

As illustrated in FIG. 5, the system may include a controller 402. The controller 402 may connect to or be in signal communication with various different sensors, other controllers, meters, or components. In another example, the controller 402 may be a controller for use in a fuel processing facility, e.g., a fuel processing facility controller, as will be understood by those skilled in the art, and may include computer programs, program logic, and/or software code or instructions, in addition to the instructions described below, to control various fuel processing facility processes and/or equipment. The controller 402 may include memory and one or more processors. The memory may store instructions executable by the one or more processors. In an example, the memory may be a machine-readable storage medium. As used herein, a "machine-readable storage medium" may be any electronic, magnetic, optical, or other physical storage apparatus to contain or store information such as executable instructions, data, and the like. For example, any machine-readable storage medium described herein may be any of random access memory (RAM), volatile memory, non-volatile memory, flash memory, a storage drive (e.g., hard drive), a solid state drive, any type of storage disc, and the like, or a combination thereof. As noted, the memory may store or include instructions executable by the processor. As used herein, a "processor" may include, for example one processor or multiple processors included in a single device or distributed across multiple computing devices. The processor may be at least one of a central processing unit (CPU), a semiconductor-based microprocessor, a graphics processing unit (GPU), a field-programmable gate array (FPGA) to retrieve and execute instructions, a real time processor (RTP), other electronic circuitry suitable for the retrieval and execution instructions stored on a machine-readable storage medium, or a combination thereof.

As used herein, "signal communication" refers to electric communication such as hard wiring two components together or wireless communication, as understood by those skilled in the art. For example, wireless communication may be Wi-Fi®, Bluetooth®, ZigBee, or forms of near-field communications. In addition, signal communication may include one or more intermediate controllers or relays disposed between elements that are in signal communication with one another. In an embodiment, the controller 402 may include a plurality of inputs, outputs, and/or input/outputs. The controller 402 may connect to the various components or devices described herein via the plurality of inputs, outputs, and/or input/outputs.

In such examples, the controller 402 may determine whether to and/or to what to adjust a flowrate of the selected quantity of rendered fats 212 and the selected quantity of biological-based oil 204 to combine at the first tank 220 in systems 200A, 200B, 200C. The controller may receive measurements from the rendered fats flow meter that measures the flow rate from the source of the rendered fats. The controller also may receive measurements from the biological-based oil flow meter that measures the flow rate from the source of the biological-based oil. The controller may further receive measurements from the first tank flow meter measuring the flow rate from the source of the first tank. The controller may further determine whether to and/or to what to adjust the flowrate of the blended fat composition to provide to one or more transport vehicles 232.

In embodiments, for example, the controller 402 of systems 200A, 200B, 200C, 200D may control the rendered fats flow control valve 216. The controller 402 in response to the flowrate measured from the rendered fats flow meter 218 may open or close the rendered fats flow control valve 216 to a select percentage open to obtain the selected rendered fats ratio in the blended fat composition. The controller 402 of system 200 may also control the biological-based oil flow control valve 208. The controller 402 in response to the flowrate measured from the biological-based oil flow meter 210 may open or close the biological-based oil flow control valve 208 to a select percentage open to obtain the selected biological-based oil ratio in the blended fat. The controller 402 of systems 200A, 200B, 200C, 200D may also control the first tank flow control valve 228. The controller 402 in response to the flowrate measured from the first tank flow meter 230 may open or close the first tank flow control valve 228 to a select percentage open to supply an amount of blended fat to the one or more transport vehicles 232, or the pipeline 248.

In another example, the controller 402 may determine whether to and/or to what to adjust the speed of the biological-based oil pump 206 and the rendered fats pump 214, and the first tank pump 226, thereby modifying the flowrate of the selected quantity of rendered fats 212 and the selected quantity of biological-based oil 204 to combine at the first tank 220. The controller may further determine whether to and/or to what to adjust the speed of the biological-based oil pump 206 and the rendered fats pump 214, and the first tank pump 226 thereby modifying the flowrate of the blended fat composition to the one or more transport vehicles 232. The controller 402 in response to the flowrate measured from the rendered fats flow meter 218 may vary the speed or continuously pump the rendered fats through the rendered fats pump 214 to obtain the rendered fats ratio in the blended fat. The controller 402 in response to the flowrate measured from the biological-based oil flow meter 210 may vary the speed or continuously pump the biological-based oil through the biological-based oil pump 206 to obtain the DCO ratio in the blended fat.

In certain embodiments in systems 200A and 200C, the controller 402 in response to the flowrate measured from the first tank flow meter 230 may vary the speed or continuously pump the blended fat composition through the first tank pump 226 to supply an amount of blended fat to the one or more transport vehicles 232. In certain embodiments in system 200B, the controller 402 in response to the flowrate measured from the transport flow meter 250 may vary the speed or continuously pump the blended fat composition through the first tank pump 226 to supply an amount of blended fat to the one or more transport vehicles 232. The controller in response to the temperature measured in the piping may adjust the temperature of in-line heaters or other heating forms for the piping.

In another example, the controller 402 of systems 200A and 200C may further be configured to obtain the flowrate from the first tank flow meter 230 after initiation of the first tank pump 226. In another example, the controller 402 of systems 200A, 200B, 200C, 200D may further be configured to obtain the flowrate from the rendered fats flow meter 218 after initiation of the rendered fats pump 214. The controller 402 of the systems 200A, 200B, 200C, 200D may also be configured to obtain the flowrate from the biological-based oil flow meter 210 after initiation of the biological-based oil pump 206.

In another example, the controller 402 of systems 200A and 200C, may control the operability of the mixing element 224 at the first tank 220. The mixing element 224 may be used continuously or may be used selectively for a selected time period. The selected time period may depend on the amount of blended fat in the first tank. The selected time period may depend on the temperature of the blended fat, as will be understood by those skilled in the art.

In another example, the controller 402 of systems 200A and 200C, may determine whether to and/or to what to adjust the first tank temperature to, to maintain the third selected temperature of the blended fat composition at the reduced pour point. The controller 402 may adjust the heating element in the first tank. Sensors may detect a temperature of the blended fat in the first tank. Temperatures below or at the pour point may signal the controller to adjust the heating element temperature.

FIG. 4 is a simplified diagram illustrating a control system or systems 200A, 200B, 200C, 200D for operatively controlling the reduction of the pour point of render fats and transporting the fat from a first location to a second location, according to an embodiment of the disclosure. As noted above, the controller 502 may include memory 406 and a processor 404 (or one or more processors). The memory 406 may store instructions and the instructions may be executable by the processor 404. The instructions may include instructions 408 to control the flow control valves and other components (for example, meters, pumps) to control or adjust the flow rate of the fluids. The controller 402 may control a rendered fats flow control valve 216, a rendered fats flow meter 218, and a rendered fats pump 214 between the first source of rendered fats and the first tank. The controller 402 may control a biological-based oil flow control valve 208, a biological-based oil flow meter 210, and a biological-based oil pump 206 between the source of biological-based oil and the first tank. The controller 402 of systems 200A and 200C, may also control a first tank flow control valve 228, a first tank flow meter 230, and a first tank pump 226 between the first tank and the one or more transport vehicles.

The controller 402 may also include computer programs or software code or instructions 410, as will be understood by those skilled in the art, to control a mixing element 224 in the first tank. The controller 402 may further include instructions 412 to control a heating element in the first tank.

Figure 3:
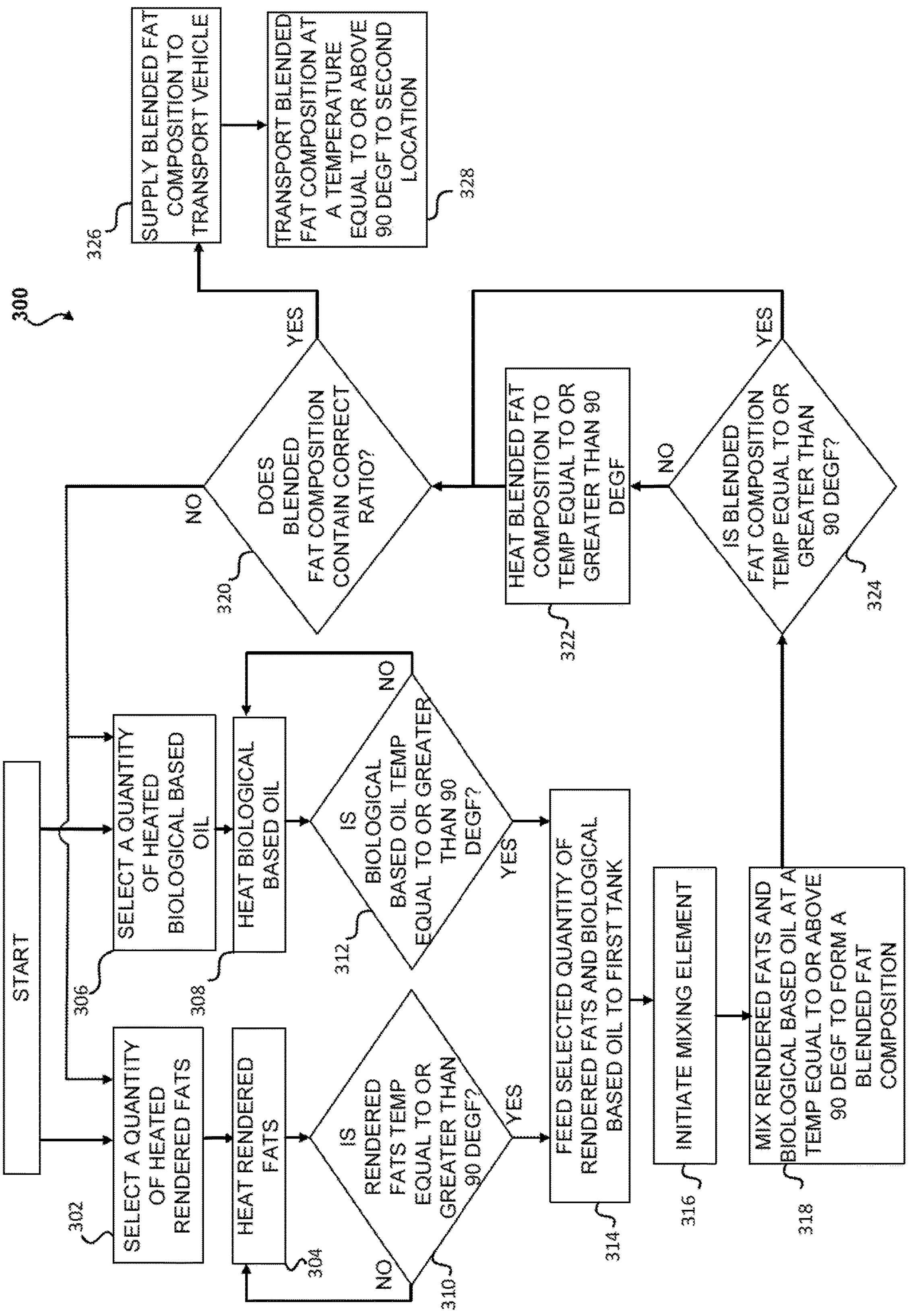
FIG. 3 is a flow diagram that illustrates the production of resulting blended fat composition with a reduced pour point transported from a first location to a second location, according to an embodiment of the disclosure.

FIG. 3 is a flow diagram of an embodiment of a method, such as instructions implemented in a controller as understood by those skilled in the art, for reducing the pour point of render fats and transporting the fat from a first location to a second location, according to an embodiment. The method, for example, also is described with reference to system 200A of FIG. 2A. Unless otherwise specified, the actions of method 300 may be implemented by the controller 402, as will be understood by those skilled in the art. Specifically, method 300 may be included in one or more computer programs, protocols, or instructions loaded into the memory of the controller 402 and executed on the processor or one or more processors of the controller 402. The order in which the operations are described is not intended to be construed as a limitation, and any number of the described blocks may be combined in any order and/or in parallel to implement the methods.

The method 300 may be initiated, for example, by a user interface connected to the controller 402, or responsive to certain determinations or other system detections, by selecting at block 302 a quantity of rendered fats and selecting a quantity of biological-based oil at block 306. At block 304, in response to a signal, the controller 402 may determine a temperature to heat the rendered fats and send a signal to heat the rendered fats from the first source of rendered fats. Similarly, at block 308, in response to a signal, the controller 402 may determine a temperature to heat the biological-based oil and send a signal to heat the biological-based oil from the source of biological-based oil. After heating the rendered fats and the biological-based oil for a sufficient amount of time, at block 310, the controller 402 may determine (for example, via a sensor) whether the rendered fats are at a sufficient or correct temperature above the pour point and/or above about 90° F. If the rendered fats are not at a sufficient or correct temperature above the pour point, the controller may send a signal for the rendered fats to undergo additional heating, at block 304. Similarly, at block 312, the controller 402 may determine (for example, via a sensor) whether the biological-based oil is at a sufficient or correct temperature above the pour point and/or above about 90° F. If the biological-based oil is not at a sufficient or correct temperature above the pour point, the controller may send a signal for the biological-based oil to undergo additional heating, at block 308.

At block 314, the rendered fats and the biological-based oil are fed into the first tank. At block 316, in response to a signal, the controller may initiate a mixing element within the first tank. The rendered fats and the biological-based oil may be mixed for a sufficient time. As such, at block 320, the controller 402 may determine (for example, via a sensor) whether the blended fat composition pour point temperature is less than the pour point of rendered fats. If the blended fat composition pour point is not less than pour point of rendered fat, at block 322, additional biological-based oil may be added where at block 306, a selected quantity of biological-based oil is heated at block 308 as described herein. Blended fat composition that has a pour point less than the pour point of rendered fats, at block 324, may be supplied to a transport vehicle. At block 326, the transport vehicle may then transport the fat at a temperature above about 90° F. to a second location.

Figure 6:
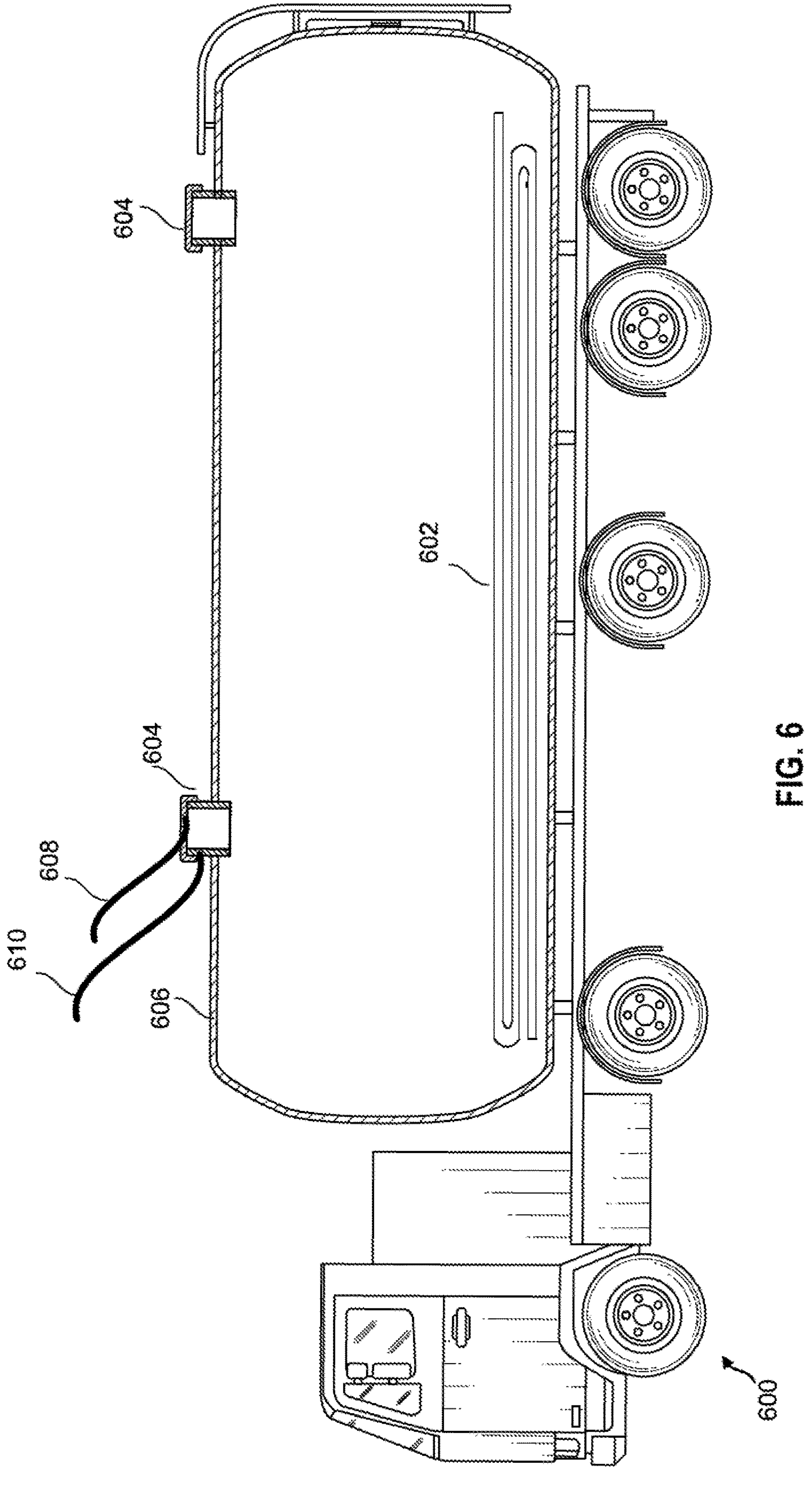
FIG. 6 is a schematic diagram illustration of a freight car to a second location and transporting the blended fat composition, according to an embodiment of the disclosure.
Figure 7:
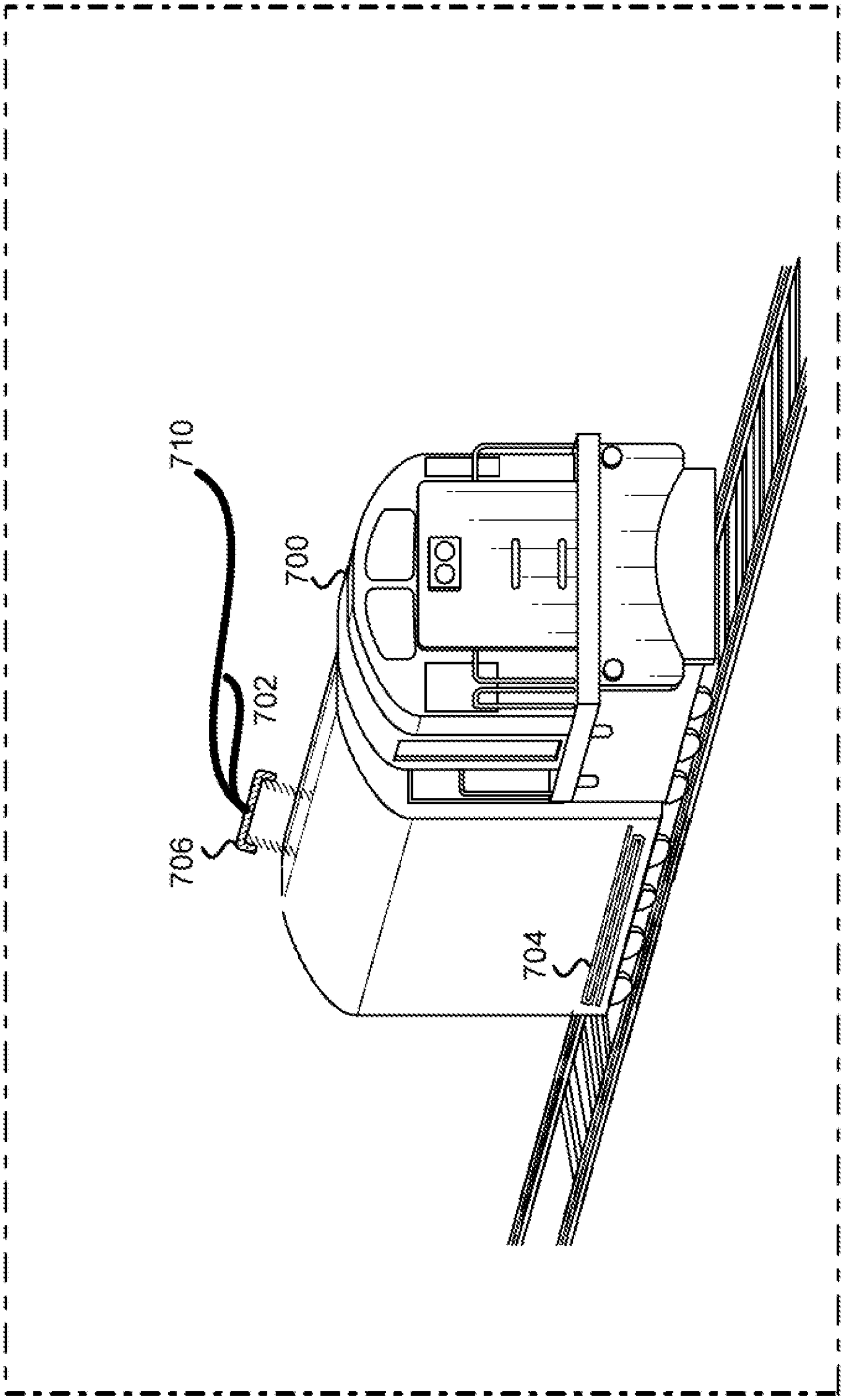
FIG. 7 is a schematic diagram illustration of a rail car to a second location and transporting the blended fat composition, according to an embodiment of the disclosure.
Figure 8:
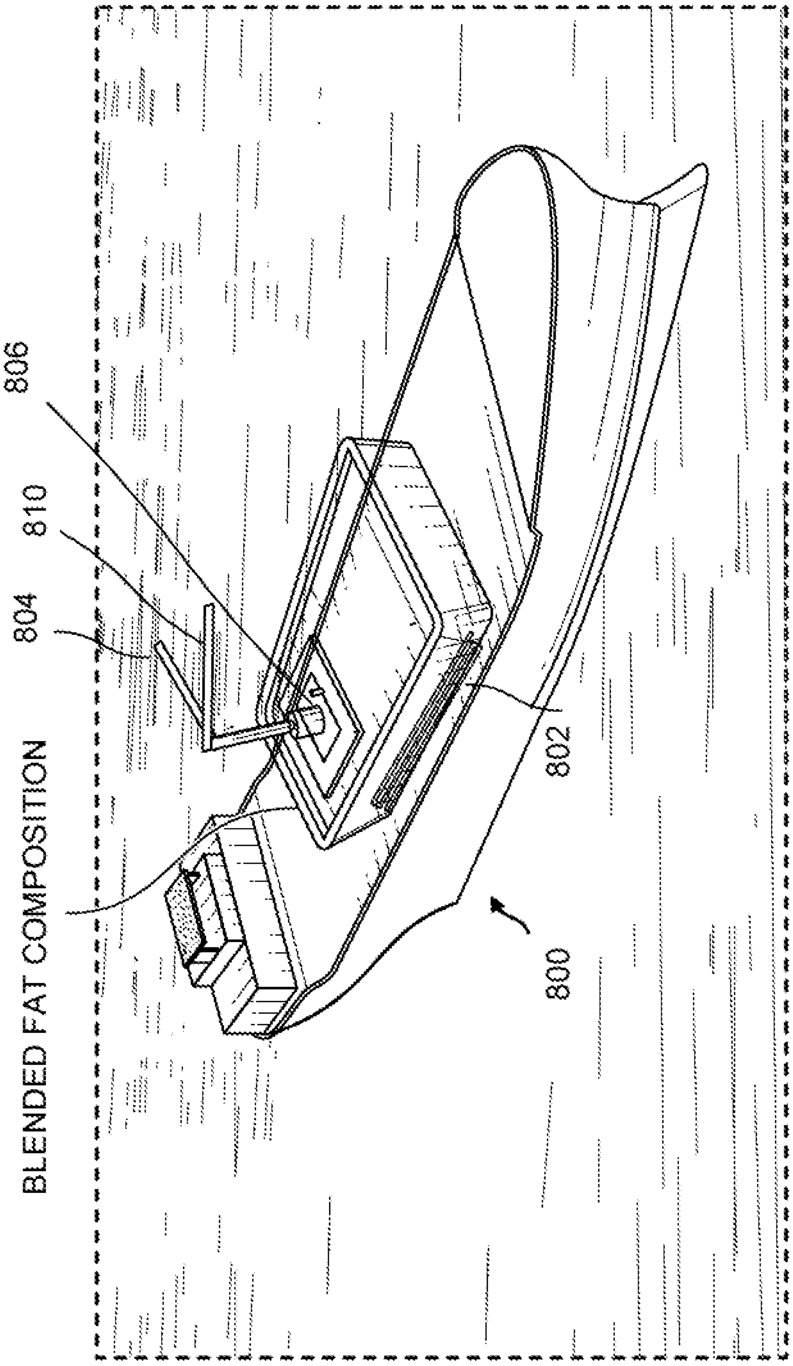
FIG. 8 is a schematic diagram illustration of a marine vessel to a second location and transporting the blended fat composition, according to an embodiment of the disclosure.

FIGS. 6-8 are schematic diagram illustrations of an embodiment of the production of fat with a reduced pour point transported from a first location to a second location, according to an embodiment of the disclosure. The transport vehicle may be a freight hauler, rail car, or a marine vessel. For example, as shown in FIG. 6, a transport vehicle such as a freight hauler 600 may transport the blended fat from the first location to a second location. The blended fat may be loaded onto the freight hauler using a hose 608 or other loading structures or apparatuses, as will be understood by those skilled in the art. The second location, for example, may be positioned many miles (such as, at least about 50 miles, and may range from about 50 miles to about 1000 miles or more, including about 500 miles, about 600 miles and about 800 miles) from the first location. The freight hauler may be insulated using insulation 606 to keep the blended fat composition in solution at the third selected temperature. The freight hauler may have a heating element 602 to maintain the third temperature. If the third selected temperature decreases, the heating element will heat the blended fat to the third selected temperature. The blended fat may be offloaded at the second location from a port 604 using an unloading structure 610. As used herein, the unloading structure may be a hose or an apparatus, such as a conduit, line, or pipe.

In another example, as shown in FIG. 7, a rail car 700 may transport the blended fat from the first location to a second location. The blended fat may be loaded onto the rail car using a hose 702 or other loading structures or apparatuses, as will be understood by those skilled in the art. The second location, for example, may be positioned many miles (such as, at least about 50 miles, and may range from about 50 miles to about 1000 miles or more, including about 500 miles, about 600 miles and about 800 miles) from the first location. The rail car may be insulated to keep the blended fat in solution at the third selected temperature. The rail car may have a heating element 704 to maintain the third temperature. The heating element may be a steam generator, an electric infrared (IR) heater, or a gas-fired radiant heater. If the third selected temperature decreases, the heating element will heat the blended fat to the third selected temperature. The blended fat may be offloaded at the second location from a port 706 using an unloading structure 710.

In another example, as shown in FIG. 8, a marine vessel 800 may transport the blended fat from the first location to a second location. The blended fat may be loaded onto the marine vessel using a hose 804 or other loading structures or apparatuses, as will be understood by those skilled in the art. The second location, for example, may be positioned many miles (such as, at least 50 miles, and may range from 50 miles to about 1000 miles or more, including about 500 miles, about 600 miles and about 800 miles) from the first location. The marine vessel may be insulated to keep the blended fat in solution at the third selected temperature. The marine vessel may have a heating element 802 to maintain the third temperature. The heating element may be a steam generator, an electric infrared (IR) heater, or a gas-fired radiant heater. If the third selected temperature decreases, the heating element will heat the blended fat to the third selected temperature. The blended fat may be offloaded at the second location from a port 806 using an unloading structure 810.

Although specific terms are employed herein, the terms are used in a descriptive sense only and not for purposes of limitation. Embodiments of systems and methods have been described in considerable detail with specific reference to the illustrated embodiments. However, it will be apparent that various modifications and changes can be made within the spirit and scope of the embodiments of systems and methods as described in the foregoing specification, and such modifications and changes are to be considered equivalents and part of this disclosure.

EXPERIMENTAL

Tests were carried out to evaluate the pour point of the blended fat compositions at various temperatures at varying ratios of the fat and DCO in the blended fat composition. Additionally, the cloud point and viscosity were also measured. The varying ratios of fat composition and DCO in the blended fat composition pour points were also compared to the pour point, cloud point, and viscosity of fat and DCO to evaluate the effectiveness of the blended fat compositions in reducing the pour point of rendered fats. Test results are shown in Table 2.

EXAMPLE

Multiple blends of blended fat compositions were developed using DCO and technical tallow at varying ratios and temperature. The blends included biological-based oils and rendered fats exemplified in Table 1 below, which further discloses the pour point (PP, in both degrees Celsius (° C.) and Fahrenheit (° F.)) and well as the melting point (MP, in ° F.). Blends included 5% tallow and 95% DCO, 10% tallow and 90% DCO, 15% tallow and 85% DCO, 20% tallow and 80% DCO, and 25% tallow and 75% DCO. All blends were made by weight percent. The DCO used in testing was from a first site/location tank 1081, and technical tallow was sourced from a remote vendor.

TABLE 1

| Rendered Fats/Oils | PP(° C.) | PP(° F.) | MP(° F.) |
|---|---|---|---|
| Canola | −26 | −15 | |
| Soybean Oil | −10 | 14 | |
| UCO | −5 | 23 | |
| 20% UCO/80% Pork Fat | 9 | 48 | 77 |
| Poultry Fat solid | 1 | 34 | 106 |
| CWG | 20 | 68 | 91 |
| Pork CWG | 23 | 73 | 93 |
| Brown Grease | 26 | 79 | 90 |
| Yellow Grease | 29 | 84 | 91 |
| Lard Pork fat | | | 93 |
| Refined Beef Tallow | | | 109 |
| Inedible and Polished Tallow | | | 113 |
| Lard Pork fat | | | 120 |

Testing began with tallow at 75° F., at which temperature the tallow remained solid. The tallow was next mixed with DCO in a 25% tallow, 75% DCO ratio but the tallow remained solid and required scraping out of the container. As such, the tallow did not go into solution at 75° F. The 25% tallow, 75% DCO ratio was then heated up to 100° F. for one hour without mixing. After approximately one hour, the tallow was in solution. At 100° F., although the tallow was fluid, solids remained within the testing sample. Additionally, the solids remain within the blended tallow despite the addition of DCO. The testing sample was again mixed and placed in a 100° F. water bath for approximately 30 minutes. After 30 minutes, the blended tallow was completely homogenized.

Another sample blended tallow was created at 125° F. which included mixing the tallow and DCO. The blended tallow was fluid and in solution with no visible solids at this temperature. A small observation study was conducted allowing the 125° F. blends to sit at about 60° F. for 36 hours. After 36 hours, the blended tallow was no longer in solution.

The test samples of various ratio blends were carried out to test the cloud point, pour point, American Petroleum Institute (API) gravity, and viscosity of the various blended tallows at 100° F. and 125° F. However, only the 100° F. blends were analyzed for API gravity at 60° F. The test samples were heated to 140° F. prior to injection into the instrument to avoid the tallow setting up within the measurement cell.

Testing to evaluate the pour point of blended tallows at varying ratios of the rendered fats and DCO in the blended tallows was conducted in one-degree (1°) increments, as compared to diesel which is normally conducted at 5° increments for pour point determination. Pour point testing was carried out in accordance with ASTM D5950, as will be understood by those skilled in the art.

Figure 9:
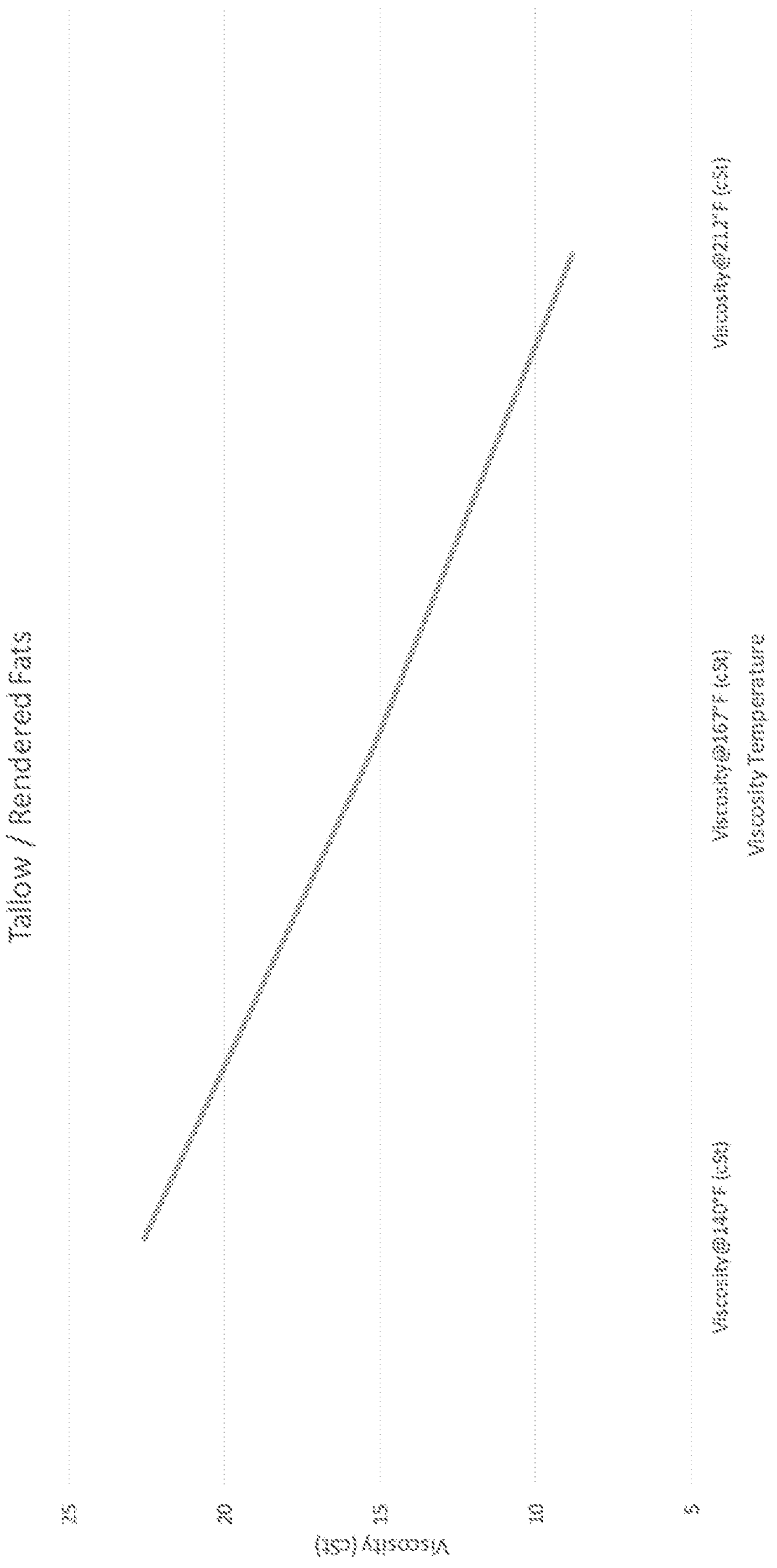
FIG. 9 is a graph showing the viscosity measured at different temperatures of blended fat compositions, according to an embodiment of the disclosure.
Figure 10:
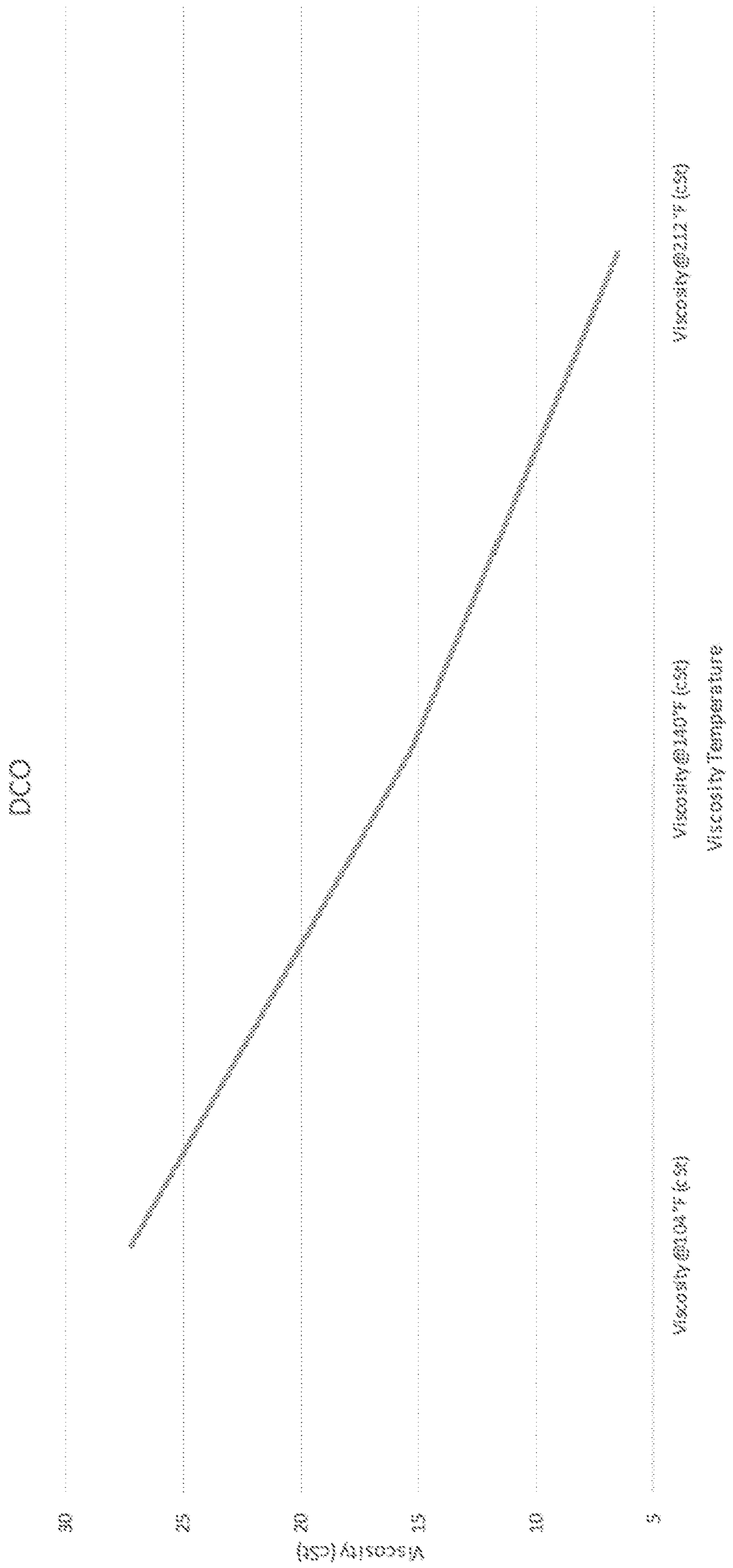
FIG. 10 is a graph showing the viscosity measured at different temperatures of DCO, according to an embodiment of the disclosure.
Figure 11:
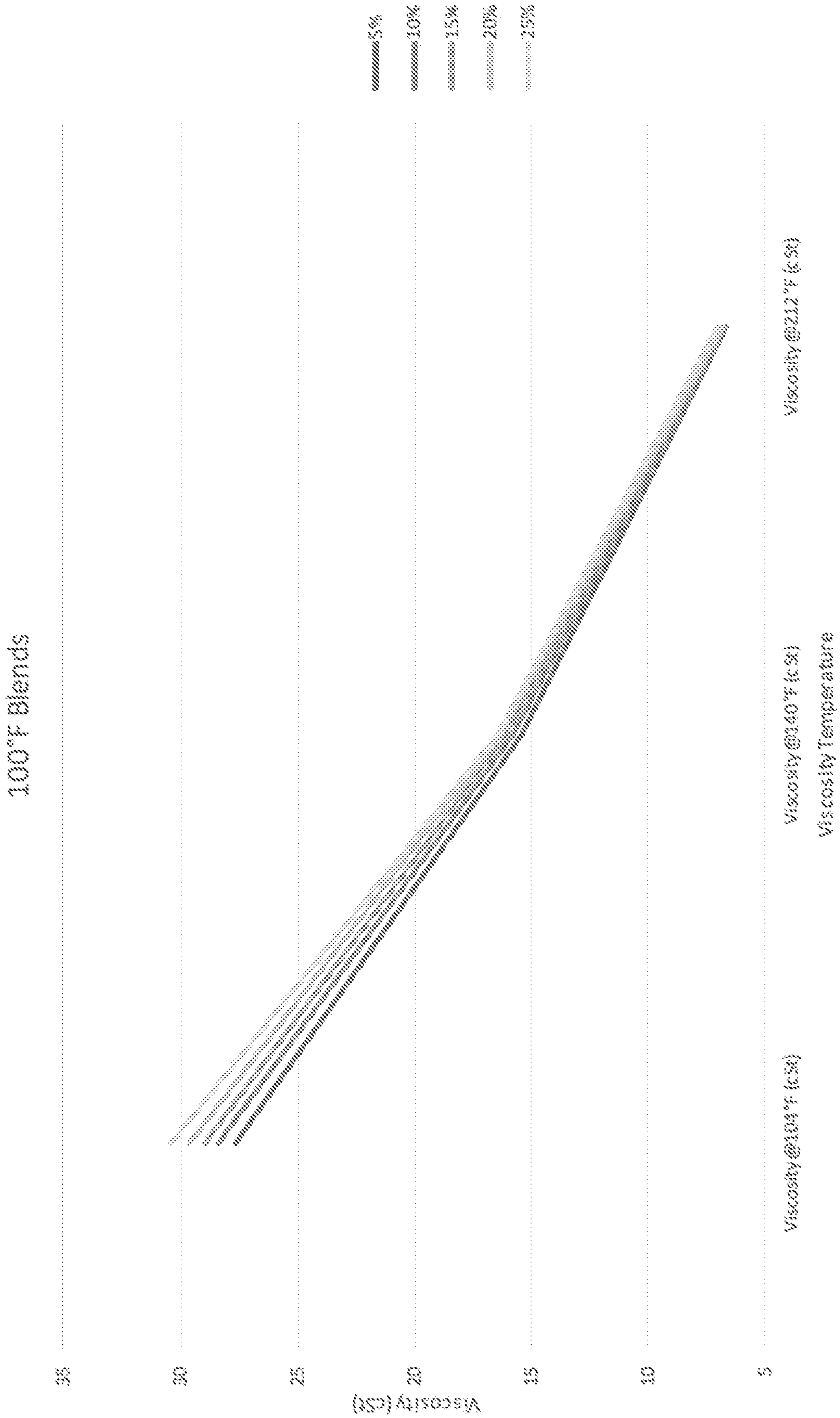
FIG. 11 is a graph showing the viscosity measured at different temperatures of blended fat compositions at 100 degrees Fahrenheit (100° F.) for various ratios of blended fat compositions, according to an embodiment of the disclosure.
Figure 12:
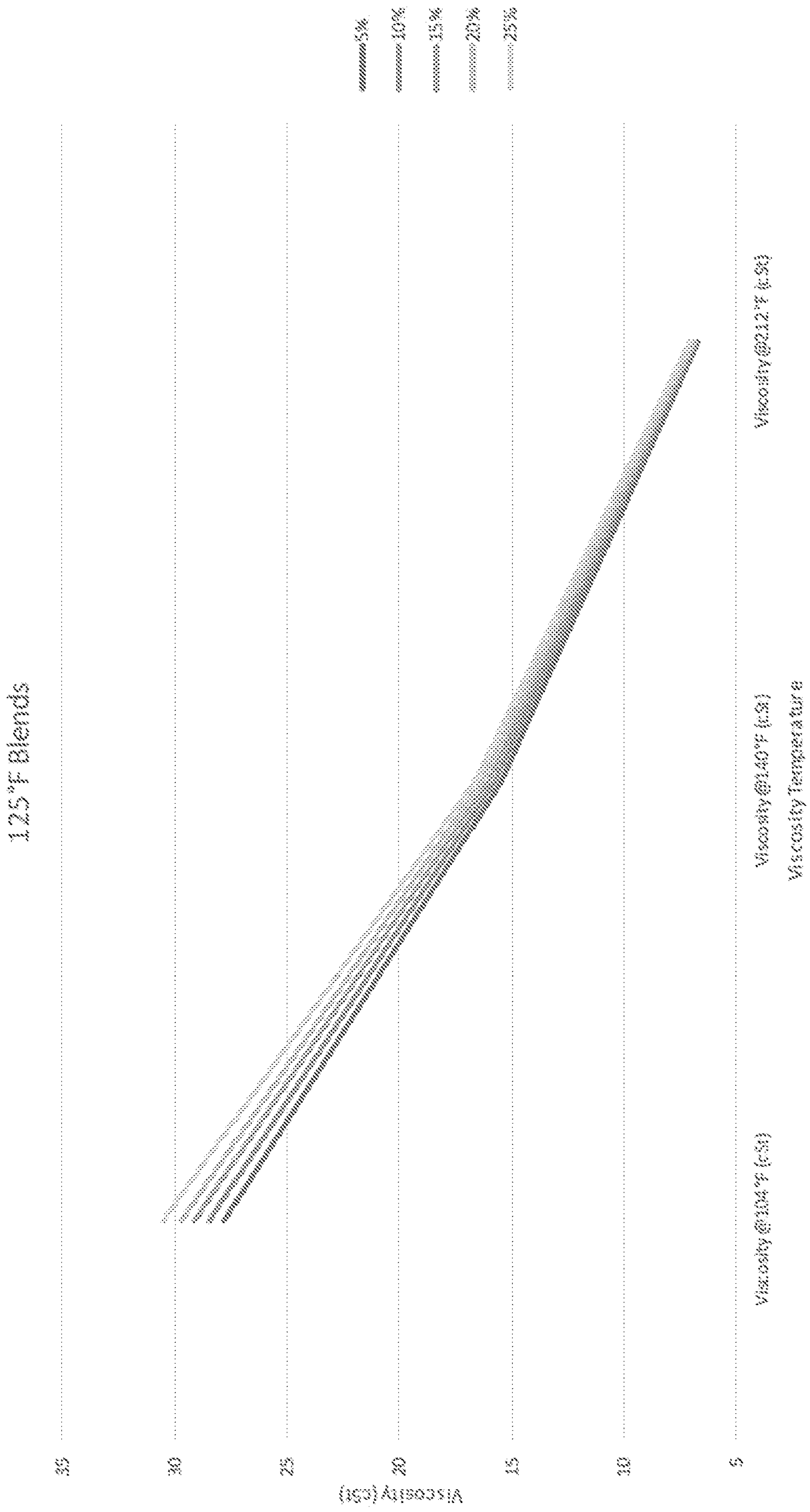
FIG. 12 is a graph showing the viscosity measured at different temperatures of blended fat compositions at 125 degrees Fahrenheit (125° F.) for various ratios of blended fat compositions, according to an embodiment of the disclosure.

As shown in Table 2 and Table 3, increasing the amount of DCO mixed with tallow decreased the pour point temperature of the blended tallow. For example, rendered fats alone, as illustrated in FIG. 9, are more viscous at lower temperatures. A biological-based oil, such as DCO, as illustrated in FIG. 10, is less viscous than rendered fats at the same temperature. However, as in FIG. 11, the viscosity increases as rendered fats increases in the blend between rendered fats and DCO at 100° F. The viscosity also increases as rendered fats increases in the blend between rendered fats and DCO at 125° F. As seen in Table 2 and Table 3, at 25% tallow and 75% DCO at 100° F., the pour point is about 32° F. At 5% tallow and 95% DCO at 100° F., the pour point is about 21.2° F. The pour point decreased almost 11° F. The pour point of blended tallow at 125° F. remained in the same range as blended tallow at 100° F. Without wishing to be bound by theory, it is believed that the decrease in pour point is due to the lower pour point of DCO at about 19.4° F. compared to tallow pour point at about 87.8° F., as seen in Table 2 and Table 3.

TABLE 2

| Blend Temperature* | Tallow | DCO | Temp of Observed blend clarity (F.)** | API@60° F. | D5950 Pour Point (° C.) | D5950 Pour Point (° F.) | D5771 Cloud Point (° C.) | D5771 Cloud Point (° F.) |
|---|---|---|---|---|---|---|---|---|
| 100° F. Blends | 0% | 100% | | 22.2 | −7 | 19 | 1 | 34 |
| | 5% | 95% | 95 | 22.2 | −6 | 21 | 10 | 50 |
| | 10% | 90% | 95 | 22.2 | −6 | 21 | 15 | 59 |
| | 15% | 85% | 100 | 22.3 | −5 | 23 | 17 | 63 |
| | 20% | 80% | 100 | 22.3 | −3 | 27 | 19 | 66 |
| | 25% | 75% | 100 | 22.4 | 0 | 32 | 20 | 68 |
| | 30% | 70% | 100 | | 8 | 46 | | |
| | 35% | 65% | 100 | | 12 | 54 | | |
| | 40% | 60% | 100 | | 17 | 63 | | |
| | 50% | 50% | 110 | | 19 | 66 | | |
| | 60% | 40% | 110 | | 22 | 72 | | |
| | 70% | 30% | 110 | | 28 | 82 | | |
| | 80% | 20% | 110 | | 28 | 82 | | |
| | 90% | 10% | 115 | | 30 | 86 | | |
| | 100% | 0% | | 21.6 | 31 | 88 | | |
| | 0% | 100% | | 22.2 | −7 | 19 | 1 | 34 |
| 125° F. blends | 5% | 95% | | 22.2 | −6 | 21 | 9 | 48 |
| | 10% | 90% | | 22.2 | −6 | 21 | 14 | 57 |
| | 15% | 85% | | 22.3 | −3 | 27 | 17 | 63 |
| | 20% | 80% | | 22.3 | 1 | 34 | 20 | 68 |
| | 25% | 75% | | 22.4 | 1 | 34 | 21 | 70 |

TABLE 3

| Blend Temperature* | Tallow | DCO | Final Melting Point (° F.) | D445 Viscosity@ 104° F. (cSt) | D445 Viscosity@ 140° F. (cSt) | D445 Viscosity@ 167° F. (cSt) | D445 Viscosity@ 212° F. (cSt) |
|---|---|---|---|---|---|---|---|
| | 0% | 100% | | 27.24 | 15.26 | | 6.572 |
| 100° F. | 5% | 95% | | 27.65 | 15.47 | | 6.692 |
| Blends | 10% | 90% | | 28.35 | 15.81 | | 6.70 |
| | 15% | 85% | | 28.94 | 16.07 | | 6.885 |
| | 20% | 80% | | 29.58 | 16.37 | | 6.820 |
| | 25% | 75% | | 30.43 | 16.43 | | 7.014 |
| | 30% | 70% | | | | | |
| | 35% | 65% | | | | | |
| | 40% | 60% | | | | | |
| | 50% | 50% | | | | | |
| | 60% | 40% | | | | | |
| | 70% | 30% | | | | | |
| | 80% | 20% | | | | | |
| | 90% | 10% | | | | | |
| | 100% | 0% | 110.3 | | 22.56 | 15.2 | 8.817 |
| | 0% | 100% | | 27.24 | 15.26 | | 6.572 |
| 125° F. | 5% | 95% | | 27.78 | 15.49 | | 6.674 |
| blends | 10% | 90% | | 28.41 | 15.80 | | 6.777 |
| | 15% | 85% | | 29.07 | 16.09 | | 6.871 |
| | 20% | 80% | | 29.71 | 16.40 | | 6.959 |
| | 25% | 75% | | 30.50 | 16.69 | | 7.106 |

Figure 13:
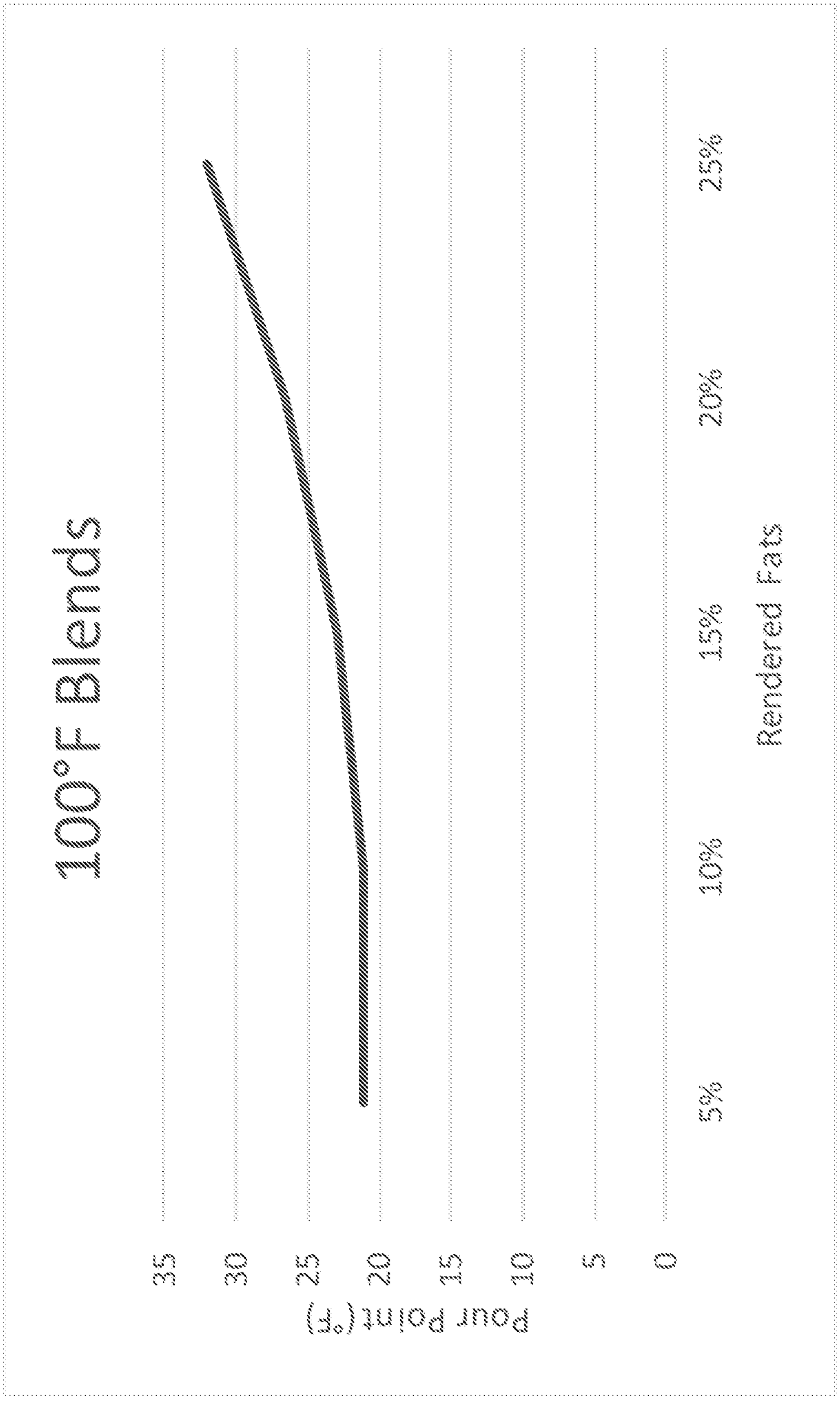
FIG. 13 is a graph showing the pour point of blended fat compositions at 100 degree Fahrenheit (100° F.) for various ratios of blended fat compositions, according to an embodiment of the disclosure.
Figure 14:
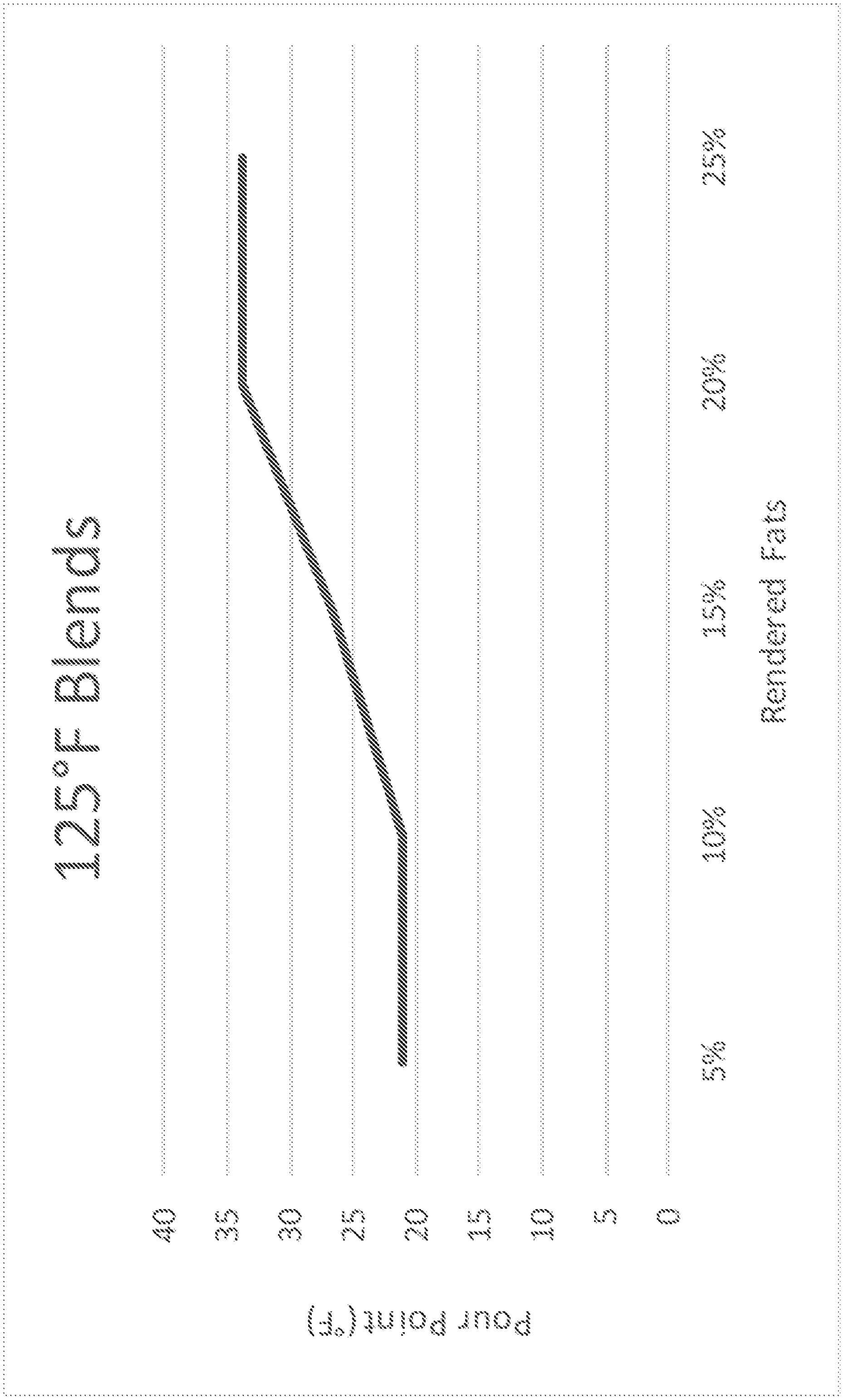
FIG. 14 is a graph showing the pour point of blended fat compositions at 125 degree Fahrenheit (125° F.) for various ratios of blended fat compositions, according to an embodiment of the disclosure.
Figure 15:
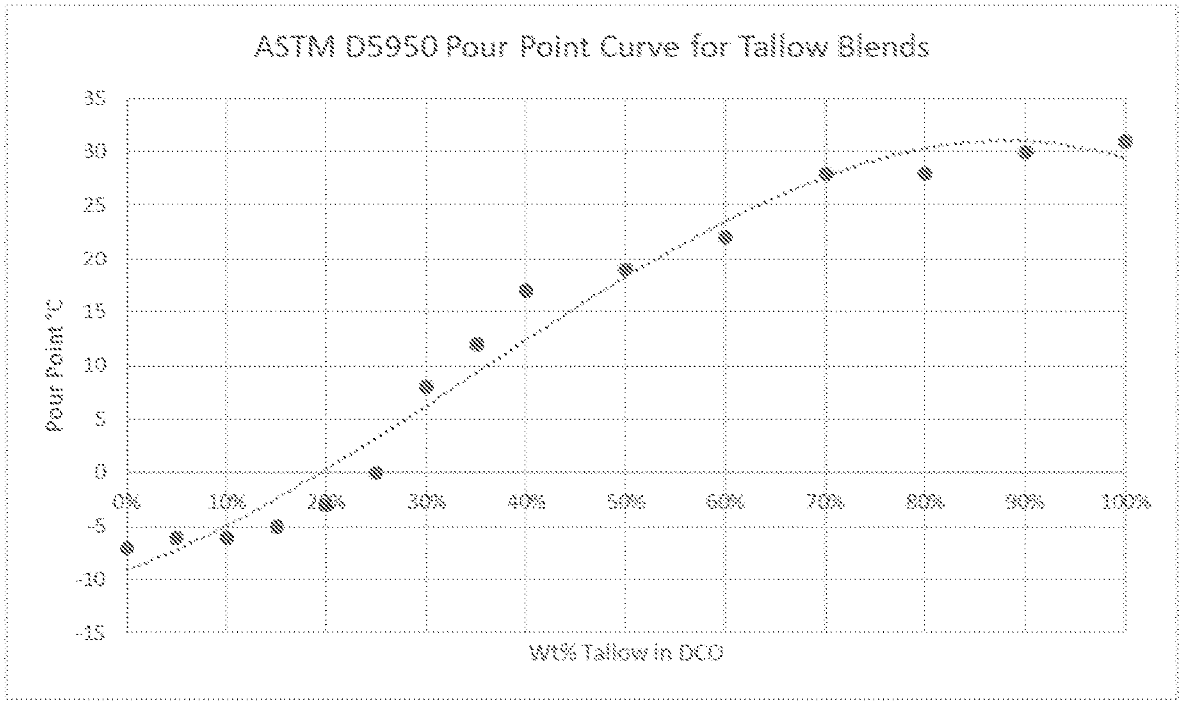
FIG. 15 is a graph showing the pour points of blended fat compositions over a temperature range of about −10° C. (about 14° F.) to about 30° C. (about 86° F.) for various ratios of blended fat compositions, according to an embodiment of the disclosure.

In FIGS. 13-15, the pour point of the blended tallows at varying ratios are compared. As shown in FIGS. 13-15, the pour point decreased with less rendered fats by weight percent of the blended tallow. As shown in FIGS. 13-14, no substantial difference existed between the 100° F. test samples and the 125° F. test samples.

Testing to evaluate the cloud point of blended tallows at varying ratios of the rendered fats and DCO in the blended tallows was carried out in accordance with ASTM D5771 (https://www.astm.org/d5771-21.html), as will be understood by those skilled in the art. As seen in Table 2, increasing the ratio of DCO mixed with tallow, decreased the cloud point temperature of the blended tallow. For example, at 25% tallow and 75% DCO at 100° F., the cloud point is about 68° F. At 5% tallow and 95% DCO at 100° F., the cloud point is about 50° F. The cloud point decreased 18° F. The cloud point of blended tallow at 125° F. remained in the same range as blended tallow at 100° F. Without wishing to be bound by theory, it is believed that the decrease in the cloud point at higher ratios of DCO in the blended tallow is due to the cloud point of DCO at about 33.8° F.

Testing to evaluate the viscosity of blended tallows at varying ratios of the rendered fats and DCO in the blended tallows was carried out in accordance with ASTM D445 (https://https://www.astm.org/d0445-19.html) as will be understood by those skilled in the art. As seen in Table 2, increasing the amount of DCO mixed with tallow decreased the viscosity of the blended tallow. For example, at 25% tallow and 75% DCO at 100° F., the viscosity at 104 degrees Fahrenheit (104° F.) is about 30.43 centistokes (cSt). At 5% tallow and 95% DCO at 100 degrees Fahrenheit, the viscosity at 104° F. is about 27.65 cSt. The viscosity decreased almost 3 cSt. The viscosity of blended tallow at 125° F. remained in the same range as blended tallow at 100° F. Without wishing to be bound by theory, it is believed that the decrease in viscosity at higher ratios of DCO in the blended tallow is due to the viscosity of DCO at about 27.24 cSt. At 104° F., tallow is not above its melting point, thus viscosity cannot be measured. As shown in FIGS. 13 and 14, viscosity measured at higher temperatures, however, significantly increased the flow of the blended tallow when compared to viscosity measure at low temperatures.

When ranges are disclosed herein, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, reference to values stated in ranges includes each and every value within that range, even though not explicitly recited. Thus, every point or individual value may serve as its own lower or upper limit combined with any other point or individual value or any other lower or upper limit, to recite a range not explicitly recited.

This application is a continuation of U.S. Non-Provisional application Ser. No. 18/103,633, filed Jan. 31, 2023, titled "SYSTEMS AND METHODS FOR REDUCING RENDERED FATS POUR POINT," which claims priority to and the benefit of U.S. Provisional Application No. 63/267,317, filed Jan. 31, 2022, titled "SYSTEMS AND METHODS FOR REDUCING RENDERED FATS POUR POINT AND TRANSPORTING BLENDED FAT BASED COMPOSITIONS," the disclosures of which are incorporated herein by reference in their entirety.

In the drawings and specification, several embodiments of systems and methods for reducing a pour point of rendered fats and transporting a blended fat based composition have been disclosed, and although specific terms are employed, the terms are used in a descriptive sense only and not for purposes of limitation. Embodiments of systems and methods have been described in considerable detail with specific reference to the illustrated embodiments. However, it will be apparent that various modifications and changes may be made within the spirit and scope of the embodiments of methods and compositions as described in the foregoing specification, and such modifications and changes are to be considered equivalents and part of this disclosure.

What is claimed is:

1. A method of reducing pour point for a blended fat composition, the method comprising:

supplying (1) a selected quantity of rendered fats at a first selected temperature equal to or greater than a pour point of the rendered fats and (2) a selected quantity of a biological-based oil at a second selected temperature lower than the first selected temperature and equal to or greater than a pour point of the biological-based oil;

mixing the selected quantity of rendered fats and the selected quantity of the biological-based oil so as to define a blended fat composition which has a reduced pour point less than the pour point of the rendered fats; and maintaining a third selected temperature of the blended fat composition during transport to a fuel processing facility.

2. The method of claim 1, wherein the third selected temperature is based on one or more of ambient temperature, the pour point of the rendered fats, the pour point of the biological-based oil, or a pour point of the blended fat composition, and the method further comprise supplying the blended fat composition to the fuel processing facility while the third selected temperature is maintained.

3. The method of claim 2, further comprising, in response to a change in ambient temperature, adjusting the third selected temperature so that the blended fat composition has the reduced pour point less than the pour point of the rendered fats being supplied.

4. The method of claim 2, further comprising, after mixing the selected quantity of rendered fats and the selected quantity of the biological-based oil, sampling the blended fat composition to measure the pour point of the blended fat composition, and wherein the third selected temperature is based on a measured pour point of the blended fat composition.

5. The method of claim 1, wherein the mixing includes by use of one or more mixing devices, the one or more mixing devices comprising one or more of a mixing tank, in-line mixing pipeline, or mixing element in a transport vehicle.

6. The method of claim 2, wherein further use of the blended fat composition at the fuel processing facility comprises processing the blended fat composition into one or more of renewable diesel, naphtha, propane, or treated fuel gas.

7. The method of claim 2, wherein prior to supplying of the blended fat composition to the file processing facility for further use at the fuel processing facility:

transporting the blended fat composition to a second location remote from a first location so as to maintain the blended fat composition at a temperature above the reduced pour point.

8. A method of reducing pour point for a blended fat composition to transport the blended fat composition from a first location to a second location, the method comprising:

supplying a selected quantity of rendered fats and a selected quantity of a biological-based oil to a first tank positioned at the first location, the rendered fats being supplied at a first selected temperature equal to or greater than a pour point of the rendered fats and the biological-based oil being supplied at a second selected temperature lower than the first selected temperature and equal to or greater than a pour point of the biological-based oil;

mixing the selected quantity of rendered fats and the selected quantity of the biological-based oil in the first tank so as to define a blended fat composition in the first tank, the blended fat composition having a third selected temperature less than the first selected temperature and greater than the second selected temperature and high enough so that the third selected temperature is equal to or greater than a pour point of the blended fat composition so that the blended fat composition has a reduced pour point;

maintaining the third selected temperature of the blended fat composition in the first tank so that the blended fat composition has a reduced pour point less than the pour point of the rendered fats supplied to the first tank;

supplying the blended fat composition having the reduced pour point to one or more transport vehicles, the one or more transport vehicles each configured to maintain the blended fat composition at a temperature above the reduced pour point during transport; and transporting the blended fat composition to the second location remote from the first location so as to maintain the blended fat composition at a temperature above the reduced pour point.

9. The method of claim 8, wherein the biological-based oil comprises one or more of technical corn oil (TCO), distillers corn oil (DCO), soybean oil, sorghum oil, canola oil, rapeseed oil, algal oil, fish oil, chufa/tigernut oil, sativa seed oil, coconut oil or combinations thereof, and wherein the first tank includes a mixing element to mix the selected quantity of rendered fats and the selected quantity of biological-based oil for a selected amount of time, thereby to form the blended fat composition, the mixing element configured to be controlled via a controller.

10. The method of claim 8, wherein the first tank includes a heating element to maintain the third selected temperature of the blended fat composition, and the method further comprising controlling the heating element via a controller and supplying the blended fat composition from the one or more transport vehicles at the reduced pour point to the second location, thereby to process further the blended fat composition after arrival at the second location into a fuel.

11. The method of claim 8, further comprising heating a first source of rendered fats to the first selected temperature and a source of the biological-based oil to the second selected temperature prior to supplying the selected quantity of the rendered fats and the selected quantity of the biological-based oil to the first tank.

12. The method of claim 8, wherein the first selected temperature is equal to or greater than 90 degrees Fahrenheit and the second selected temperature is from about 90° F. to about 130° F.

13. The method of claim 8, wherein the first tank is maintained at a temperature equal to or greater than 90 degrees Fahrenheit.

14. The method of claim 8, wherein the one or more transport vehicles comprises one or more of a rail car, a freight hauler, or a marine vessel.

15. The method of claim 14, wherein each of the one or more transport vehicles is configured to maintain temperature so as to be equal to or greater than 90 degrees Fahrenheit in the one or more transport vehicles and greater than the reduced pour point of the blended fat composition during a plurality of weather conditions.

16. The method of claim 8, wherein the selected quantity of rendered fats comprises from about 0.01% weight percent to about 30% of the weight percent of the blended fat composition.

17. The method of claim 8, wherein the rendered fats comprise one or more of tallow, choice white, grease, used cooking oil, or one or more additional fats/oils derived from bovine, ovine, piscine, porcine, or poultry.

18. The method of claim 8, wherein the selected quantity of rendered fats and the selected quantity of the biological-based oil to the first tank is determined via one or more controllers, and wherein the supplying of the blended fat composition to the one or more transport vehicles is controlled via the one or more controllers.

19. A system to reduce pour point for a blended fat composition to transport the blended fat composition from a first location to a second location, the system comprising:

a first source of rendered fats having a selected quantity of the rendered fats at a first selected temperature equal to or greater than a pour point of the rendered fats;

a second source of a biological-based oil having a select quantity of the biological-based oil at a second selected temperature lower than the first selected temperature and equal to or greater than a pour point of the biological-based oil the biological-based oil;

a first tank positioned to receive the rendered fats from the first source and the biological-based oil from the second source at a first location, the first tank including one or more mixing elements, thereby to mix the rendered fats and the biological oil in the first tank so as to define a blend fat composition, the blended fat composition also having a reduced pour point less than the pour point of the rendered fats received by the first tank;

a first pump positioned between the first source of rendered fats and the first tank, the first pump configured to pump the rendered fats to be received by the first tank;

a first flow control valve connected to and in fluid communication with the first source of rendered fats and connected to and in fluid communication with the first tank, the first flow control valve configured to supply the selected quantity of rendered fats to the first tank;

a first meter disposed at a position between the first pump and the first tank to measure an amount of rendered fats supplied to the first tank;

a second pump positioned between the second source of the biological-based oil and the first tank, the second pump configured to pump the biological-based oil to be received by the first tank;

a second flow control valve connected to and in fluid communication with the second source of biological-based oil and connected to and in fluid communication with the first tank, the second flow control valve configured to control supply of the selected quantity of the biological-based oil to the first tank;

a second meter disposed at a position between the second pump and the first tank, thereby to measure an amount of the biological-based oil supplied to the first tank; and a second tank positioned at the second location to receive the blended fat composition, the second tank including the mixing element and a heating element to maintain the blended fat composition at the reduced pour point.

20. The system of claim 19, wherein a distance between the first location and the second location comprises a distance greater than or equal to 50 miles.

21. The system of claim 20, further comprising:

a first heat source positioned at the first source of rendered fats to heat the first source of rendered fats to the first selected temperature and a second heat source positioned at the second source of biological-based oil to heat the second source to the second selected temperature;

one or more transport vehicles positioned to transport the blended fat composition to a second location remote from the first location while being configured to maintain the blended fat composition at a temperature above the reduced pour point;

a first tank pump positioned between the first tank and the one or more transport vehicles, the first tank pump configured to supply the blended fat composition to the one or more transport vehicles;

a first tank flow control valve connected to and in fluid communication with the first tank and connected to and in fluid communication with the one or more transport vehicles, the first tank flow control valve configured to supply the blended fat composition to the one or more transport vehicles to transport to the second location; and a first tank meter disposed at a position between the first tank and the one or more transport vehicles to measure an amount of blended fat composition supplied to the one or more transport vehicles to transport to the second location.

22. The system of claim 19, wherein the first selected temperature comprises a temperature equal to or greater than 90 degrees Fahrenheit, and wherein the second selected temperature comprises a temperature ranging from about 90 degrees Fahrenheit to about 130 degrees Fahrenheit.

23. The system of claim 19, wherein the second location comprises a distance of greater than 50 miles from the first location, and wherein the third temperature is maintained during transporting throughout the greater than 50 miles distance.

24. The system of claim 19, wherein the first tank is maintained at a temperature equal to or greater than 90 degrees Fahrenheit.

25. The system of claim 21, wherein the one or more transport vehicles is selected from a rail car, a freight hauler, or a marine vessel, and wherein the biological-based oil comprises one or more of technical corn oil (TCO), distillers corn oil (DCO), soybean oil, sorghum oil, canola oil, rapeseed oil, algal oil, fish oil, chufa/tigernut oil, *sativa* seed oil, or coconut oil.

26. The system of claim 25, wherein each of the one or more transport vehicles is configured to have an internal temperature equal to or greater than 90 degrees Fahrenheit, thereby to maintain temperature in the one or more transport vehicles greater than the reduced pour point of the blended fat composition in various weather conditions.

27. A controller for a system for reducing pour point of a blended fat composition to transport the blended fat composition from a first location to a second location to process the blended fat composition into a fuel, the controller comprising:

a first input/output in signal communication with a rendered fats flow control valve, the rendered fats flow control valve connected to and in fluid communication with a first source of rendered fats and connected to and in fluid communication with a first tank, the rendered fats flow control valve configured to supply a selected quantity of rendered fats to the first tank to create a blended fat composition, such that the controller is configured to adjust a flow rate of the selected quantity of rendered fats for supply to the first tank;

a second input/output in signal communication with a flow control valve, the flow control valve connected to and in fluid communication with a second source of a biological-based oil and connected to and in fluid communication with the first tank, the flow control valve configured to supply a selected quantity of the biological-based oil to the first tank to create the blended fat composition, such that the controller is configured to adjust a flow rate of a selected quantity of biological-based oil for supply to the first tank;

a third input/output in signal communication with a first tank flow control valve, the first tank flow control valve connected to and in fluid communication with the first tank and connected to and in fluid communication with one or more transport vehicles, the first tank flow control valve configured to supply a quantity of blended fat composition to the one or more transport vehicles to transport to a second location, such that the controller is configured to adjust a flow rate of the quantity of the blended fat composition for supply to the one or more transport vehicles;

a fourth input/output in signal communication with a rendered fats pump, the rendered fats pump positioned between the first source of rendered fats and the first tank, the rendered fats pump configured to supply rendered fats to the first tank such that the controller is configured to adjust the speed of the rendered fats pump thereby to modify the flow rate of the selected quantity of rendered fats supplied to the first tank;

a fifth input/output in signal communication with a first tank pump, the first tank pump positioned between the first tank and the one or more transport vehicles, the first tank pump configured to supply the blended fat composition to the one or more transport vehicles such that the controller is configured to adjust the speed of the first tank pump, to thereby modify the flow rate of a quantity of blended fat composition supplied to the first tank;

a sixth input/output in signal communication with a mixing element, the mixing element positioned at the first tank to mix the selected quantity of rendered fats and the selected quantity of biological-based oil at the first tank, such that the controller is configured to control operability of the mixing element at the first tank;

a seventh input/output in signal communication with a rendered fats flow meter, the rendered fats flow meter disposed at a position between the rendered fats pump and the first tank to measure an amount of rendered fats supplied to the first tank to create the blended fat composition, the controller configured to measure the flow rate of the rendered fats to the first tank;

an eighth input/output in signal communication with a meter, the meter disposed at a position between the pump and the first tank to measure an amount of the biological-based oil supplied to the first tank to create the blended fat composition, the controller configured to measure the flow rate of the biological-based oil to the first tank; and a ninth input/output in signal communication with a first tank flow meter, the first tank flow meter disposed at a position between the first tank and the one or more transport vehicles to measure an amount of blended fat composition supplied to the one or more transport vehicles to transport to the second location, the controller configured to measure the flow rate of the blended fat composition from the first tank.

28. The controller of claim 27, wherein the controller is further configured to adjust the first tank temperature equal to or greater than 90 degrees Fahrenheit.

29. The controller of claim 27, further comprising a tenth input/output in signal communication with a first heat source, the first heat source positioned between the first source of rendered fats and the first tank, thereby to heat a quantity of the rendered fats, such that the controller is configured to adjust a first selected temperature of the quantity of the rendered fats to a temperature equal to or greater than 90 degrees Fahrenheit.

30. The controller of claim 27, wherein the biological-based oil comprises distillers corn oil (DCO), and the controller further comprising a thirteenth input/output in signal communication with a second heat source, the second heat source positioned between the source of DCO and the first tank to heat a quantity of DCO, such that the controller is configured to adjust a second selected temperature of the quantity of DCO to a temperature equal to or greater than 100 degrees Fahrenheit.

* * * * *